United States Patent [19]
Kawabata et al.

[11] Patent Number: 5,608,300
[45] Date of Patent: Mar. 4, 1997

[54] ELECTRICAL ANGLE-DETECTING APPARATUS AND DRIVING SYSTEM OF SYNCHRONOUS MOTOR USING THE SAME

[75] Inventors: Yasutomo Kawabata, Aichi-ken; Eiji Yamada, Owariasahi; Tetsuya Miura; Yoshiaki Taga, both of Toyota, all of Japan

[73] Assignee: Toyota Jidosha Kabushiki Kaisha, Toyota, Japan

[21] Appl. No.: 328,063

[22] Filed: Oct. 24, 1994

[30] Foreign Application Priority Data

Oct. 26, 1993 [JP] Japan .................................. 5-291385
Sep. 5, 1994 [JP] Japan .................................. 6-238500

[51] Int. Cl.$^6$ .................................................. H02P 6/16
[52] U.S. Cl. .......................................... 318/721; 318/254
[58] Field of Search .................................. 318/138, 254, 318/439, 700, 720, 721, 724

[56] References Cited

U.S. PATENT DOCUMENTS

| | | | |
|---|---|---|---|
| 5,028,852 | 7/1991 | Dunfield .................................. | 318/254 |
| 5,117,165 | 5/1992 | Cassat et al. ............................ | 318/254 |
| 5,280,222 | 1/1994 | von der Heide et al. ............... | 318/138 |

FOREIGN PATENT DOCUMENTS

| | | |
|---|---|---|
| 58-37790 | 8/1983 | Japan . |
| 4-312382 | 11/1992 | Japan . |
| 4-312391 | 11/1992 | Japan . |

*Primary Examiner*—Bentsu Ro
*Attorney, Agent, or Firm*—Oblon, Spivak, McClelland, Maier & Neustadt, P.C.

[57] ABSTRACT

The present invention provides a system for detecting a rotational orientation or electrical angle of a rotor without any specific sensor so as to efficiently control a synchronous motor even while the rotor is at a stop or rotates at a relatively low speed. An electrical angle of a rotor (50) is determined according to a previously stored relationship between inductances of different interphases and electrical angles. At a first step, an electrical angle $\phi$ is calculated either in a range of 0 through $\pi$ or in a range of $\pi$ through $2\pi$ by approximation. At a second step, a range where the electrical angle $\phi$ belongs to is specified by taking advantage of asymmetrical property of a maximum current in response to a voltage applied to each interphase. An equivocal electrical angle $\theta$ is then determined in a range of 0 through $2\pi$. In order to control the driving current of a three-phase synchronous motor (40) at better efficiency, a preferable system of the invention determines the electrical angle according to the above method while the rotor (50) is under inactivating condition or rotates at a speed of less than a predetermined rotating speed, and detects the electrical angle with a reverse electromotive voltage while the rotor (50) rotates at a speed of not less than the predetermined rotating speed.

31 Claims, 31 Drawing Sheets

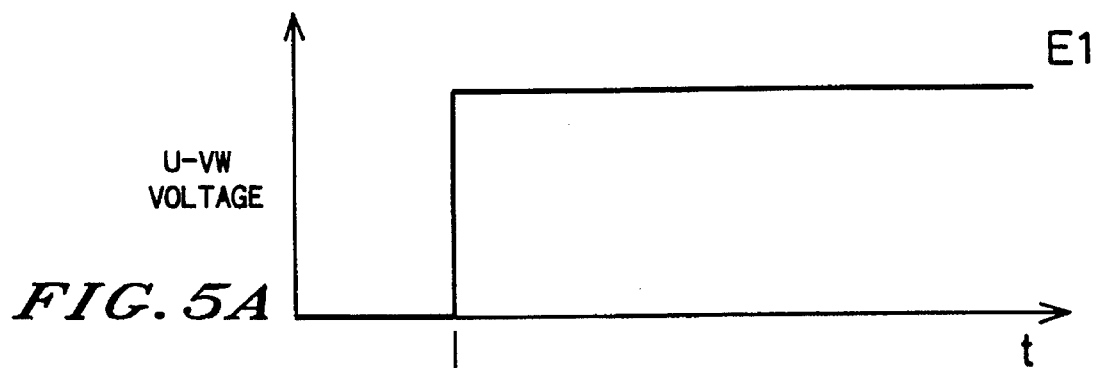
FIG. 5A
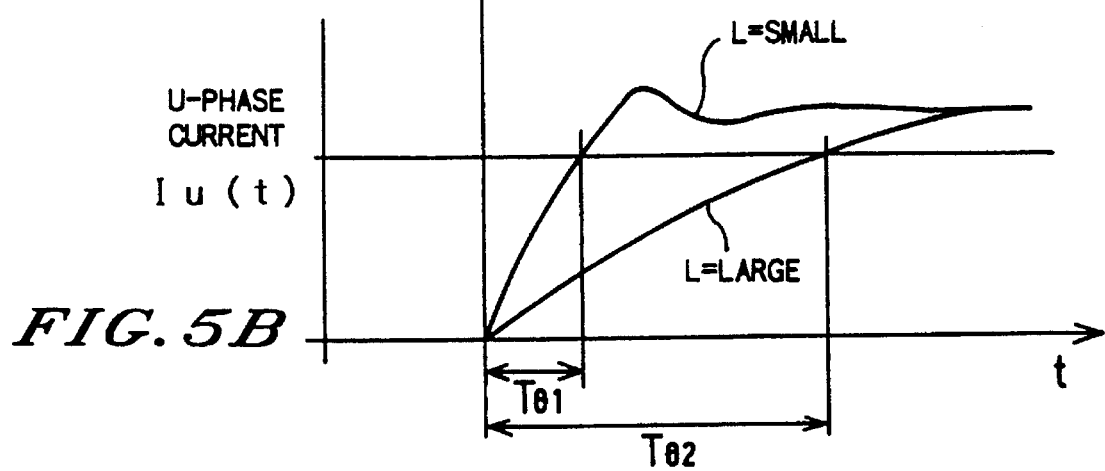
FIG. 5B
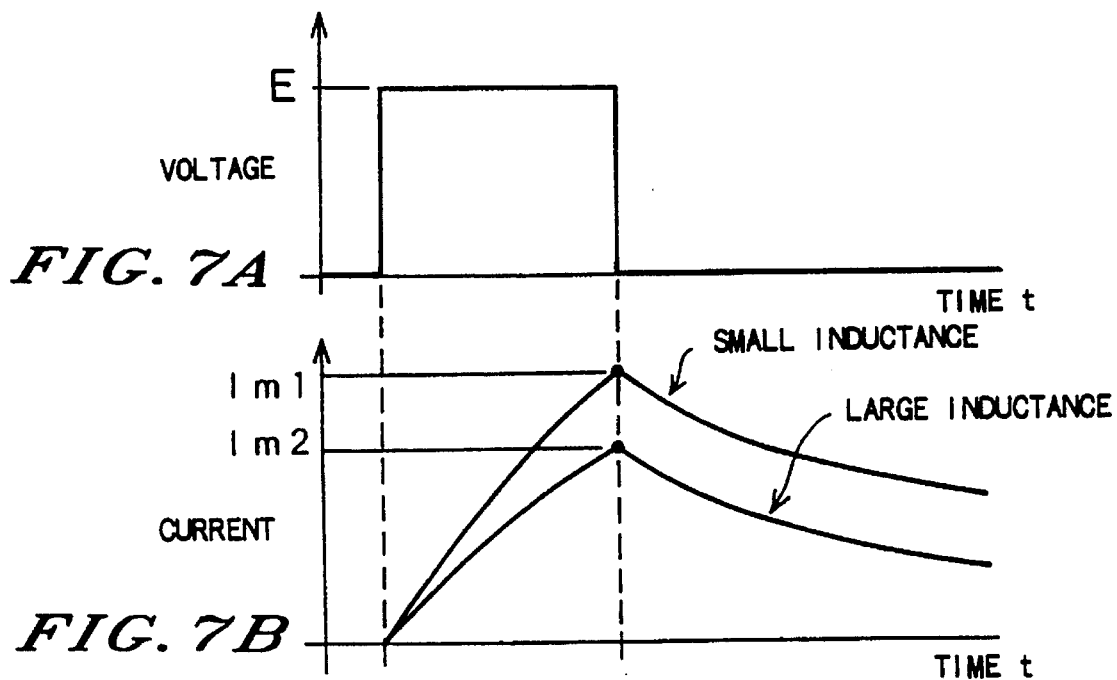
FIG. 7A
FIG. 7B

AVERAGE Iav OF THREE CURRENTS

ELECTRICAL ANGLE-DETECTING APPARATUS AND DRIVING SYSTEM OF SYNCHRONOUS MOTOR USING THE SAME

BACKGROUND OF THE INVENTION

1. Field of the Invention

The present invention relates to an electrical angle-detecting apparatus for detecting the electrical angle of a synchronous motor and to a driving system of the synchronous motor using the electrical angle-detecting apparatus. The invention also pertains to a method of detecting the electrical angle of a synchronous motor.

2. Description of the Related Art

Systems and methods proposed for detecting the electrical angle of a synchronous motor include one for detecting rotational orientations of permanent magnets on a rotor with a hall effect element and one for applying a high-frequency voltage onto a winding to detect the position of a rotor (electrical angle) based on the waveform of the voltage in the winding (for example, JAPANESE PATENT PUBLICATION GAZETTE No. S58-37790).

The latter structure utilizes the fact that rotation of the rotor generates a reverse electromotive voltage in the synchronous motor having permanent magnets. The reverse electromotive voltage and thereby the orientation of the rotor are estimated based on the voltage applied onto the winding and the current actually flowing therethrough. In actual operation, a high-frequency detection voltage is laid upon a driving ac voltage applied onto the stator winding, and the electrical angle is detected by detecting the waveform of the voltage in the winding. The method of detecting the electrical angle in response to the variation in the inductance of the stator winding does not require any special sensor.

Motor-control systems using such technique do not need a special sensor for detecting the rotational orientation of the rotor and are thereby referred to as sensor-less control devices. Improved sensor-less control devices previously proposed have an internal arithmetic expression model for accurately detecting the electrical angle and correct the estimated position of the rotor based on the difference between the electric current calculated and the electric current observed (for example, 'BRUSH-LESS DC MOTOR CONTROL SYSTEM WITH NO POSITIONING DETECTOR', Masakane SHIKKO and Nobuyuki MATSUI, Material for 1990 Meeting on Semi-Conductor Power Conversion SEP-90-21).

In the conventional method of evaluating the electrical angle based on the reverse electromotive voltage, rotation of the rotor is essential for generating the reverse electromotive voltage, and the electrical angle can not be detected while the rotor stops rotation. A technique proposed for measuring the electrical angle under inactivating conditions of the rotor makes the electric current flow through a stator winding according to a predetermined pattern so as to rotate the rotor at random and generate a reverse electromotive voltage. In a system that a shaft of a motor is directly connected to an outside member, however, this technique may result in unexpected movements of the outside member. In an electric vehicle having a motor directly connected to wheels via gears, for example, the technique allows a slight driving force to be transmitted to the wheels. Such non-control state is extremely dangerous in the ever-changing conditions of driving and the road surface.

A variety of techniques proposed for the sensor-less control can not solve the problem arising under the inactivating conditions of the rotor. As long as that the rotor rotates at a predetermined or higher speed, the sensor-less control utilizing the reverse electromotive voltage is an excellent method of precisely detecting the electrical angle and thereby efficiently controlling the motor. A novel technique for estimating and detecting the electrical angle even while the rotor stops rotation or gradually increases the speed of rotation to a fixed level has thus been highly demanded.

There is a proposed method of determining the electrical angle of a synchronous motor with permanent magnets based on the inductance varied with the electrical angle of the synchronous motor (for example, JAPANESE PATENT LAYING-OPEN GAZETTE No. H6-113585 and materials of the 64th and 74th Power Electronics Conferences). This method, however, determines the electrical angle only in the unit of 30 degrees or otherwise requires solution of complicated voltage equations for determination of the electrical angle at the precision of less than 30 degrees, thus not realizing the practical control.

SUMMARY OF THE INVENTION

The object of the invention is to realize practical sensor-less control in which the electrical angle is readily detected with high precision.

A first electrical angle-detecting apparatus according to the invention drives first detection means to apply a predetermined voltage to a first interphase combination of a synchronous motor and detect behavior of a first electric current flowing in response to the voltage thus applied. Second detection means applies the predetermined voltage to a second interphase combination, which is different from the first interphase combination, and detects behavior of a second electric current flowing in response to the applied voltage. Even under inactivating conditions of a rotor, the inductance of a winding varies with the electrical angle of the rotor. In a synchronous motor, the inductance of a certain interphase has an identical value at a plurality of positions of the rotor. At least two detection means are accordingly required to detect behaviors of electric current which reflects the inductance. Electrical angle calculation means determines the position of the rotor and thereby the electrical angle of the synchronous motor in a range of 0 through $2\pi$ by referring to relationships between behaviors of electric current and electrical angles previously stored in first and second memory means.

The first and the second memory means may store relationships between behaviors of electric current and inductances corresponding to electrical angles. Such structure of storing the relationship between the behavior of electric current and the inductance simplifies the structure of the electrical angle detecting-apparatus which realizes detection of the electrical angle at sufficiently high precision.

When the relationship between the behavior of electric current and the inductance corresponding to the electrical angle in a range of 0 through $\pi$ is different from that in a range of $\pi$ through $2\pi$, the electrical angle is readily detected by the first detection means and the second detection means. There are several methods of realizing such difference. According to one preferable structure, a pair of poles of the synchronous motor are constructed as a north pole and a south pole having different magnetic properties, so that a behavior of electric current with respect to an electrical angle of a first π is made different from that with respect to an electrical angle of a second π.

Another possible structure is to apply a voltage corresponding to a non-linear region of magnetic properties of a magnetic circuit, which consists of the rotor and the first or second interphase combination, to the first or second interphase combination. This makes the relationship between the behavior of electric current and the inductance corresponding to the electrical angle in the range of 0 through π different from that in the range of π through 2π.

A second electrical angle-detecting apparatus of the invention determines an electrical angle by approximation based on the behavior of electric current. For example, electrical angle calculation means of the second apparatus successively applies a fixed voltage to each of N (N is equal to 3 or a greater integer) interphase combinations in a three-phase synchronous motor so as to detect a behavior of electric current flowing in response to the fixed voltage, selects a behavior having a least error in linear approximation out of the N behaviors of electric current thus detected, and calculates an electrical angle of the synchronous motor by linear approximation of the behavior of electric current thus selected. One preferable structure of the electrical angle calculation means actually measures behaviors of electric current for (N−1) interphase combinations out of the N interphase combinations, and calculates a behavior of electric current for a last interphase combination based on the measurement values for the (N−1) interphase combinations.

According to another application, the electrical angle calculation means of the second apparatus detects the electrical angle of a three-phase synchronous motor by detecting an electric current flowing in response to a fixed voltage applied into each interphase combination of the three phases, specifying one of six areas, which are defined by equally dividing the electrical angle of π, according to the intensity and a mean of the three electric currents thus detected, and determining a phase of the electrical angle in the specified area by an approximate equation of θ≡tanθ for an interphase where the electric current has an extreme value. The electrical angle is calculated in the range of 0 through π or in the range of π through 2π based on the specified area and the phase determined.

A third electrical angle-detecting apparatus according to the invention has a specific structure of determining whether the electrical angle belongs to the range of 0 through π or the range of π through 2π, which is added to the second electrical angle-detecting apparatus which determines the electrical angle by approximation. According to one preferable application, the range of the electrical angle is specified by comparing the intensity of electric current flowing in response to application of a voltage of a non-linear region with a predetermined threshold value. Application of a fixed voltage to different interphases according to the electrical angle in the range of 0 through π or in the range of π through 2π can reduce the required number of process for detecting the electric current and executing the comparison to the minimum of one. Duplicate measurement and comparison is also preferable while the fixed voltage is applied to different interphases.

The intensity of the electric current in response to application of a fixed voltage significantly changes with the area specified as above. A preferable structure of the third apparatus selects one of plural threshold values according to the specified area for the comparison, thereby further enhancing precision of the detection. Another preferable structure determines the voltage to be applied according to the specified area, and specifies the range of the electrical angle based on comparison between a predetermined threshold value and the intensity of electric current flowing through a specific interphase combination in response to the voltage applied. This structure does not require application of any large voltage and effectively prevents troubles which may be caused by application of a large voltage.

According to one specific application, the range of the electrical angle is specified by a unit of π by applying a voltage corresponding to a non-linear region of magnetic properties of a magnetic circuit, which consists of the rotor and a specific interphase combination, to the specific interphase combination, applying a reverse voltage having an opposite polarity to that of the applied voltage to another interphase combination, which is different from the specific interphase combination, and comparing the intensity of electric current flowing in response to the applied voltage with the same in response to the reverse voltage.

In this structure, readiness of the comparison differs by the area of the electrical angle in the range of 0 through π or in the range of π through 2π. Selecting a suitable interphase, to which a voltage is applied, for distinct comparison based on the area of the electrical angle allows the applied voltage to be set equal to a lower limit of the non-linear region.

Once a voltage is applied to an interphase, a certain time period is required for a drop of the voltage by a transient phenomena after cessation of the voltage application. One preferable structure of the apparatus abruptly reduces the voltage after detecting a behavior of electric current in response to an applied voltage, thus shortening a waiting time for subsequent detection of the behavior of electric current. Abrupt decrease of the voltage is realized by short-circuit of the interphase or application of a reverse voltage to the interphase.

The frequency of the applied voltage may be regulated to be higher than the frequency of an ac voltage applied to the winding for the purpose of driving. This structure allows a detection signal of an electrical angle to be easily extracted under application of the driving ac voltage and does not affect operation of the synchronous motor.

The detection means of the apparatus detects various behaviors of the electric current. A typical structure detects quantities correlated to the inductance of the winding corresponding to the electrical angle of the rotor by observing transient phenomena after application of a fixed voltage: for example, a time period elapsing before the electric current rises to a predetermined level, the electric current after elapse of a predetermined time, and a differential of the electric current after elapse of a predetermined time. In another structure, behaviors of electric current are detected based on a transient response of a voltage drop, when the voltage is reduced to zero or a low level after application of a fixed voltage for a certain time period.

A fourth electrical angle-detecting apparatus of the invention includes angle detection means for applying a fixed voltage to a specific interphase combination within an elapse of a time period required for each electrical angle π, which is determined by an upper limit of rotating speed of a synchronous motor, and detecting an electrical angle in a range of 0 through π or in a range of π through 2π based on a behavior of electric current flowing in response to the fixed voltage. A range specification means then determines, at least once, whether the electrical angle detected is in the range of 0 through π or in the range of π through 2π. An initial value of the electrical angle is then determined according to the electrical angle detected by the angle detection means and the range specified by the range specification means. The range of the electrical angle, which is subsequently detected either in the range of 0 through π or in the range of π through 2π, can be specified by calculation. A current electrical angle is thus updated successively by the electrical angle most recently detected by the angle detection means.

The invention is also directed to a driving system of a synchronous motor, which includes any electrical angle-detecting apparatus described above. Driving voltage application means applies a driving voltage to the winding of the synchronous motor according to results of detection by the electrical angle-detecting apparatus in a first range where the rotor is at a stop or rotates at a speed of less than a predetermined level. In a second range where the rotor rotates at a speed of not less than the predetermined level, on the other hand, reverse electromotive voltage detection means detects a reverse electromotive voltage generated in the winding accompanied with rotation of the rotor. Second electrical angle detection means detects an electrical angle based on the reverse electromotive voltage, and the driving voltage application means applies a driving voltage to the winding according to results of detection by the second electrical angle detection means.

The invention also provides a method of detecting an electrical angle using any electrical angle-detecting apparatus described above as well as a method of driving a synchronous motor using the driving system described above.

These and other objects, features, aspects, and advantages of the present invention will become more apparent from the following detailed description of the preferred embodiments with the accompanying drawings.

BRIEF DESCRIPTION OF THE DRAWINGS

FIG. 5 is a graph showing a transient response of a U-phase current Iu(t) when a voltage E1 is applied onto the U-VW interphase;

FIG. 7 is a graph showing the relationship between the inductance and the maximum electric current in the transient response;

DESCRIPTION OF THE PREFERRED EMBODIMENT

Figure 2:
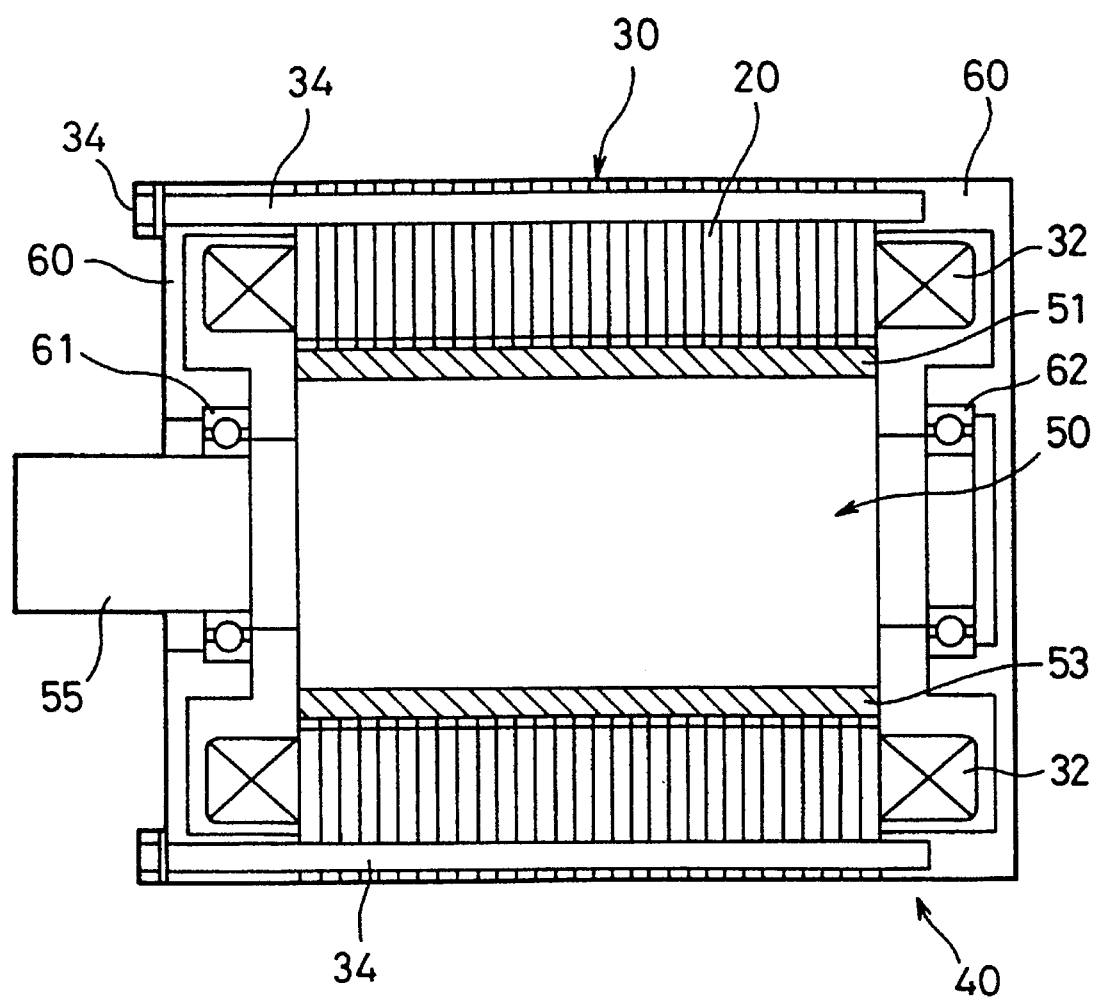
FIG. 2 is a cross sectional view showing a typical structure of a three-phase synchronous motor 40 with a stator 30 in the first embodiment.

A general structure of the three-phase synchronous motor 40 is described first with reference to FIG. 2. The three-phase synchronous motor 40 includes a stator 30, a rotor 50, and a casing 60 for accommodating the stator 30 and the rotor 50 therein. Permanent magnets 51, 52, 53, and 54 (see FIG. 3) are mounted on the circumference of the rotor 50. A shaft 55 going through the center of the rotor 50 is rotatably supported by bearings 61 and 62 attached to the casing 60.

Figure 3:
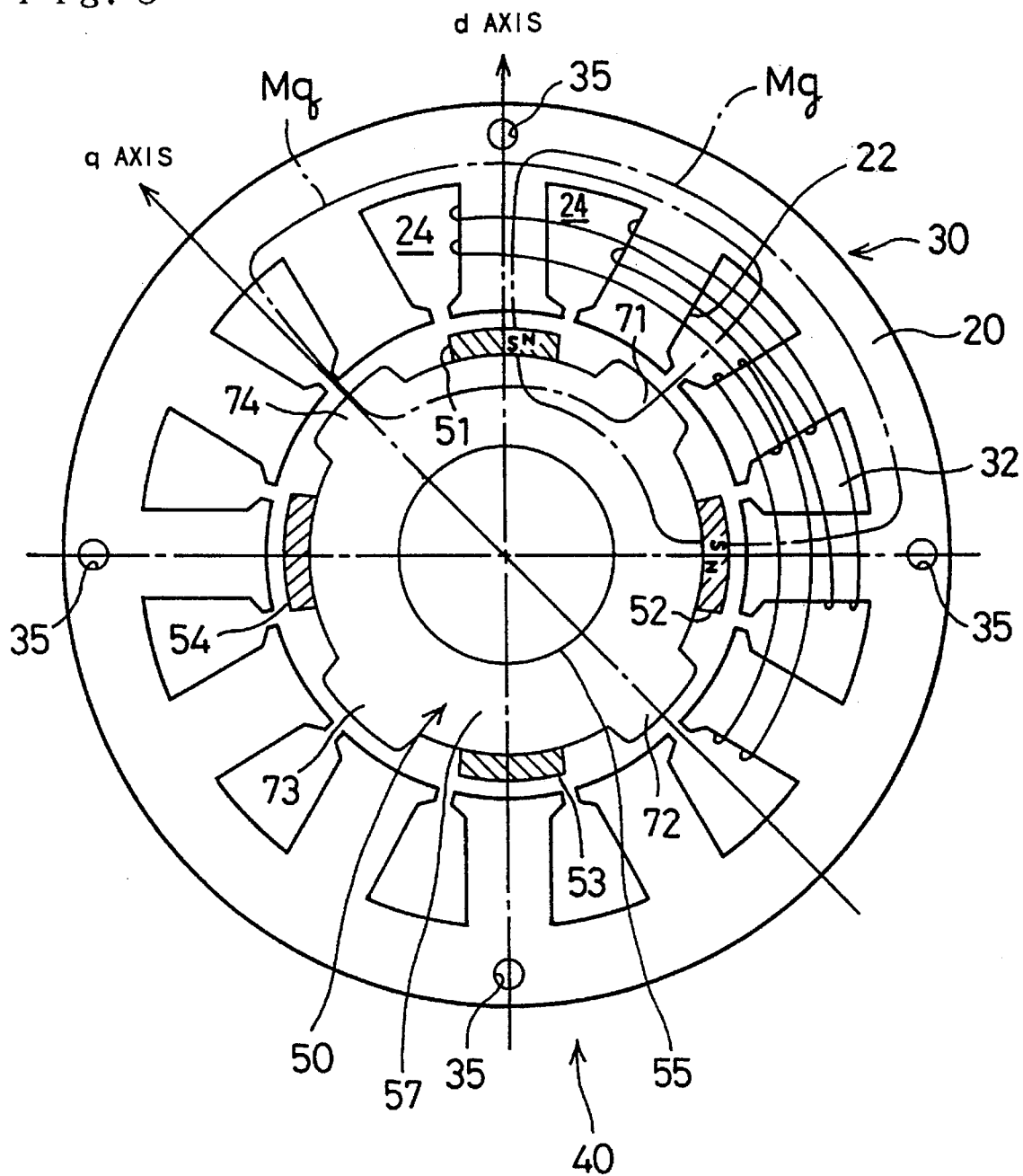
FIG. 3 is a side view illustrating the arrangement of the stator 30 and a rotor 50 in the three-phase synchronous motor 40 in the first embodiment.

The rotor 50 consists of a plurality of rotor elements 57 prepared by blanking a non-oriented electromagnetic steel plate and laid one upon another. Each rotor element 57 is provided with four salient-poles 71 through 74 arranged on the circumference thereof at equal intervals as shown in FIG. 3. The plurality of rotor elements 57 laid one upon another are temporarily fixed by the shaft 55 inserted into the center of the rotor elements 57. The rotor elements 57 composed of the electromagnetic steel plate have dielectric layers and adhesion layers on the surface thereof. After lamination, the adhesion layers of the respective rotor elements 57 are molten to adhere to the adjacent rotor elements 57 by application of heat of a predetermined temperature.

After preparation of the rotor 50, the permanent magnets 51 through 54 extending along the shaft 55 are mounted in the respective middles of the salient-poles 71 through 74 on the circumference of the rotor 50. The permanent magnets 51 through 54 are magnetized in the direction of the thickness thereof. Under the condition that the rotor 50 is assembled with the stator 30, the permanent magnets 51 and 52 form a magnetic path Md flowing through the rotor elements 57 and stator elements 20 as shown by the one-dot chain line in FIG. 3.

The stator elements 20 of the stator 30 are prepared by blinking a non-oriented electromagnetic steel plate in a similar manner to the rotor elements 57, and has a total of twelve teeth 22 as shown in FIG. 3. A coil 32 for generating a revolving magnetic field in the stator 30 is wound upon slots 24 formed in every adjacent teeth 22. Bolt holes 35 which fixation bolts 34 are fitted in are formed on the circumference of the stator elements 20.

The stator 30 consisting of a plurality of the plane stator elements 20 is temporarily fixed by heating and melting the respective adhesive layers of the stator elements 20 which are laid one upon another and pressed against one another. The stator 30 is completed by winding the coil 32 upon the teeth 22 under the temporary fixing conditions, and the complete stator 30 is mounted on the casing 60 and totally fixed by screwing the fixation bolts 34 into the bolt holes 35. Assembly of the three-phase synchronous motor 40 is implemented by rotatably fixing the rotor 50 to casing 60 by means of the bearings 61 and 62.

When exciting current flows through the coil 32 of the stator 30 to generate a revolving magnetic field, a magnetic path Mq going through the salient-poles adjacent to each other, the rotor elements 57, and the stator elements 20 is formed as illustrated in FIG. 3. A magnetic flux generated by the permanent magnets 51 through 54 pierces the rotor 50 in the radial direction along a 'd' axis whereas a magnetic flux generated by the coil 32 of the stator 30 pierces the rotor 50 in the radial direction along a 'q' axis. In this embodiment having four salient-poles, the 'd' axis and the 'q' axis are arranged electrically perpendicular to each other.

Figure 1:
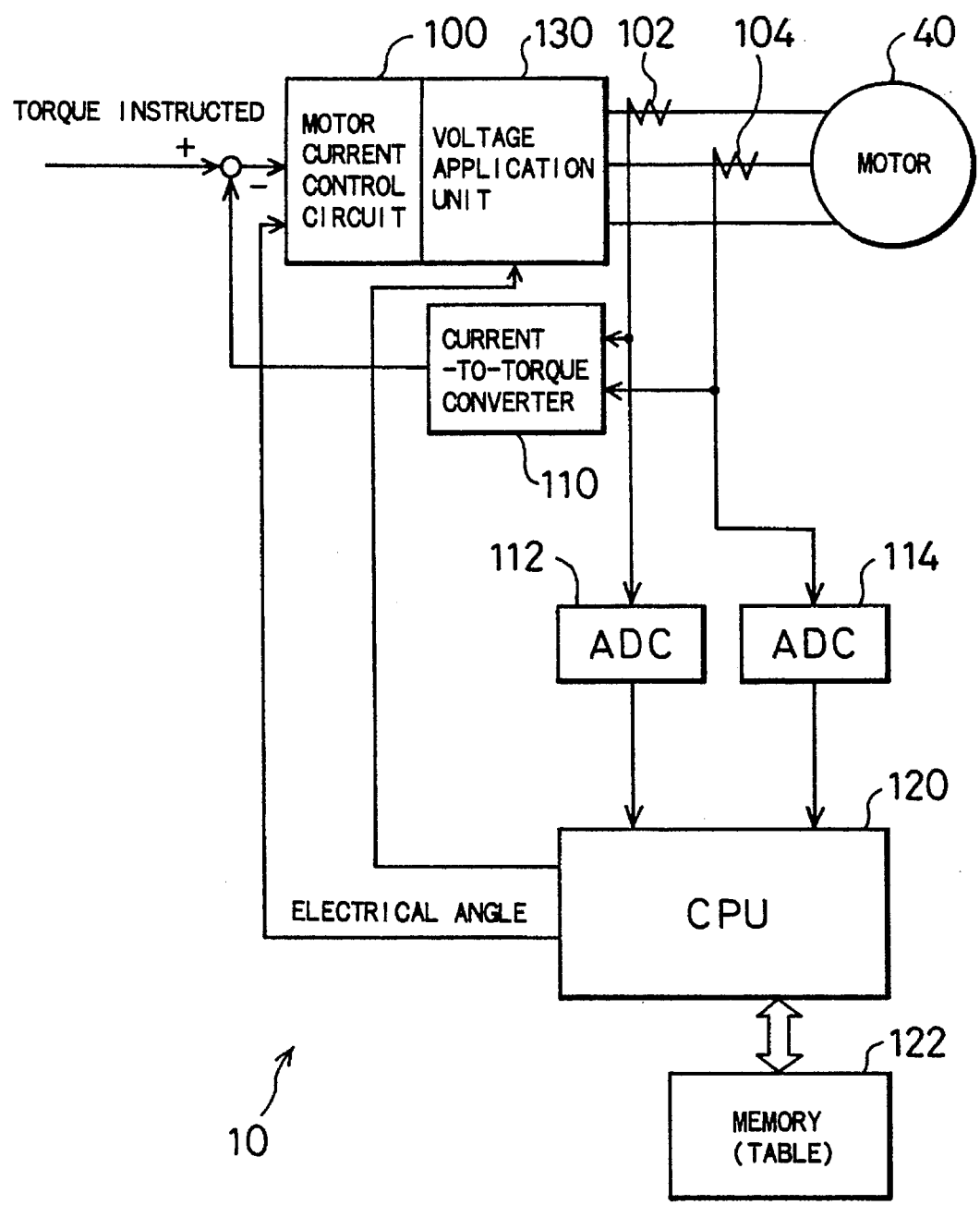
FIG. 1 is a block diagram schematically illustrating a motor control system 10 including an electrical angle-detecting apparatus embodying the invention.

Primary elements of the motor control system 10 are described with reference to the block diagram of FIG. 1. The motor control system 10 includes: a motor current control circuit 100 for controlling three-phase motor currents (U, V, W phases) of the three-phase synchronous motor 40 based on torque values instructed from the outside; first and second ammeters 102 and 104 for detecting a U-phase current Iu and a V-phase current Iv of the three-phase synchronous motor 40; a current-to-torque converter 110 for converting the electric currents thus detected to torques; first and second analog-to-digital converters (ADC) 112 and 114 for converting the electric currents detected to digital data; a 1-chip microprocessor (CPU) 120 for calculating electrical angles; and a memory 122 for storing a table used for calculation of the electrical angles. The torques converted by the current-to-torque converter 110 are subtracted from the torque values externally instructed so as to feedback control the actual torque of the three-phase synchronous motor 40. The motor current control circuit 100 is further provided with a voltage application unit 130 in its output stage. The voltage application unit 130 determines voltages applied between the respective coils of the three-phase synchronous motor 40 to generate electric currents Iu, Iv, and Iw of the respective phases U, V, and W of the motor 40 determined according to the torque values externally instructed. The voltage application unit 130 receives control outputs from the CPU 120 to allow the voltages applied onto the respective coils of the three-phase synchronous motor 40 to be regulated from the outside. Details of this feature will be described later.

Figure 4:
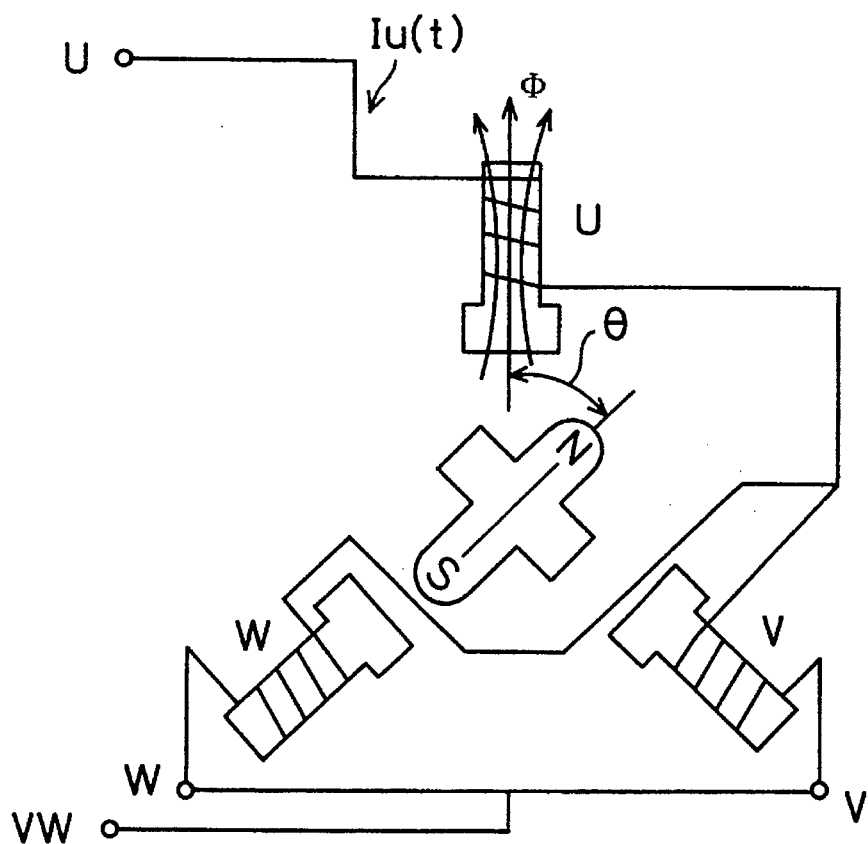
FIG. 4 shows an equivalent circuit of the three-phase synchronous motor 40 in the first embodiment.

The description below regards principles and practical operations of detecting the electrical angle of the rotor 50 in the three-phase synchronous motor 40 and the motor control system 10 for controlling the motor 40 constructed as above. FIG. 4 shows an equivalent circuit of the three-phase synchronous motor 40. When a predetermined voltage E1 is applied onto the U-VW interphase like a step function, an electric current Iu(t) flowing therethrough shows a transient response based on an inductance component L of the equivalent circuit. An example of the transient response is shown in the graph of FIG. 5. The inductance L of the circuit is a function of an electrical angle θ of the rotor 50. Under the stationary condition that the rotor 50 does not rotate, the inductance L of the circuit is determined by the electrical angle of the 'd' axis of the rotor 50 electrically formed against the 'q' axis.

Figure 6:
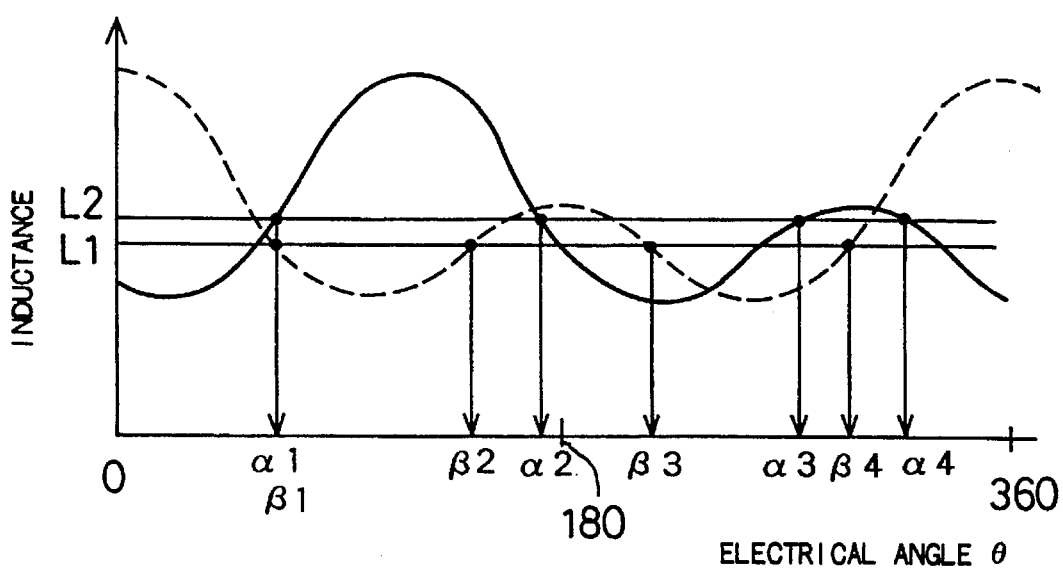
FIG. 6 is a graph showing the inductance of the winding plotted against the electrical angle θ.

The electric current Iu(t) flowing through the equivalent circuit shown in FIG. 4 (hereinafter referred to as the U-phase current) shows a response expressed as:

$$Iu(t)=(1-e^{-RT/L})E1/R \qquad (1)$$

wherein R and t respectively denote the impedance of the circuit and the time. The U-phase current Iu(t) slowly increases for the greater inductance L. Namely, a time period Tθ2 for the greater inductance L which elapses before the U-phase current Iu(t) rises to a predetermined level is longer than a time period Tθ1 for the smaller inductance L. In this embodiment, the inductance L and the electrical angle θ have a symmetrical correlation about the electrical angle π (180 degrees) as shown in FIG. 6. In the graph of FIG. 6, a solid-line curve shows a measurement of the inductance against the electrical angle in the U-VW interphase whereas a broken-line curve denotes a measurement of the inductance against the electrical angle in the V-WU interphase. The description above is true only on the assumption that the rotor 50 does not rotate but is in a stationary condition. In the structure of the embodiment, these relations between the inductance and the electrical angle are previously measured and stored in the memory 122.

Measurement of the time period T$\theta$ elapsing before the electric current of each phase rises to the predetermined level gives the inductance L of the winding. The possible rotational orientation of the rotor 50, that is, the electrical angle $\theta$, is then determined with the inductance L. As shown in FIG. 7, the inductance of the circuit may be determined alternatively by applying a pulse of a predetermined voltage E and measuring the maximum electric current flowing through the coil against the voltage E. In this case, a maximum electric current Im1 for the smaller inductance is greater than a maximum electric current Im2 for the greater inductance.

In the measurements shown in FIG. 6, the inductance shows different behaviors in the electrical angle of 0 through $\pi$ and that of $\pi$ through $2\pi$. The inductance curve in the range of the electrical angle of 0 through $\pi$ is, however, essentially identical to the same in the range of $\pi$ through $2\pi$. When the inductance curves of the two ranges are indistinguishable, it becomes difficult to determine the electrical angle based on the measurement of the electric current. In the embodiment, the inductance curves of the two ranges are accordingly made different from each other as shown in FIG. 6. Details of the process of making the inductance curves distinguishable between the two ranges of the electrical angle will be described later. In this embodiment, the relationship between the electrical angle and the inductance is expressed as a high-order function as shown in FIG. 6, and the inductance curve measured against the electrical angle is stored as a table in the memory 122. The inductance curve in each phase circuit may have an identical value at a plurality of points of the electrical angle $\theta$ as clearly seen in the graph of FIG. 6. This means that measurement of the inductance for one phase does not unequivocally determine the electrical angle $\theta$. On the assumption that the inductance for the U phase calculated from the time period T$\theta$2 elapsing before the electric current rises to the predetermined level or from the maximum current Im2 with application of pulse of the predetermined voltage E is equal to L2, the graph of the U-phase gives four possible electrical angles, $\alpha$1 through $\alpha$4.

In a similar manner, the inductance is measured for the V phase. The relationship between the electrical angle $\theta$ and the inductance L for the V phase is identical with that for the U phase shifted by 120 degrees. When the inductance for the V phase calculated from the time period T$\theta$1 elapsing before the electric current rises to the predetermined level or from the maximum current Im1 with application of pulse of the predetermined voltage E is equal to L1, the graph of the V-phase gives four possible electrical angles, $\alpha$1 through $\alpha$4. The point $\alpha$1 (=$\beta$1) which satisfies both the U phase and the V phase is then determined as the actual electrical angle of the rotor 50.

Figure 8:
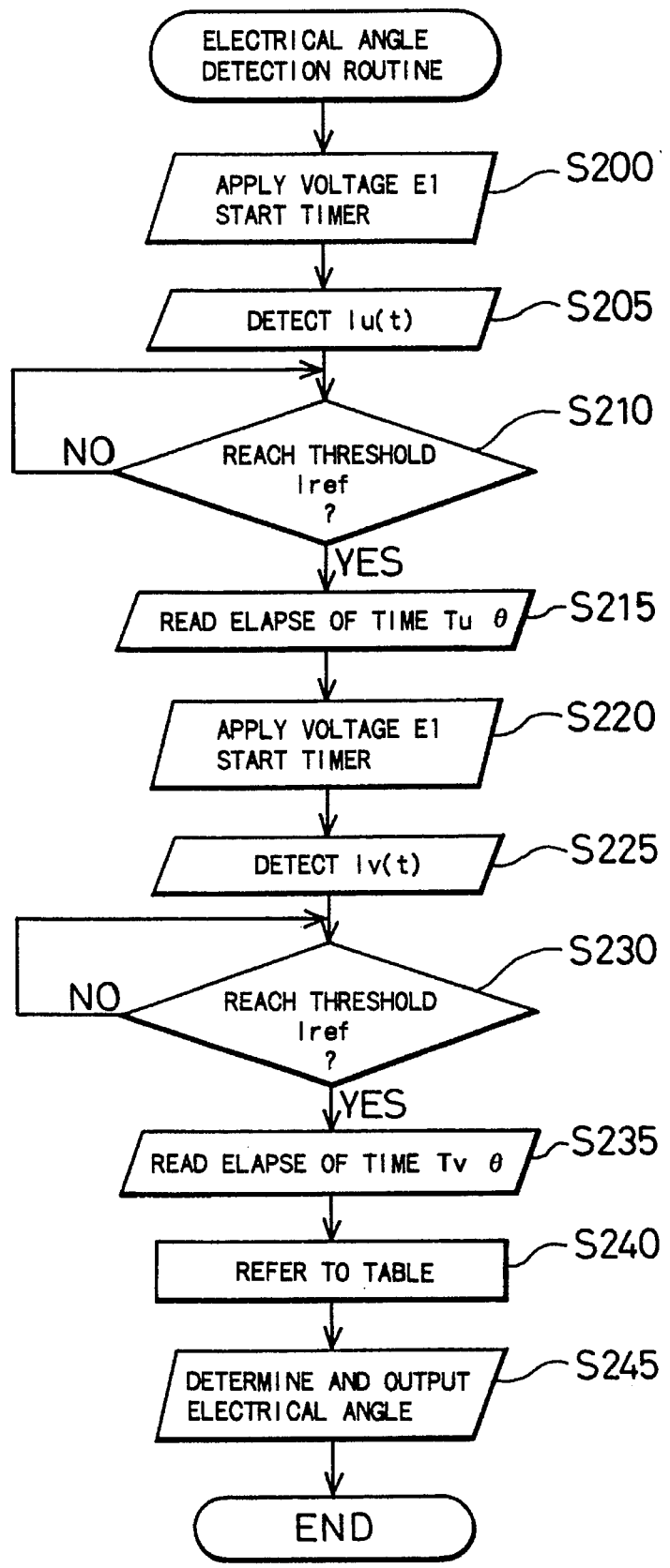
FIG. 8 is a flowchart showing an electrical angle detection routine executed in the first embodiment.

The concrete steps of an electrical angle detection routine executed by the CPU 120 are described according to the flowchart of FIG. 8. When the program enters the routine, the CPU 120 applies a predetermined voltage E1 to the U-VW interphase and starts a timer disposed in the CPU 120 at step S200. Application of the predetermined voltage E1 is executed by outputting a specific signal to the voltage application unit 130. At step S205, the CPU 120 reads an output of the first ammeter 102 via the first ADC 112 to detect a value of U-phase current Iu(t). The CPU 120 then determines whether the U-phase current Iu(t) read at step S205 has reached a reference value Iref at step S210. When Iu(t) has risen to Iref, the program goes to step S215 at which a time period t elapsing before Iu(t) reaches Iref is read as a time value Tu$\theta$ on the timer.

The CPU 120 stops application of the voltage to the U-VW interphase, applies the predetermined voltage E1 to the V-WU interphase after elapse of a fixed time period, and initializes the timer to zero at step S220. At step S225, the CPU 120 reads an output of the second ammeter 104 via the second ADC 114 to detect a value of V-phase current Iv(t). The CPU 120 then determines whether the V-phase current Iv(t) read at step S225 has reached the reference value Iref at step S230. When Iv(t) has risen to Iref, the program goes to step S235 at which a time period t elapsing before Iv(t) reaches Iref is read as a time value Tv$\theta$ on the timer. The CPU 120 subsequently determines possible electrical angles $\alpha$1 through $\alpha$4 and $\beta$1 through $\beta$4 corresponding to the two time values Tu$\theta$ and Tv$\theta$ by referring to the table stored in the memory 122 at step S240. The program proceeds to step S245 at which a set of the electrical angles $\alpha$ and $\beta$ whose difference is not greater than an allowable limit $\epsilon$, that is, $|\alpha m - \beta n| \leq \epsilon$ (m and n are respectively 1, 2, 3, or 4), is extracted and output as an actual electrical angle. An output signal representing the actual electrical angle is transmitted to the motor control circuit 100 and used as information of the rotational orientation of the rotor 50 in activation of the motor 40 to set the phase of the signal applied to each phase U, V, and W.

As described above, the structure of the first embodiment allows the three-phase synchronous motor 40 to start smoothly by utilizing the inductance of the winding even under the inactivating conditions of the rotor 50, thereby realizing desired control at the very beginning of the rotation. The structure does not require a separate sensor for detecting the rotational orientation or the electrical angle of the rotor 50. The motor 40 does not start as long as the predetermined voltage E1 applied to the winding of the U-VW interphase or the application period thereof is limited to be less than a specific voltage or application period which causes electric current to flow over a starting torque of the motor 40. The structure of the first embodiment realizes the down-sized, highly-reliable motor control system 10 having the sensor-less structure which can detect the electrical angle $\theta$ and control the rotation even under the inactivating conditions of the rotor 50. This also effectively prevents unintentional rotations of the motor 40.

Figure 9:
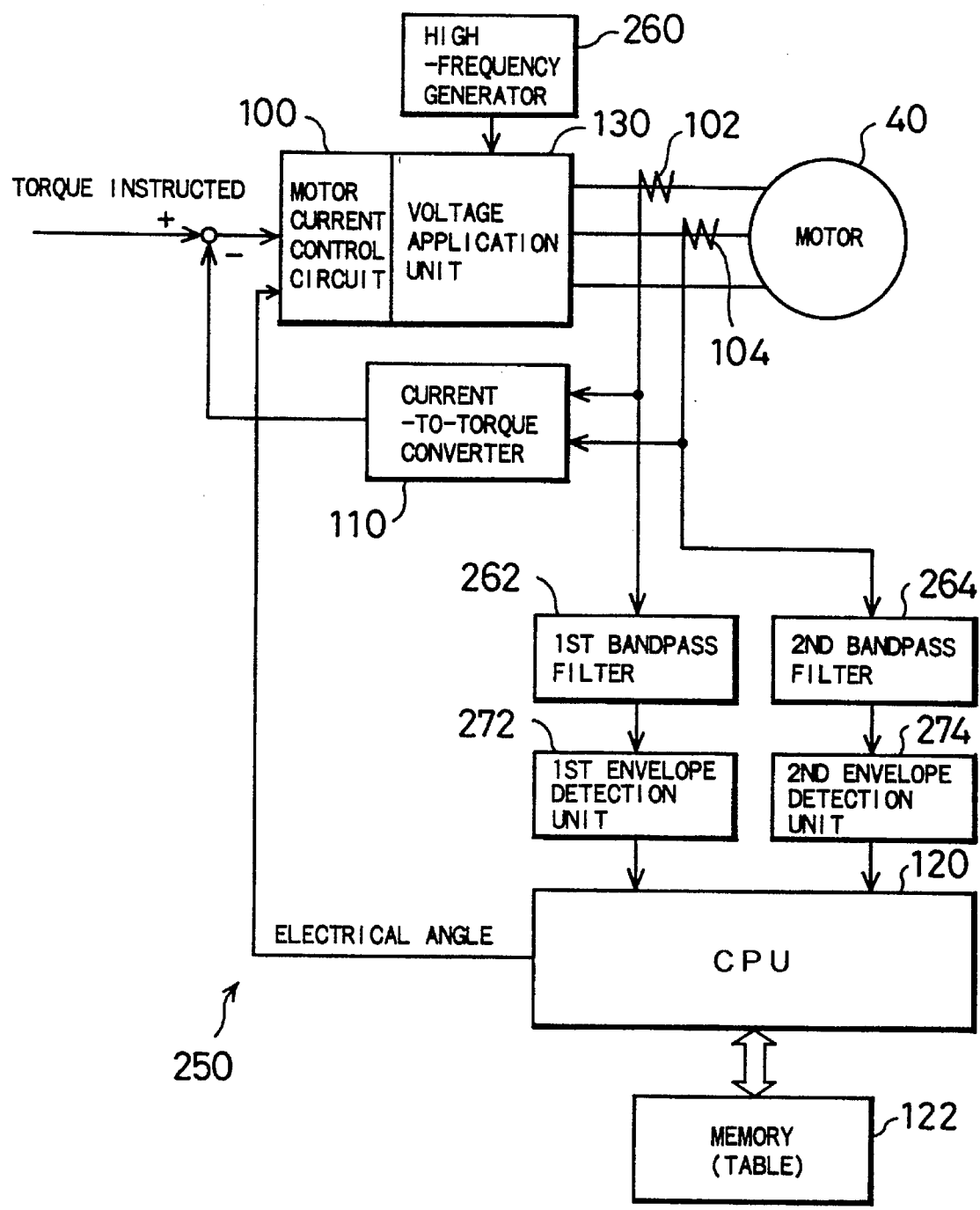
FIG. 9 is a block diagram schematically illustrating a motor control system 250 including an electrical angle-detecting apparatus of a second embodiment according to the invention.

Another motor control system 250 including an electrical angle-detecting apparatus of a second embodiment according to the invention has a hardware structure shown in FIG. 9. Unlike the system of the first embodiment, this system of the second embodiment continues detection of the electrical angle after starting of the motor. As illustrated in FIG. 9, the motor control system 250 has a fundamental structure identical with that of the first embodiment. Only differences are that the motor control system 250 includes first and second bandpass filters 262 and 264 for processing signals sent from the first and the second ammeters 102 and 104 as well as first and second envelope detection units 272 and 274 for extracting envelopes of output signals of the first and the second bandpass filters 262 and 264, in place of the first and the second ADCs 112 and 114 of the first embodiment, and that the motor control system 250 is further provided with a high-frequency generator 260 for generating and outputting high-frequency signals to the voltage application unit 130.

Figure 10:
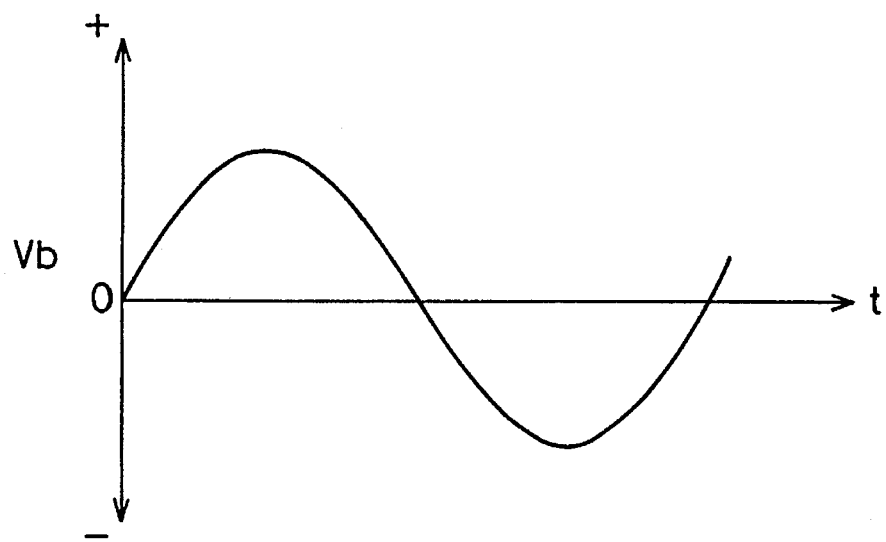
FIG. 10 is a graph showing a driving voltage Vb used in the second embodiment.
Figure 11:
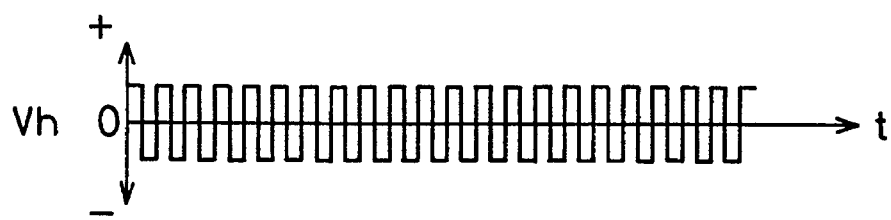
FIG. 11 is a graph showing a high-frequency signal Vh laid over the driving voltage.
Figure 12:
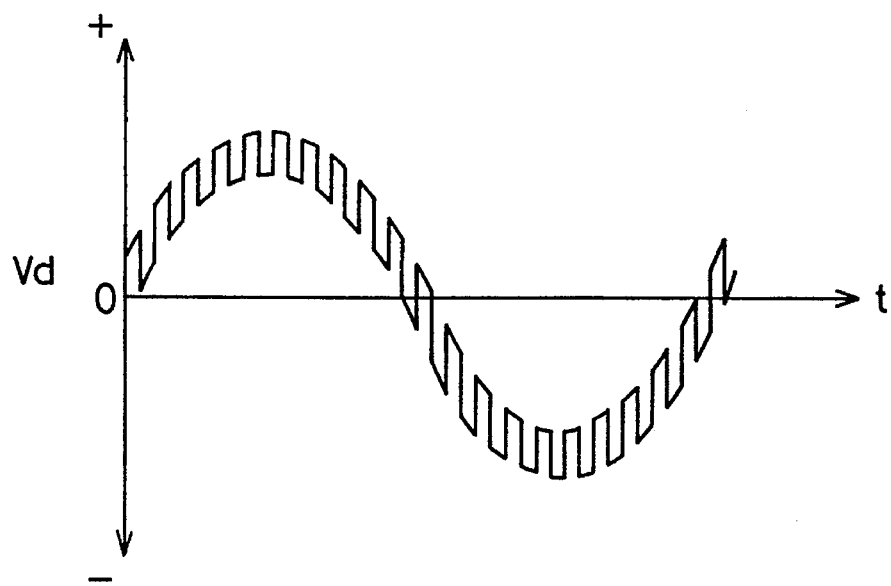
FIG. 12 is a graph showing an overlaid voltage signal Vb.

The high-frequency generator 260 generates a voltage signal Vh having a higher frequency (frequency increased about one order: for example, 5 through 10 KHz) sufficiently distinguishable from a frequency of an alternating-current voltage Vb (frequency for determining the rotation speed of the motor: for example, 0 through 300 Hz) applied to the respective windings U, V, and W of the three-phase synchronous motor 40 as schematically shown in FIGS. 10 through 12. The voltage application unit 130 lays the high-frequency signal Vh output from the high-frequency generator 260 over the driving ac-voltage Vb output in response to the instructions from the motor current control circuit 100, and applies the overlaid signal to each winding of the three-phase synchronous motor 40, shown in FIG. 12.

Figure 13:
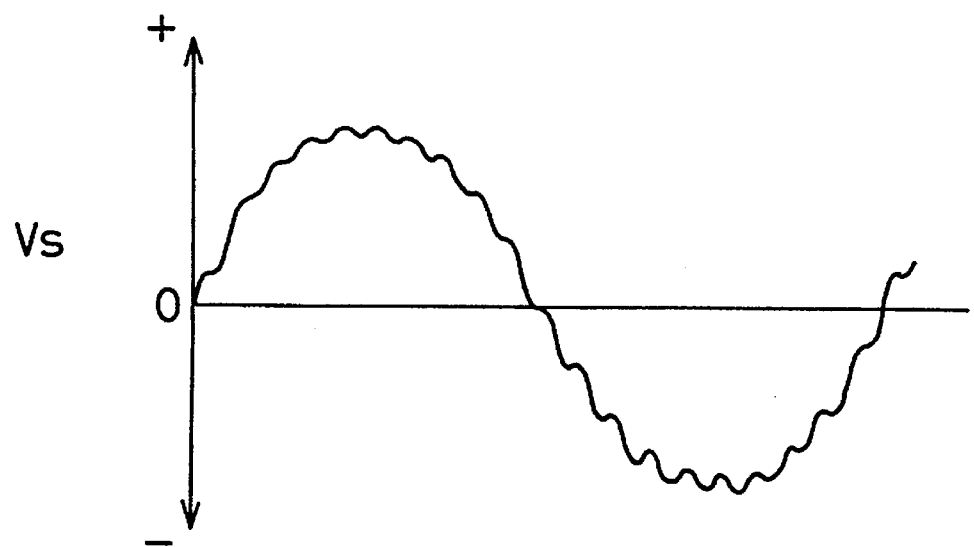
FIG. 13 is a graph showing an output signal Vs of ammeters.
Figure 14:
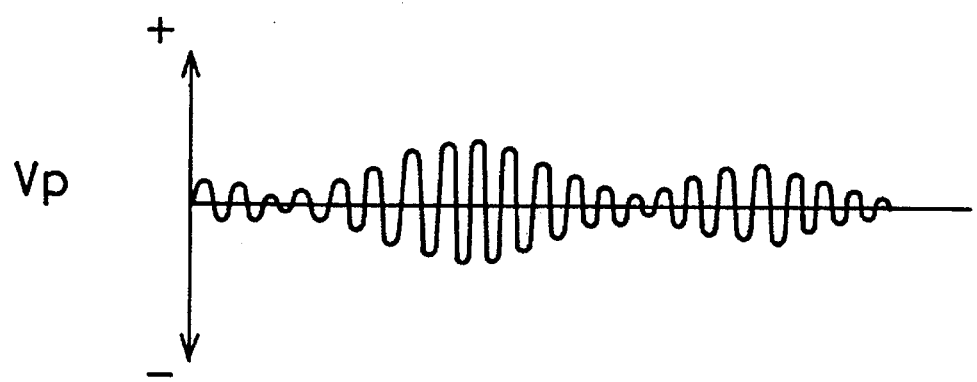
FIG. 14 is a graph showing an output signal Vp of bandpass filters.
Figure 15:
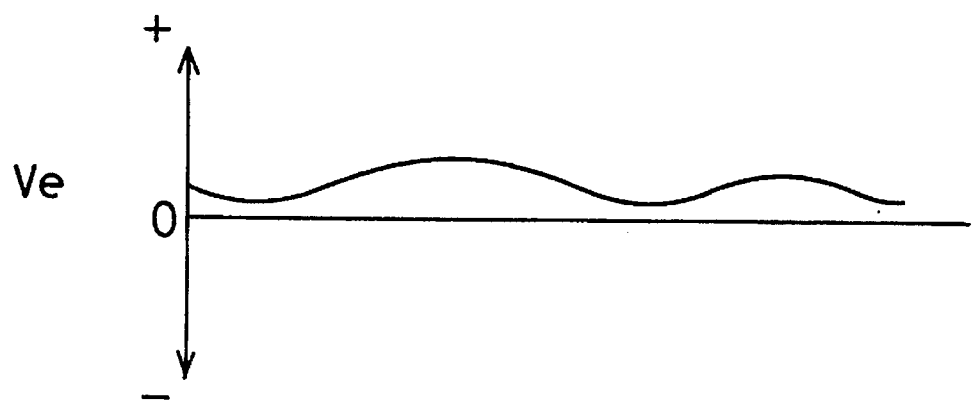
FIG. 15 is a graph showing an output signal Ve of envelope detection units.

As described in the first embodiment, since the inductance of each winding varies with the rotation of the rotor 50 or the variation in the electrical angle, the electric current flowing through the winding by the high-frequency component included in the voltage signal applied continuously varies. FIG. 13 is a graph showing the U-phase current Iu(t) and the V-phase current Iv(t) detected by the first and the second ammeters 102 and 104. In the graph of FIG. 13, the value obtained is shown as a detection signal Vs output from the first and the second ammeters 102 and 104. The first and the second bandpass filters 262 and 264 receive the detection signal Vs and pass only signals of a predetermined frequency range around the high-frequency component output from the high-frequency generator 260. An output signal Vp of the first and the second bandpass filters 262 and 264 is accordingly an extract of the high-frequency component overlaid in the detection signal Vs as shown in FIG. 14. The first and the second envelope detection units 272 and 274 receive the output signal Vp and extract a positive envelope of the signal Vp as an output signal Ve, which is shown in FIG. 15.

Figure 16:
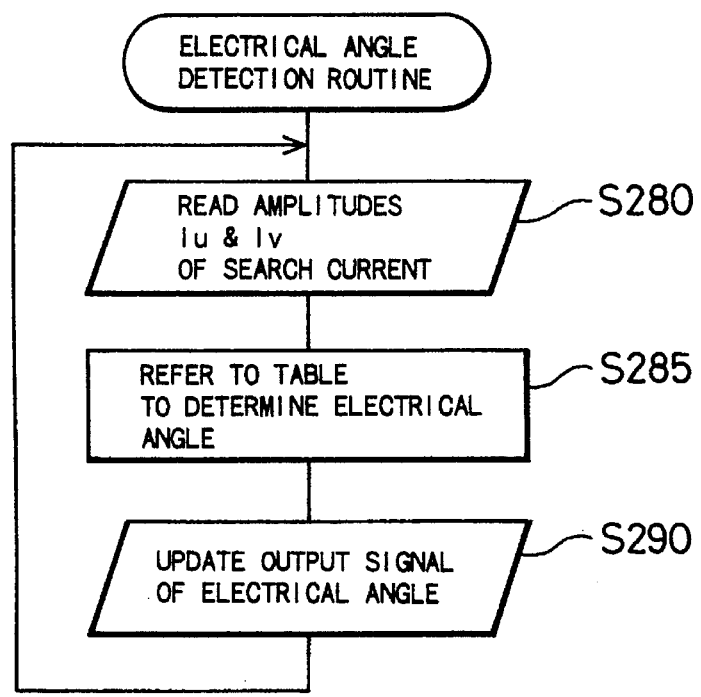
FIG. 16 is a flowchart showing an electrical angle detection routine executed in the second embodiment.
Figure 17:
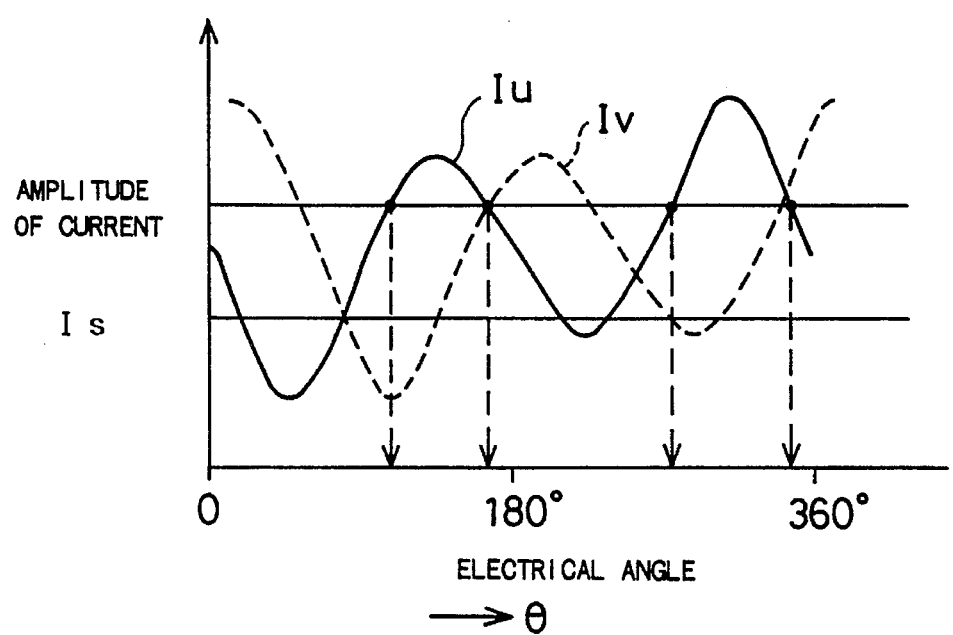
FIG. 17 is a graph showing the amplitude Is of the current plotted against the electrical angle θ.

The CPU 120 repeatedly executes an electrical angle detection routine shown in the flowchart of FIG. 16 while controlling the rotations of the three-phase synchronous motor 40. At step S280, the CPU 120 reads amplitudes Iu and Iv of search current for the U phase and the V phase at a certain time point. The amplitude Iu of the electric current for the U phase is distinguishably shifted from the amplitude Iv for the V phase as shown by the solid-line curve and the dotted-line curve of FIG. 17. In the graph of FIG. 17, 'Is' represents the amplitude of the search current for each phase. The program then goes to step S285 at which the CPU 120 refers to a table previously stored in the memory 122 and determines an actual electrical angle in the same manner as the first embodiment. The table previously stored in the memory 122 specifies the relationship between the amplitudes of the U phase and the V phase and the electrical angle θ. The CPU 120 determines the electrical angle corresponding to both the amplitudes Iu and Iv by referring to this table.

After determination of the electrical angle, data of the electrical angle output to the motor current control circuit 100 are updated at step S290. The motor current control circuit 100 calculates the driving current of the three-phase synchronous motor 40 based on the torque values instructed and the currently-output torques in the same manner as the first embodiment. The frequency and the phase of the driving voltage are determined according to information of the current electrical angle output from the CPU 120.

The motor control system 250 of the second embodiment can detect the electrical angle of the rotor 50 during rotation without any specific sensor. The structure of the second embodiment realizes the motor control system 250 having high reliability and simplified structure. The motor control system 250 can readily detect the electrical angle under inactivating conditions of the rotor 50 by setting the driving current equal to zero and outputting only the high-frequency component of the voltage.

Figure 18A:
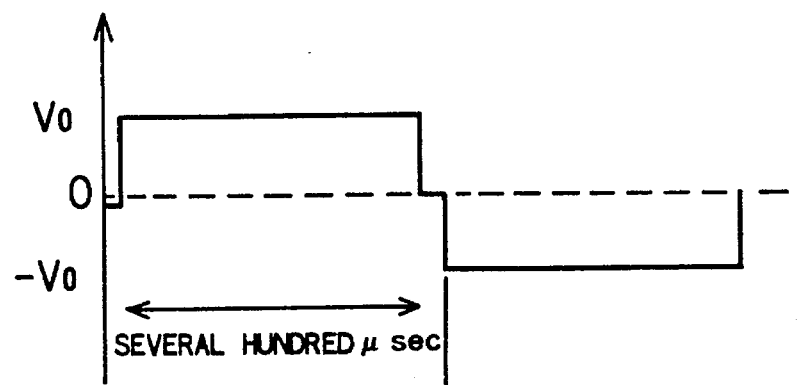
FIG. 18 is a graph showing another example of the voltage applied to the motor 40.
Figure 18B:
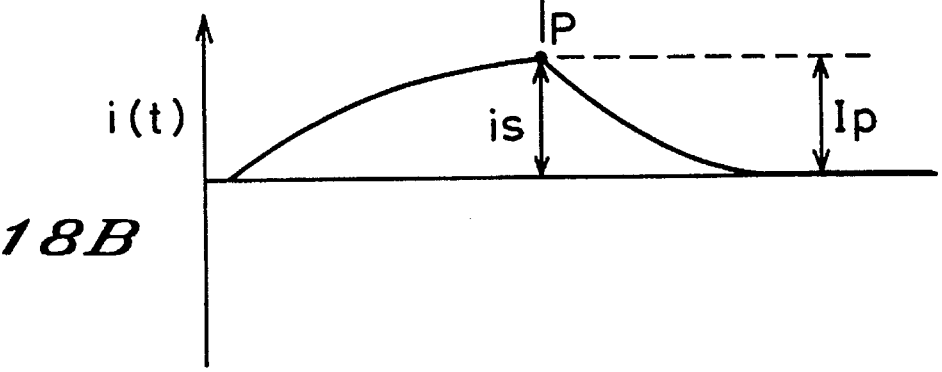

When the driving voltage applied is equal to zero, only the high-frequency component of the voltage is applied onto each phase. Although a square wave signal is overlaid in the second embodiment, another wave of an amplitude V0 having a waveform relatively similar to that of the alternating current as shown in FIG. 18 may be overlaid instead. In the latter case, the electric current detected by the first and the second ammeters 102 and 104 gives a curve shown in the lower graph of FIG. 18. An amplitude 'is' at a maximum point P is expressed as:

$$is = V0/(R^2 + \omega^2 L^2)^{1/2} \qquad (2)$$

in where R represents the impedance of the circuit, and ω is equal to 'f/2π' when the frequency of the applied voltage is equal to 'f'.

The current electrical angle is then determined according to the amplitudes 'is' of the electric current for both the U phase and V phase in the same manner as the second embodiment. This method has such an advantage over the above method with a pulse voltage that substantially no noise is generated from the three-phase synchronous motor 40. The noise detectable by the user is further reduced by setting the frequency of the applied ac signal out of the audible range.

Figure 19A:
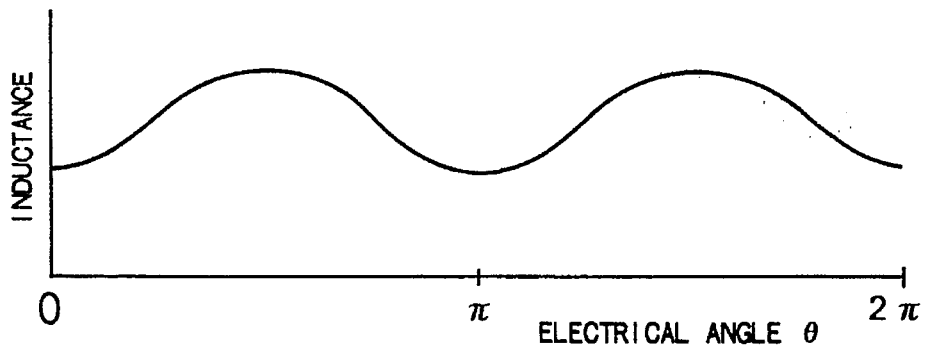
FIGS. 19A and 19B are graphs showing the inductance and the current plotted against the electrical angle θ.
Figure 19B:
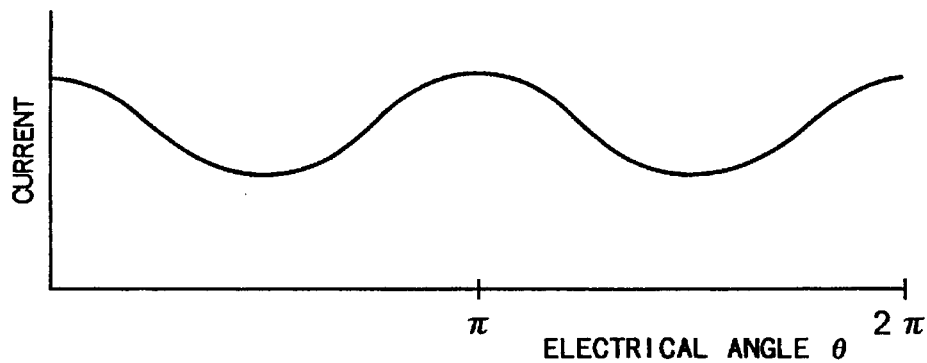

In the first and the second embodiments described above, the inductance shows different behaviors in the electrical angle of 0 through π (180 degrees) and that of π (180 degrees) through 2π (360 degrees). The inductance curve and the curve of the electric current in the range of the electrical angle of 0 through π should, however, be essentially identical to those in the range of π through 2π as shown in FIGS. 19A and 19B. A specific structure of the embodiments described below makes the inductance curves or the electric-current curves of the two ranges different and accordingly distinguishable from each other.

Figure 20:
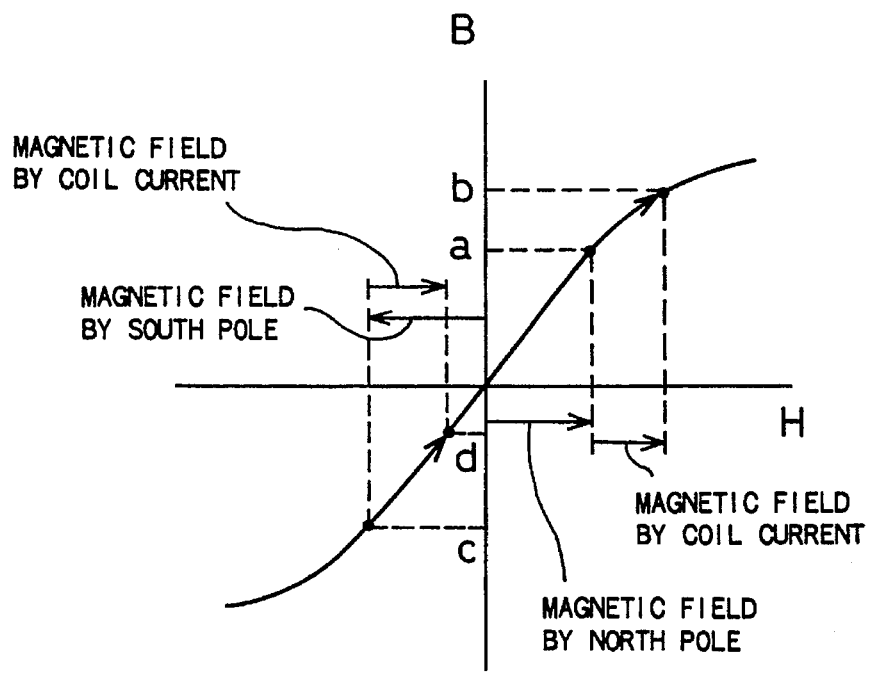
FIG. 20 is a graph showing magnetic properties in a magnetic circuit of the three-phase synchronous motor 40.

When an external magnetic flux H applied from the outside of a magnetic substance becomes greater than a predetermined level, an internal magnetic flux B inside the magnetic substance is saturated and gives a non-linear curve as shown in FIG. 20. The relationship between the external magnetic flux H and the internal magnetic flux B is expressed as:

$$B = \mu(H) = \{L(H)D/N^2 A\} H \qquad (3)$$

wherein D, N, and A respectively represent the length of the magnetic path, the number of coil turns, and the cross sectional area of the magnetic path.

In Equation (3), since D, N, and A are constants, the inductance L(H) also gives a non-linear curve. In a synchronous motor having a permanent magnet, the permanent magnet exists on the rotor 50. The external magnetic field for the U-phase magnetic substance is thus equal to a sum of the magnetic field by the permanent magnet of the rotor 50 and the magnetic field by the electric current flowing through the coil. Upon condition that the north pole of the permanent magnet is opposed to a U-phase iron core, the internal magnetic flux B inside the iron core gives a value shown by a point 'a' in FIG. 20. When the electric current flows from the U phase to the VW phase as shown in FIG. 4, addition of the magnetic flux by the coil current increases the internal magnetic flux B to a value shown by a point 'b'. Since the small electric current does not make the points 'a' and 'b' clearly distinguishable from each other, it is required to make a sufficiently large flow of electric current while the point 'b' is placed in the non-linear region. The intensity of the electric current flowing through the coil is thus determined experimentally.

When the south pole of the permanent magnet is opposed to the U-phase iron core, on the other hand, the external magnetic flux H by the permanent magnet and the internal magnetic flux B inside the iron core have the relation defined by a point 'c' in FIG. 20. When the electric current of the intensity required for the shift from the point 'a' to the point 'b' is flown in the same direction as above through the coil, the internal magnetic flux B plotted against the external magnetic flux H shifts to a point 'd'. When the electric current of a certain intensity is flown in the fixed direction through the coil, the internal magnetic flux B plotted against the external magnetic flux H shifts to a non-linear region for the north-pole magnetic field whereas the same shifts within a linear region for the south-pole magnetic field. Running the electric current of a intensity which can cause a shift to a non-linear region through the coil determines whether the north pole or the south pole is opposed to the iron core, thereby allowing the electrical angle of 0 through π range to be distinguished from that of π through 2π range. This allows the inductance curve (electric current) to have different behaviors in the range of the electrical angle of 0 through π and in the range of π through 2π in the synchronous motor 40 of the embodiment as shown in FIG. 6.

An unsymmetrical magnetic relationship between the stator 30 and the rotor 50 also makes the inductance curve in the electrical angle of 0 through π distinguishable from the same in the electrical angle of π through 2π. According to one possible structure, magnetic substances 86 through 89 are applied onto the magnetized faces of the alternate permanent magnets 52 and 54 selected out of the permanent magnets 51 through 54 of the rotor 50 as well as onto the surface of the alternate salient-poles 72 and 74. For the clarity of explanation, the rotor 50 and the stator 30 of the three-phase synchronous motor 40 are illustrated linearly in FIG. 21. The magnetic substance 86 is applied on the lower (inner) face of the permanent magnet 52 of the rotor 50, the magnetic substance 88 on the lower (inner) face of the permanent magnet 54, the magnetic substance 87 on the surface of the salient-pole 72, and the magnetic substance 89 on the surface of the salient-pole 74. A pair of permanent magnets 51 and 52 constituting one magnetic pole have different magnetic properties since no magnetic substance is applied onto the permanent magnet 51. The electric current flowing through each phase in the electrical angle of a first 180 degrees (0 through π) where no magnetic substance exists is accordingly made different from that in the electrical angle of a second 180 degrees (π through 2π) where the magnetic substance 86 exists.

Figure 21:
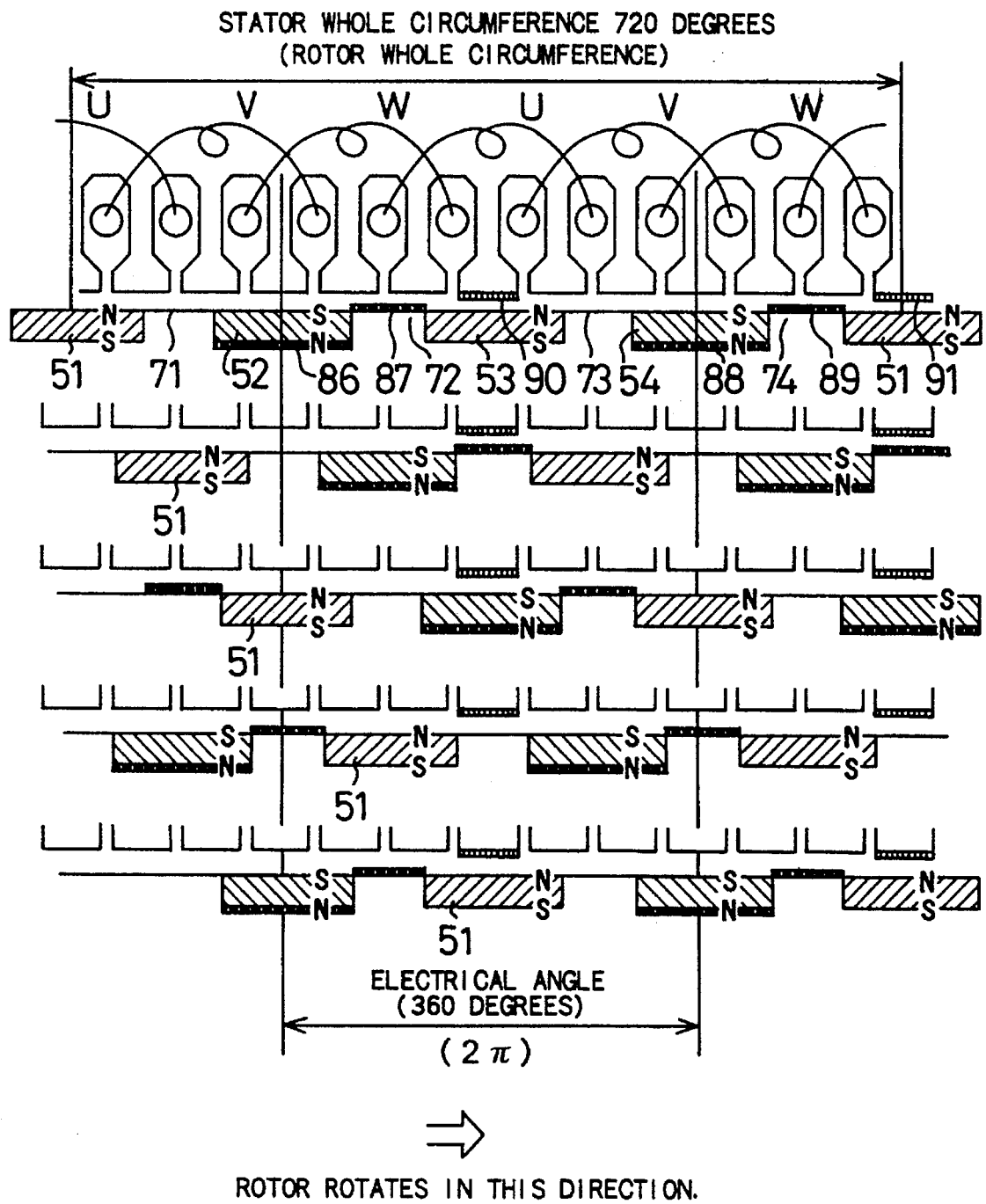
FIG. 21 illustrates the rotor 50 and the stator 30 of the three-phase synchronous motor 40 linearly.

Since the magnetic symmetry may be destroyed in any one pole-pair, the magnetic substances are applied onto the stator 30 in another preferable structure. Magnetic substances 90 and 91 in FIG. 21 show such an example. The same effects may also be realized by disposing a non-magnetic region in the middle of the magnetic path or by varying the shunt of the three-phase coil.

A third embodiment of the invention is described below. The inductance curve shows different behaviors in the range of the electrical angle of 0 through π and in the range of π through 2π. Based on this fact, the actual electrical angle is determined by separately detecting the electric currents flowing through the two phases in the first and the second embodiments. In the third embodiment, however, the electrical angle is measured in either the range of 0 through π or the range of π through 2π using the linear region shown in FIG. 20, and the actual electrical angle is specified unequivocally by determining whether the electrical angle exists in the range of 0 to π or in the range of π through 2π in additional measurement. In the description below, the symbol 'φ' represents the electrical angle specified in one of the ranges of 0 through π and π through 2π whereas the symbol 'θ' represents the electrical angle unequivocally determined in the range of 0 through 2π.

Figure 22:
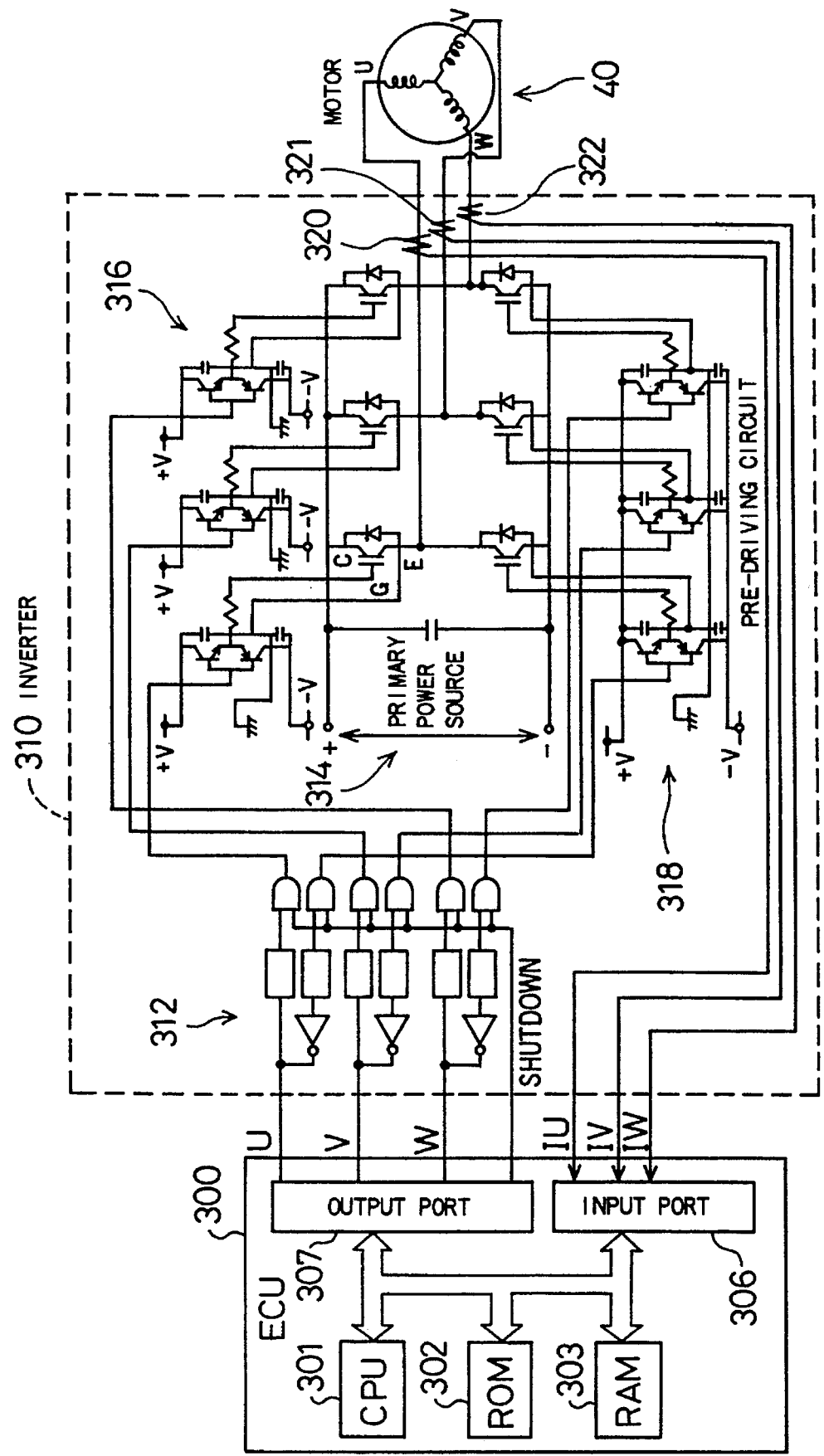
FIG. 22 is a block diagram schematically illustrating a motor control system including an electrical angle-detecting apparatus of a third embodiment according to the invention.

Structure of a synchronous motor and a motor control system is described first. FIG. 22 is a block diagram schematically illustrating a motor control system of the third embodiment. The motor control system for driving the three-phase synchronous motor 40 includes an electronic control unit (hereinafter referred to as ECU) 300 for executing a variety of operations and an inverter 310 for receiving control signals output from the ECU 300 and driving the three-phase synchronous motor 40. The ECU 300 is constructed as a known arithmetic/logic/operation circuit including a CPU 301, a ROM 302, and a RAM 303. The ECU 300 receives measurements of the respective phase currents IU, IV, and IW via an input port 306 and outputs control signals via an output port 307 to the inverter 310 to control supply of the electricity to each phase. The ECU 300 detects the electrical angle based on the phase currents IU, IV, and IW.

The inverter 310 includes an interface unit 312 functioning as an interface to the ECU 300, a primary driving circuit 314 consisting of six high-power switching transistors and directly controlling supply of electricity to each phase of the three-phase synchronous motor 40, first and second pre-driving circuits 316 and 318 for driving the primary driving circuit 314 on a source side and on a sink side, and first through third ammeters 320, 321, and 322 for detecting electric currents of the U, V, and W phases. In the drawing of FIG. 22, a primary power source for driving the three-phase synchronous motor 40 is interposed between symbols '+' and '−' whereas stabilized positive and negative power sources in the inverter 310 are respectively connected to symbols '+V' and '−V' for the purpose of control. These positive and negative power sources connect with a power circuit (not shown).

The interface unit 312 receives signals output from the ECU 300 and output required signals to the first and the second pre-driving circuits 316 and 318. The interface unit 312 specifically has a dead time generation circuit for generating a dead time to prevent a pair of transistors in the primary driving circuit 314 from being in ON state simultaneously. The interface unit 312 is also provided with a gate for blocking all signal transfer to the first and the second pre-driving circuits 316 and 318 when the ECU 300 outputs a SHUTDOWN signal.

The first and the second pre-driving circuits 316 and 318 change over the high-power switching transistors of the primary driving circuit 314 at high speed. In this embodiment, insulated gate bipolar mode transistors (IGBT) are used as the high-power switching transistors.

Figure 23:
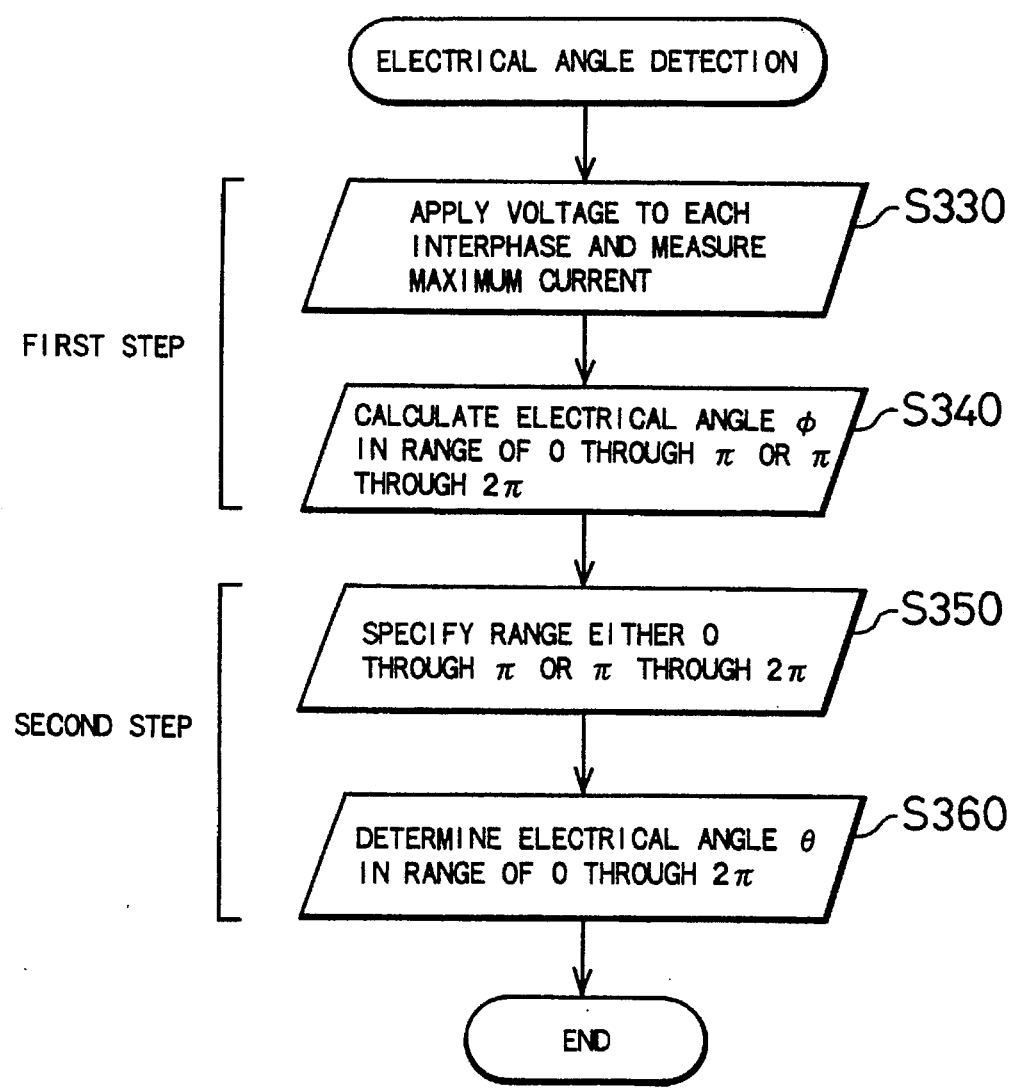
FIG. 23 is a flowchart showing an electrical angle detection routine executed in the third embodiment.

The electrical angle-detecting apparatus of the third embodiment is realized in the ECU 300, and the outline of an electrical angle detection routine executed by the ECU 300 is shown in the flowchart of FIG. 23. The electrical angle-detecting apparatus realized in the ECU 300 measures the maximum current of each phase by applying a voltage onto a specific interphase at step S330, and calculates an electrical angle φ in either the range of 0 to π or π through 2π at step S340. The program then goes to step S350 at which the range of the electrical angle is specified, that is, whether 0 through π or π through 2π. At step S360, an actual electrical angle θ is unequivocally determined in the range of 0 through 2π. The process of applying a voltage onto a specific interphase and calculating an electrical angle φ in either the range of 0 to π or π through 2π (first step) is executed independently of the process of determining the range of the electrical angle (second step). The first and the second steps are described more in detail.

<1-1: First Method for realizing First Step>

Figure 24:
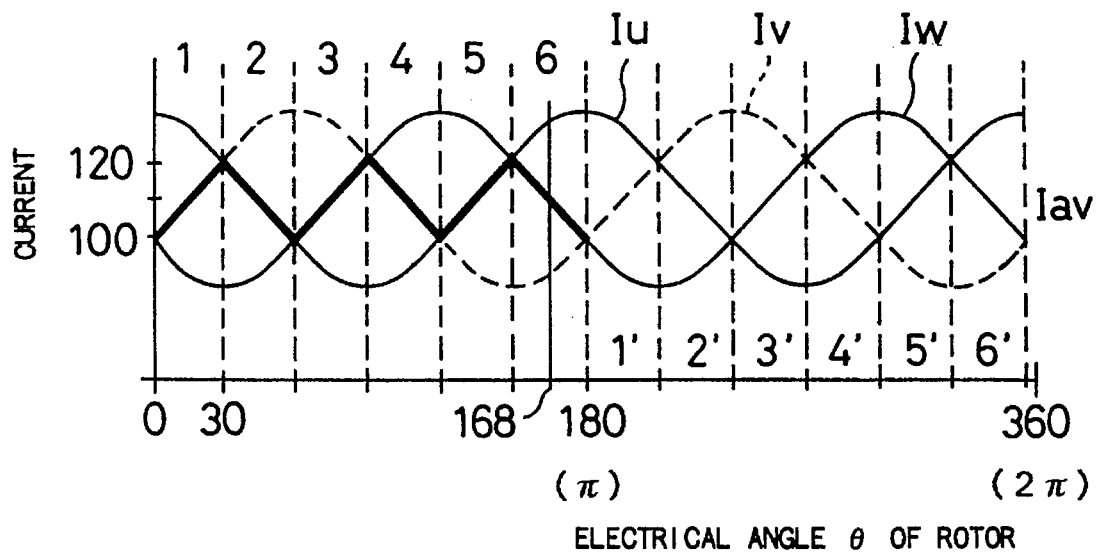
FIG. 24 is a graph showing one method of approximation for realizing the first step.

A fixed voltage is applied successively onto the respective interphases, for example, on the U-VW interphase, to an extent which does not cause magnetic saturation, and maximum currents Iu, Iv, and Iw are measured with the first through the third ammeters 320 through 322. FIG. 24 is a graph showing the maximum currents Iu, Iv, and Iw plotted against the electrical angle θ of the rotor 50. The current of each phase is shifted from the current of another phase by 120 degrees. In the range of the electrical angle of 0 through 180 degrees, the intensities of the maximum phase currents Iu, Iv, and Iw vary by every 30 degrees. Namely, there are six combinations of the intensities as follows:

| | |
|---|---|
| Area 1 (0 through 30 degrees) | Iu>Iv>Iw |
| Area 2 (30 through 60 degrees) | Iv>Iu>Iw |
| Area 3 (60 through 90 degrees) | Iv>Iw>Iu |
| Area 4 (90 through 120 degrees) | Iw>Iv>Iu |
| Area 5 (120 through 150 degrees) | Iw>Iu>Iv |
| Area 6 (150 through 180 degrees) | Iu>Iw>Iv |

Among the three maximum phase currents, the maximum phase current having an intermediate intensity in each area (for example, Iv in Area 1 and Iu in Area 2) may be approximated to a straight line. On such assumption, the electrical angle φ is expressed as:

$$\phi = (n-1) \times 30 + 15 + sgn \times (Iav - In) \times m \quad (4)$$

in which Iav, In, and m respectively represent an average of the maximum phase currents, the electric current approximated to a straight line in Area 'n', and a slope of the straight line. The symbol 'sgn' has the value '1' in odd areas and '−1' in even areas; that is, sgn=1 in Areas 1, 3, and 5 and sgn=−1 in Areas 2, 4, and 6. In Areas 1 and 4, In=Iv; in Areas 2 and 5, In=Iu; and in Areas 3 and 6, In=Iw.

In the embodiment, the total average Iav of the phase currents is equal to 110 A. When the results of the measurement are, for example, Iu=130 A, Iv=95 A, and Iw=112 A, Area 6 is specified according to the intensities of the maximum currents (Iu>Iw>Iv). The electrical angle φ is equal to 168 when n=6 and sgn=−1 are substituted in Equation (4). In the example, the actual average of the measured values is (130+95+112)/3=112.3, which is not identical with the pre-calculated average 110 A. The average of the measured values may be used for the calculation instead of the pre-calculated average 110 A. The electrical angle φ calculated with the actual average is equal to 165.

All the maximum phase currents Iu, Iv, and Iw are measured in the above example. However, when the total average Iav can be determined apparently in the control process, only Iu and Iw are measured while Iv is determined by calculation with the measured values Iu and Iw and the average Iav. In this case, one of the three ammeters 320 through 322 is not required for measurement.

<1-2: Second Method for realizing First Step>

It is known that a cosine-wave signal holds an approximate equation, θ≅(tan2θ)/2, on condition that the phase is in the vicinity of the angle '0'. The phases of the maximum interphase currents Iu, Iv, and Iw are shifted from one another by 120 degrees as described previously. The approximate equation is rewritten as:

$$\theta \cong (\tan 2\theta)/2 = \frac{\sqrt{3}\ (IB - IC)}{2\{2IA - (IB + IC)\}} = \frac{\sqrt{3}\ (IB - IC)}{6IA} \quad (5)$$

in which IA represents a deviation of an interphase current having an extreme value at the phase substantially equal to zero degree from an average, and IB and IC respectively denote deviations of other interphase currents from the average. While one interphase current has an extreme value, the deviations of the other two interphase currents from the average have an identical sign ('+' or '−'). Signs of the deviations ΔIu, ΔIv, and ΔIw from the average Iav of the interphase currents Iu, Iv, and Iw are shown in TABLE 1 according to areas:

TABLE 1

| Areas | ΔIu | ΔIv | ΔIw |
|---|---|---|---|
| Area 1a (−15 to 15 degrees) | positive (extreme value) | negative | negative |
| Area 2a (15 to 45 degrees) | positive | positive | negative (extreme value) |
| Area 3a (45 to 75 degrees) | negative | positive (extreme value) | negative |
| Area 4a (75 to 105 degrees) | negative (extreme value) | positive | positive |
| Area 5a (105 to 135 degrees) | negative | negative | positive (extreme value) |
| Area 6a (135 to 165 degrees) | positive | negative (extreme value) | positive |

Figure 25:
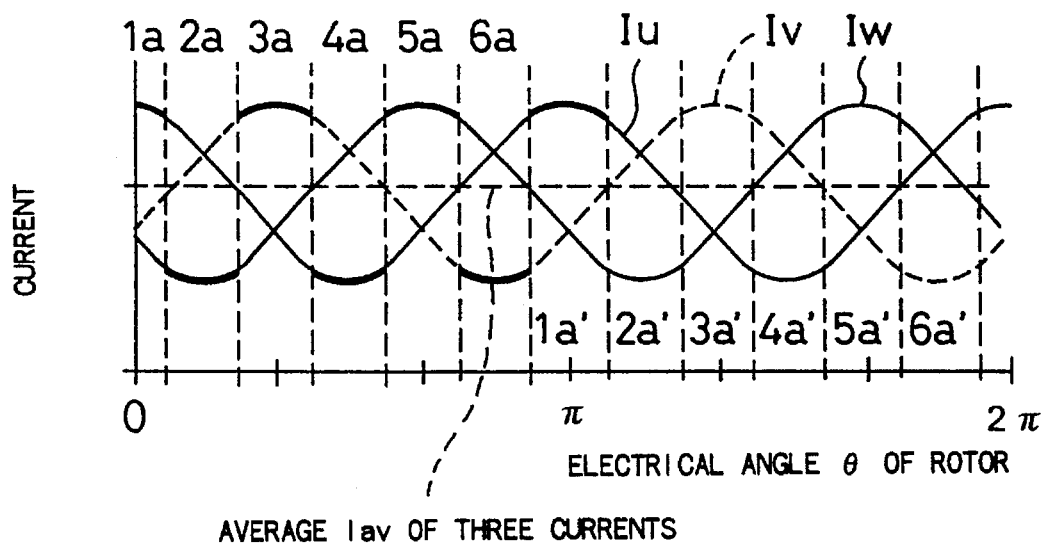
FIG. 25 is a graph showing another method of approximation for realizing the first step.

In this example, the angle starting from −15 degrees is divided into Areas 1a through 6a each having 30 degrees as shown in FIG. 25. Portions used for the approximation in the respective areas are shown by thick lines in FIG. 25.

The electrical angle φ is determined by substituting the deviations ΔIu, ΔIv, and ΔIw in Equation (5) in each of the six areas. Since Equation (5) is approximate at the phase in the vicinity of zero degree, 30×(n−1) degrees should be added to every area 'n'. Approximate equations for the respective areas are given below with the definitions of A=ΔIv−ΔIw, B=ΔIu−ΔIv, and C=ΔIw−ΔIu:

| Areas | Approximation |
|---|---|
| 1a | $\sqrt{3}\ A/6\Delta Iu$ |
| 2a | $30 + \sqrt{3}\ B/6\Delta Iw$ |
| 3a | $60 + \sqrt{3}\ C/6\Delta Iv$ |
| 4a | $90 + \sqrt{3}\ A/6\Delta Iu$ |
| 5a | $120 + \sqrt{3}\ B/6\Delta Iw$ |
| 6a | $150 + \sqrt{3}\ C/6\Delta Iv$ |

The electrical angle φ is determined by executing the operation of the first step according to this method.

Figure 26:
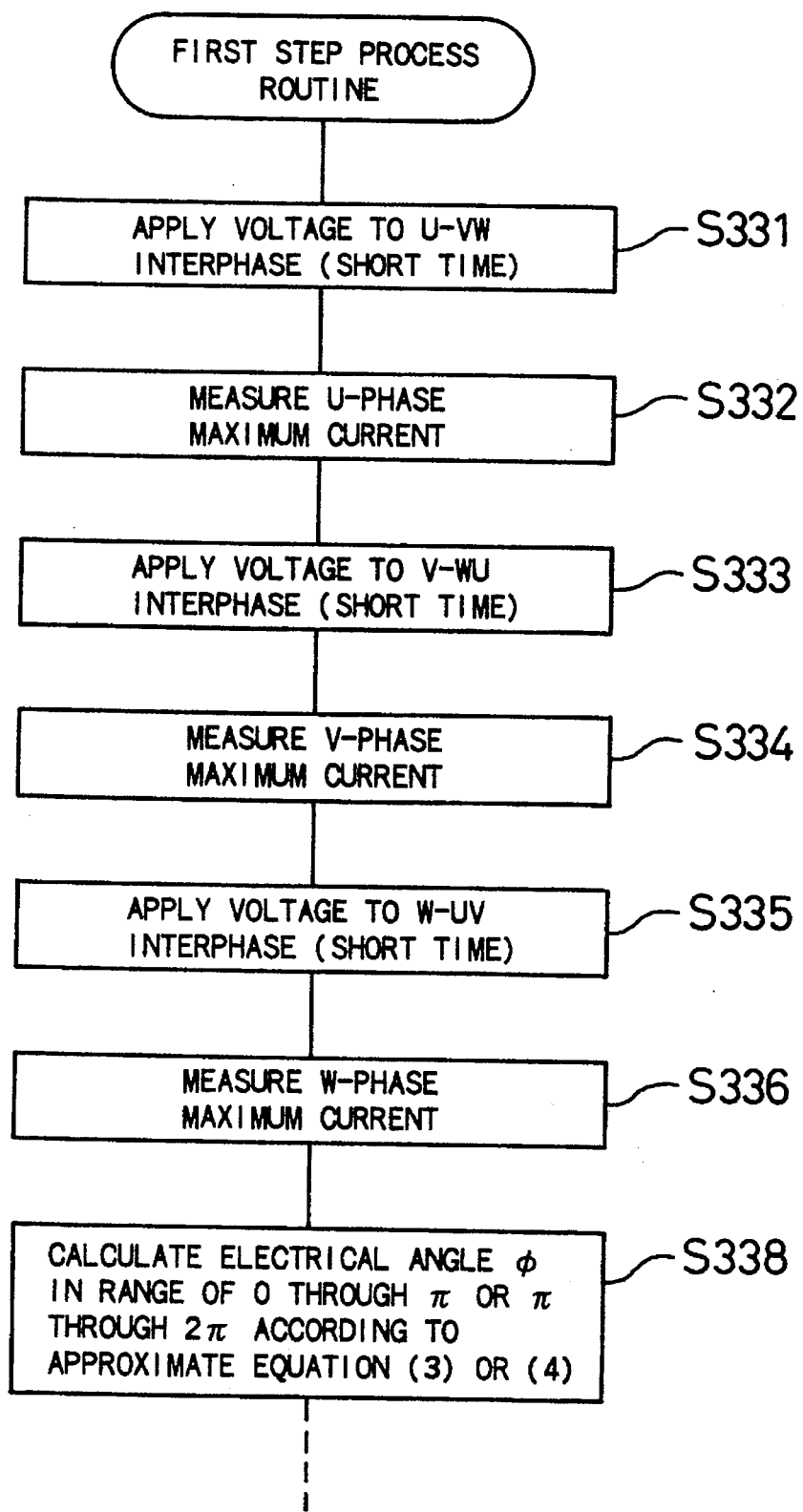
FIG. 26 is a flowchart showing details of the processing executed at the first step.

Compared with the above method 1-1, the method 1-2 requiring some subtraction consumes a little more time for the operation but is not easily affected by the varying properties of the three-phase synchronous motor 40 and does not require measurement of each parameter. FIG. 26 is a flowchart showing the operation executed by the ECU 300. When the program enters the routine, a predetermined voltage is applied onto the U-VW interphase for a short time period at step S331. The intensity of the applied voltage and its application period are determined not to cause magnetic saturation. At step S332, the ECU 300 measures the maximum current Iu flowing through the U phase while the predetermined voltage is applied onto the U-VW interphase. This process is repeated for the V-WU interphase and the W-UV interphase (steps S333 through S336).

The program then proceeds to step S338 at which the electrical angle φ is determined in the range of 0 through π (180 degrees) or in the range of π through 2π (360 degrees) by substituting the maximum currents Iu, Iv, and Iw thus obtained into Equation (4) or Equation (5). Although all the maximum interphase currents Iu, Iv, and Iw are measured in this routine, one maximum current may be determined by calculation while the other two maximum currents are measured upon condition that the average Iav of all the currents is specified independently.

At the first step described above, the electrical angle φ is calculated in the range of 0 to π (180 degrees) or in the range of π through 2π (360 degrees). This process, however, does not determine the electrical angle of the rotor 50 unequivocally. The further processing (second step) is thus required to specify the electrical angle unequivocally. Examples of possible methods for realizing the second step are given below.

<2-1: First Method for Realizing Second Step>

Figure 27:
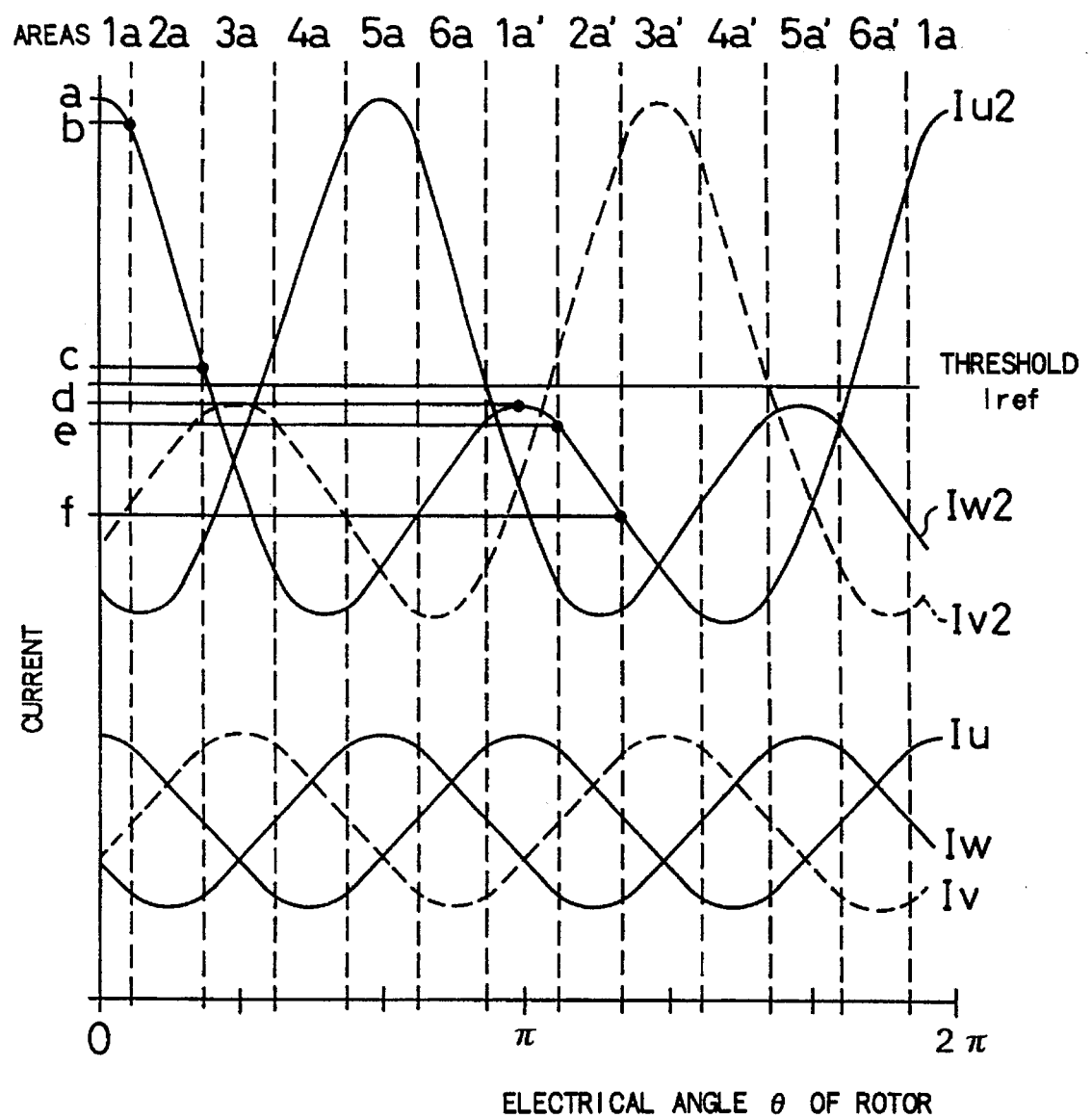
FIG. 27 is a graph showing a first method for realizing the second step.

At the first step described above, the voltage applied onto the interphase coil is limited to have a magnetic flux which does not cause magnetic saturation. At the second step, it is determined whether the electrical angle φ calculated at the first step exists in the range of 0 to π (180 degrees) or in the range of π through 2π (360 degrees), that is, in Areas 1a, 2a, 3a, 4a, 5a, and 6a or in Areas 1a', 2a', 3a', 4a', 5a', and 6a' shown in FIG. 25 (alternatively, Areas 1 through 6 or in Areas 1' through 6' shown in FIG. 24), by taking advantage of asymmetrical property due to magnetic saturation. When a voltage causing magnetic saturation is applied, a maximum current Iu2 flowing through the U-VW interphase shows different behaviors in Areas 1a through 6a and in Areas 1a' through 6a' as shown in FIG. 27. It is assumed that the electrical angle φ is determined to exist either in Area 1a of −15 through 15 degrees or in Area 1a' of 165 through 195 degrees according to the method 1-2 of the first step. Specification of the area, either Area 1a or Area 1a', allows the actual electrical angle θ to be unequivocally determined in the range of 0 through 2π.

The maximum current Iu2 corresponding to the applied voltage causing magnetic saturation ranges between 'a' and 'b' in Area 1a and between 'd' and 'e' in Area 1a'. A threshold value Iref is accordingly set between 'b' and 'd' to determine whether the electrical angle φ is in Area 1a or Area 1a' based on the comparison of the maximum current Iu2 with the threshold value Iref. In the same manner, the maximum current Iu2 ranges between 'b' and 'c' in Area 2a and between 'e' and 'f' in Area 2a'. The threshold value Iref is accordingly set between 'c' and 'e' for specification of the area.

A possible range of the maximum current Iu2 in Area 3a overlaps the same in Area 3a', so that Area 3a is not distinguishable from Area 3a'. In this case, a maximum current Iv2 under application of a voltage onto the V-WU interphase is used for specification of the area. Since the maximum current Iv2 in Areas 3a, 3a', 4a, and 4a' shows similar behaviors to those of the maximum current Iu2 in Areas 1a, 1a', 2a, and 2a', the same threshold value Iref can be used for distinction between Area 3a and Area 3a' and between Area 4a and Area 4a'. A maximum current Iw2 is used for specification of Areas 5a, 5a', 6a, and 6a' in the same manner as above. The threshold value Iref used here is previously determined according to the values 'b', 'c', 'd', and 'e' of electric current measured.

Figure 28:
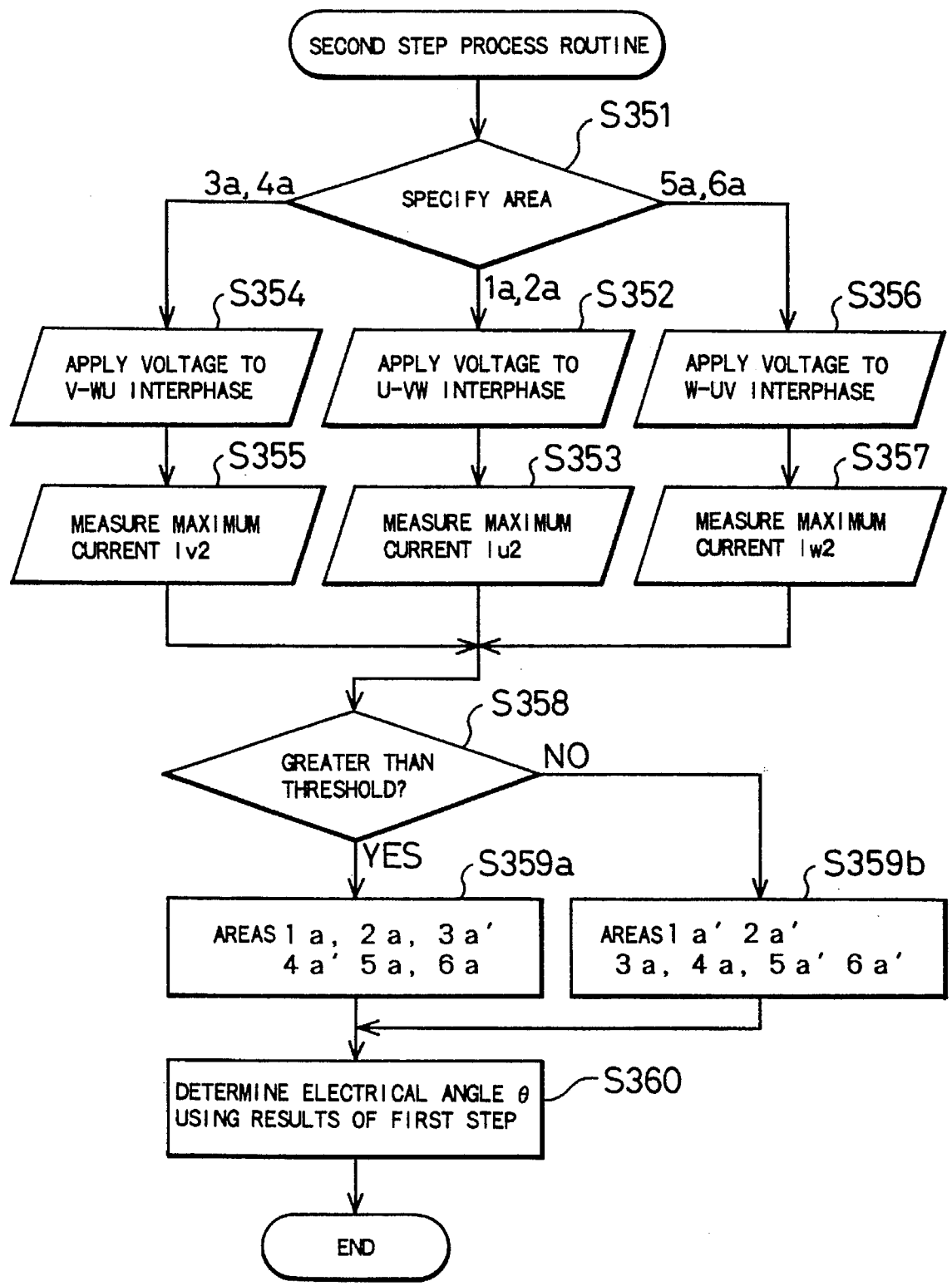
FIG. 28 is a flowchart showing details of the processing executed at the second step according to the first method.

FIG. 28 is a flowchart showing details of the processing executed by the ECU 300 for realizing the second step (steps S350 and S360 in the flowchart of FIG. 23) according to the first method described above. The routine of FIG. 28 is executed after the first step. When the program enters the routine, the area to be distinguished is selected among Areas 1a through 6a at step S351. For distinction between Areas 1a and 1a' or between Areas 2a and 2a', the program goes to step S352 at which a voltage in a range of magnetic saturation is applied onto the U-VW interphase, and to step S353 at which the maximum current Iu2 is measured. For distinction between Areas 3a and 3a' or between Areas 4a and 4a', the program goes to step S354 at which a voltage in a range of magnetic saturation is applied onto the V-WU interphase, and to step S355 at which the maximum current Iv2 is measured. For distinction between Areas 5a and 5a' or between Areas 6a and 6a', the program goes to step S356 at which a voltage in a range of magnetic saturation is applied onto the W-UV interphase, and to step S357 at which the maximum current Iw2 is measured.

At step S358, the maximum current measured is compared with the threshold value Iref. When the maximum current is greater than the threshold value Iref, the program goes to step S359a at which the area is specified to be one of Areas 1a, 2a, 3'a, 4'a, 5a, and 6a. When the maximum current is smaller than the threshold value Iref, on the contrary, the program goes to step S359b at which the area is specified to be one of Areas 1a', 2a', 3a, 4a, 5a', and 6a'. After specification of the area where the electrical angle φ exists, the program proceeds to step S360 at which the electrical angle θ is unequivocally determined according to the specification and the value of the electrical angle φ calculated at the first step.

Combination of the method 1-1 or 1-2 and the method 2-1 in the third embodiment first calculates the electrical angle either in the range of 0 through π or in the range of π through 2π with an electric current causing no magnetic saturation and then specifies the unequivocal electrical angle θ with a strong electric current. This method allows the electrical angle θ of the three-phase synchronous motor 40 to be determined readily at high precision even in the inactivated state of the rotor 50. This method flows the strong electric current through the three-phase synchronous motor 40 only once, thereby preventing untimely deterioration of the motor 40. The noise generated by the flow of strong electric current is also limited to only once in every measurement of the electrical angle.

<2-2: Second Method for Realizing Second Step>

Figure 29:
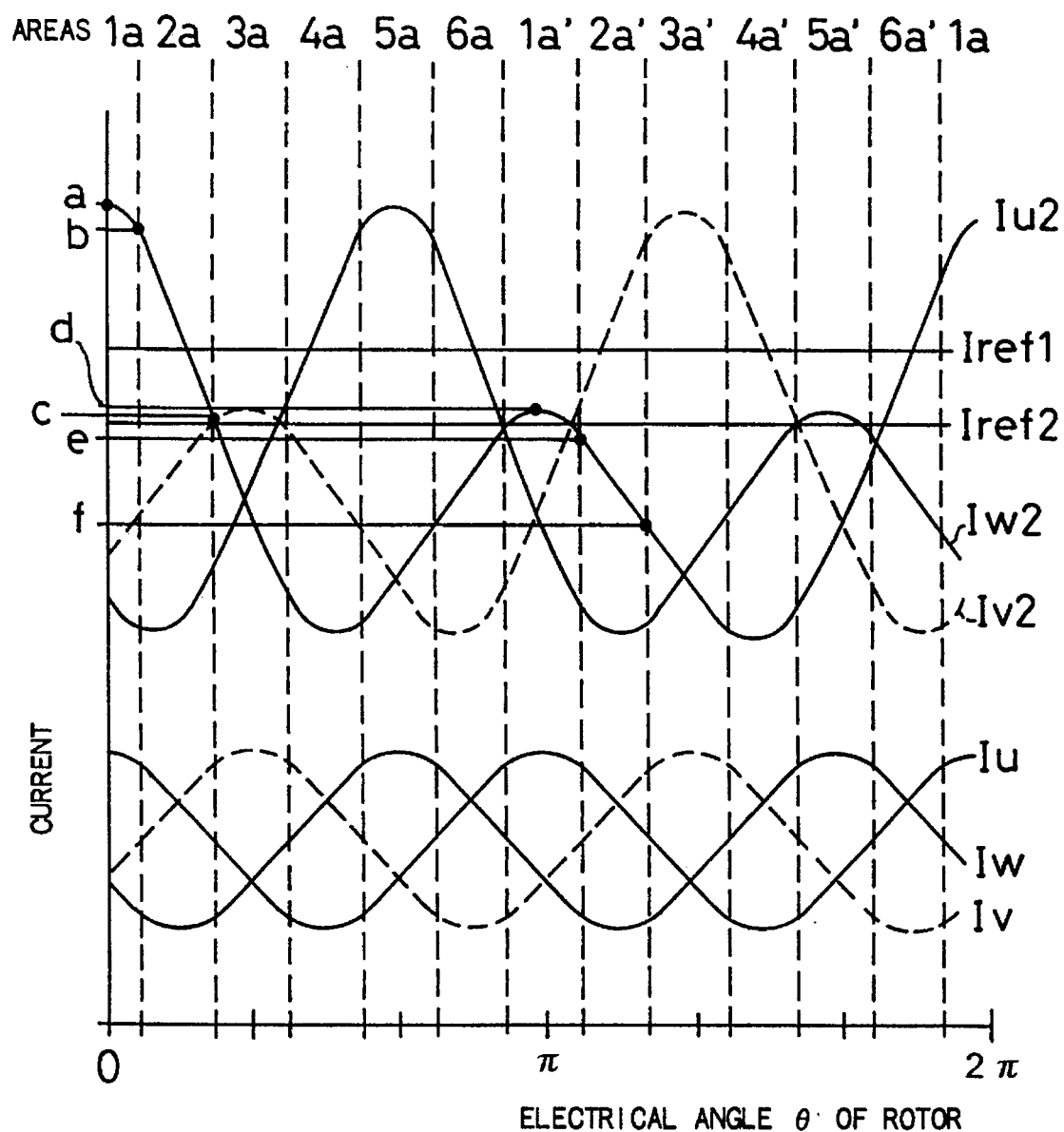
FIG. 29 is a graph showing a second method for realizing the second step.

Another method of specifying the area where the electrical angle φ exists is described briefly. In the above method 2-1, the same threshold value Iref is used for distinction between Areas 1a and 1a' and between 2a and 2a' (and also for Areas 3a and 4a and Areas 5a and 6a). In this case, the minimum point 'c' of the electric current Iu2 in Area 2a should be greater than the maximum point 'd' in Area 1a' and for that purpose, a relatively large current is flown between the specific phases. In the method 2-2, however, different threshold values are used in odd Areas 1a, 3a, and 5a and even Areas 2a, 4a, and 6a. A first threshold value Iref1 used in the odd areas should satisfy b>Iref1>d while a second threshold value Iref2 used in the even areas should satisfy c>Iref2>e. The method does not require the relation of 'c>d' and can thus reduce the interphase current in the range of magnetic saturation as shown in FIG. 29, thereby reducing the noise due to the flow of electric current while a pulse voltage is applied onto the interphase coil. This method can also reduce the possibility of magnetic erasion of the permanent magnets 51 through 54 and the possibility of electromagnetic faults and troubles generated in application of the pulse voltage.

<2-3: Third Method for Realizing Second Step>

Figure 30:
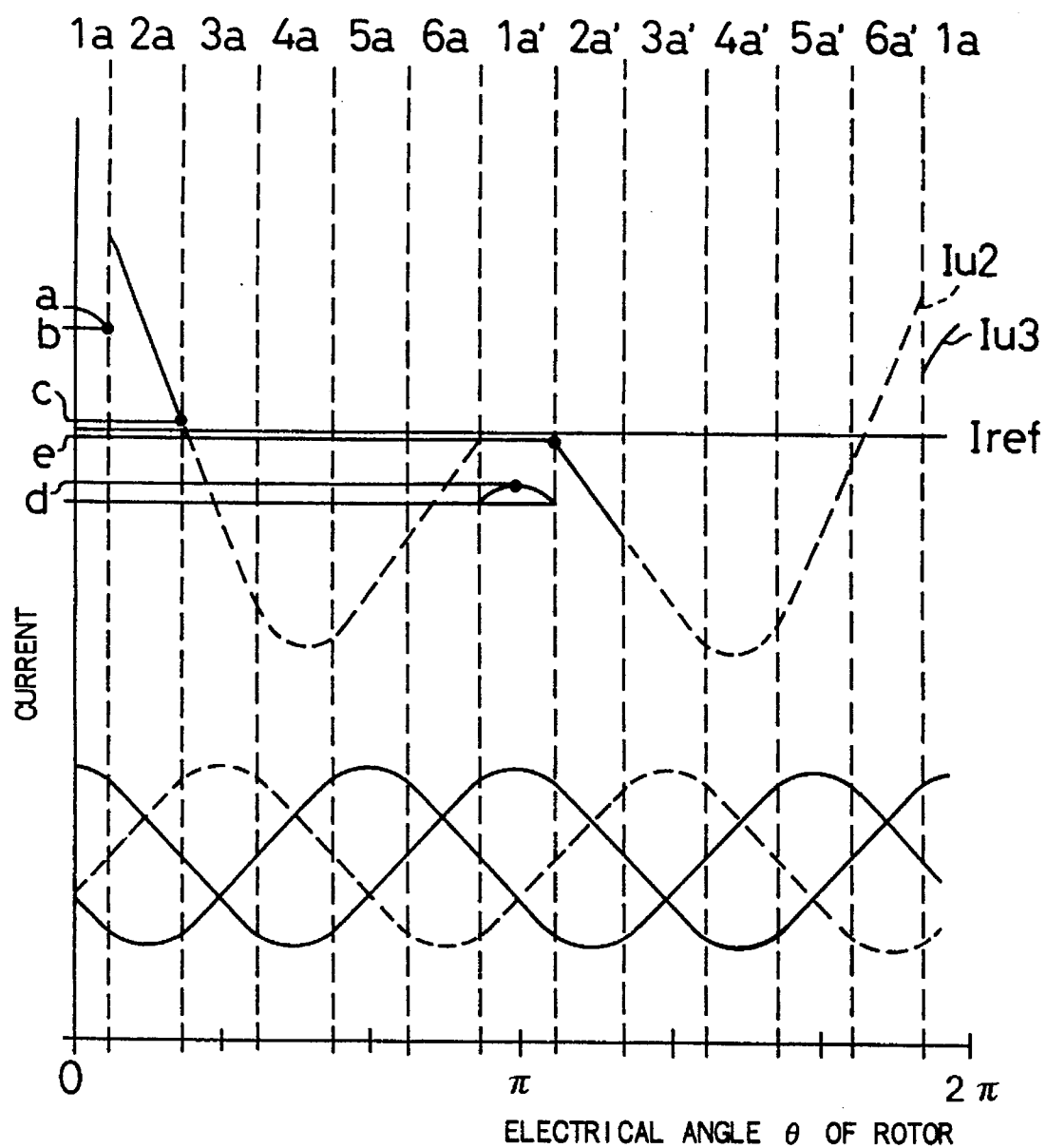
FIG. 30 is a graph showing a third method for realizing the second step.

A method in which the electric current used for the area specification can be reduced further is examined. Since the minimum point 'b' of the maximum current Iu2 in Area 1a is distinct from the maximum point 'd' of the maximum current Iu2 in Area 1a' as shown in FIGS. 27 and 29, Area 1a can be distinguished clearly from Area 1a' with a maximum current Iu3 (see FIG. 30) measured under application of a significantly reduced voltage or for a significantly shortened time period. For distinction between Area 2a and 2a', on the other hand, a relatively large current is required to satisfy the relation of 'c>e'. In this method 2-3, an application period in which a certain voltage in applied is thus varied according to the areas. The application period is shortened for distinction of odd Areas 1a, 3a, and 5a and is kept at a normal level for distinction of even Areas 2a, 4a, and 6a. This method can lower the maximum of electric current flowing through the interphase coil, thereby further reducing the possibility of noise generation, magnetic erasion, and electromagnetic faults and troubles. In the three-phase synchronous motor 40, when a large electric current is flown while the rotor 50 is positioned in Area 1a, magnetism of the corresponding one of the permanent magnets 51 through 54 is specifically erased. The flow of small electric current is thus preferable in Area 1a to reduce the possibility magnetic erasion. The method 2-3 requires only one threshold value Iref whereas the method 2-2 requires two threshold values. For distinction between Areas 3a and 3a' and between Areas 4a and 4a', a voltage is applied onto the V-WU interphase and a maximum current Iv3 is measured. In a similar manner, for distinction between Areas 5a and 5a' and between Areas 6a and 6a', a voltage is applied onto the W-UV interphase and a maximum current IW3 is measured.

<2-4: Third Method for Realizing Second Step>

Figure 31:
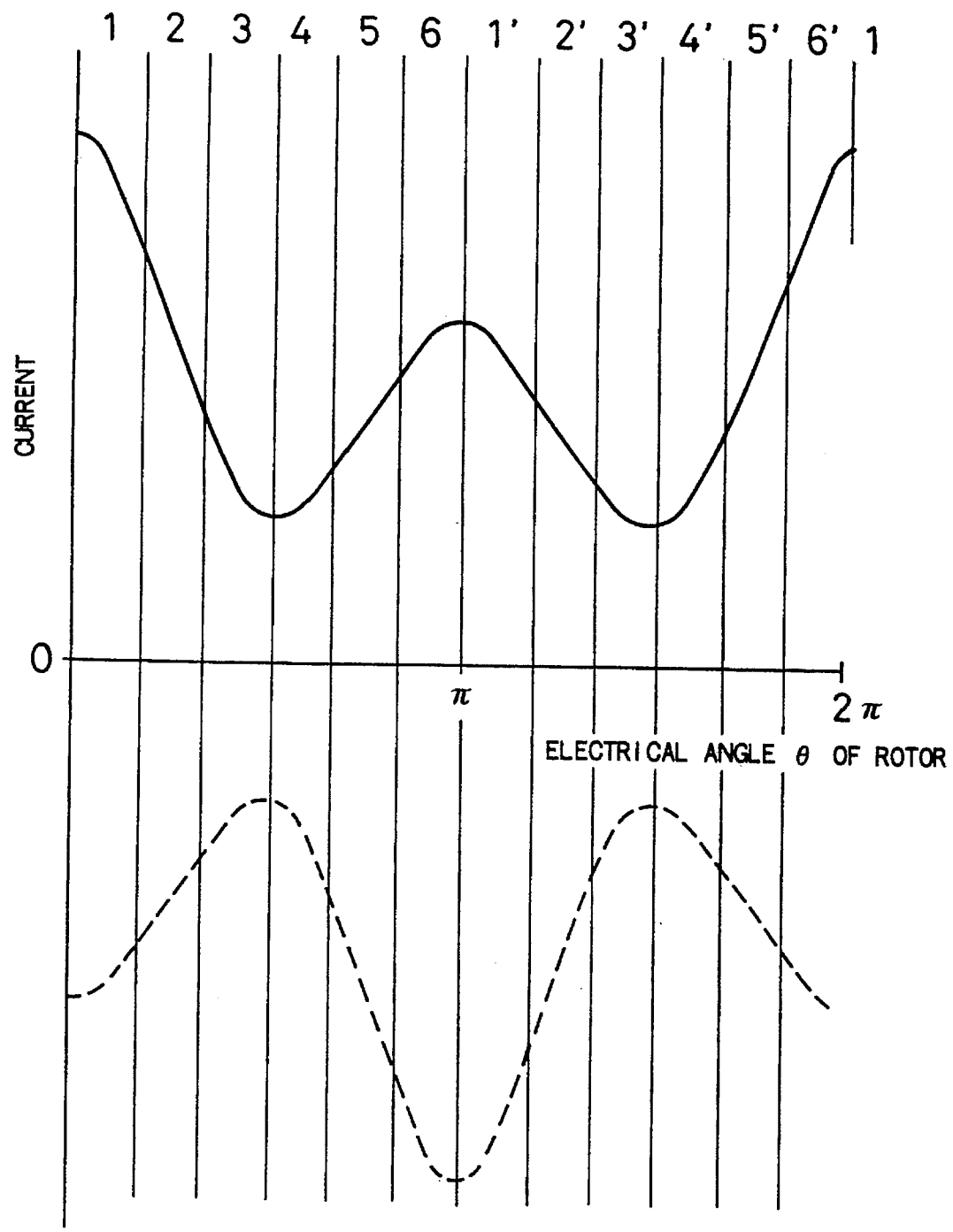
FIG. 31 is a graph showing a fourth method for realizing the second step.
Figure 32:
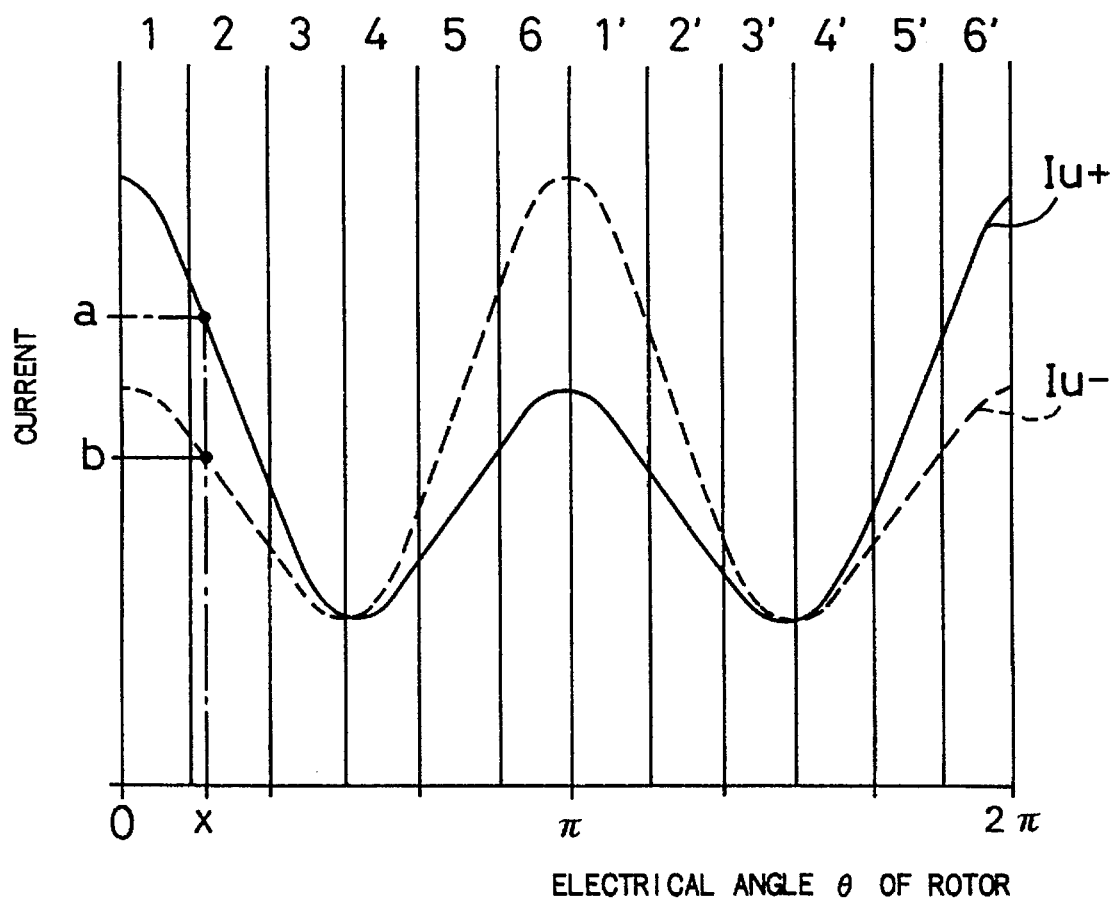
FIG. 32 is a graph showing the maximum currents Iu+ and Iu−.
Figure 33:
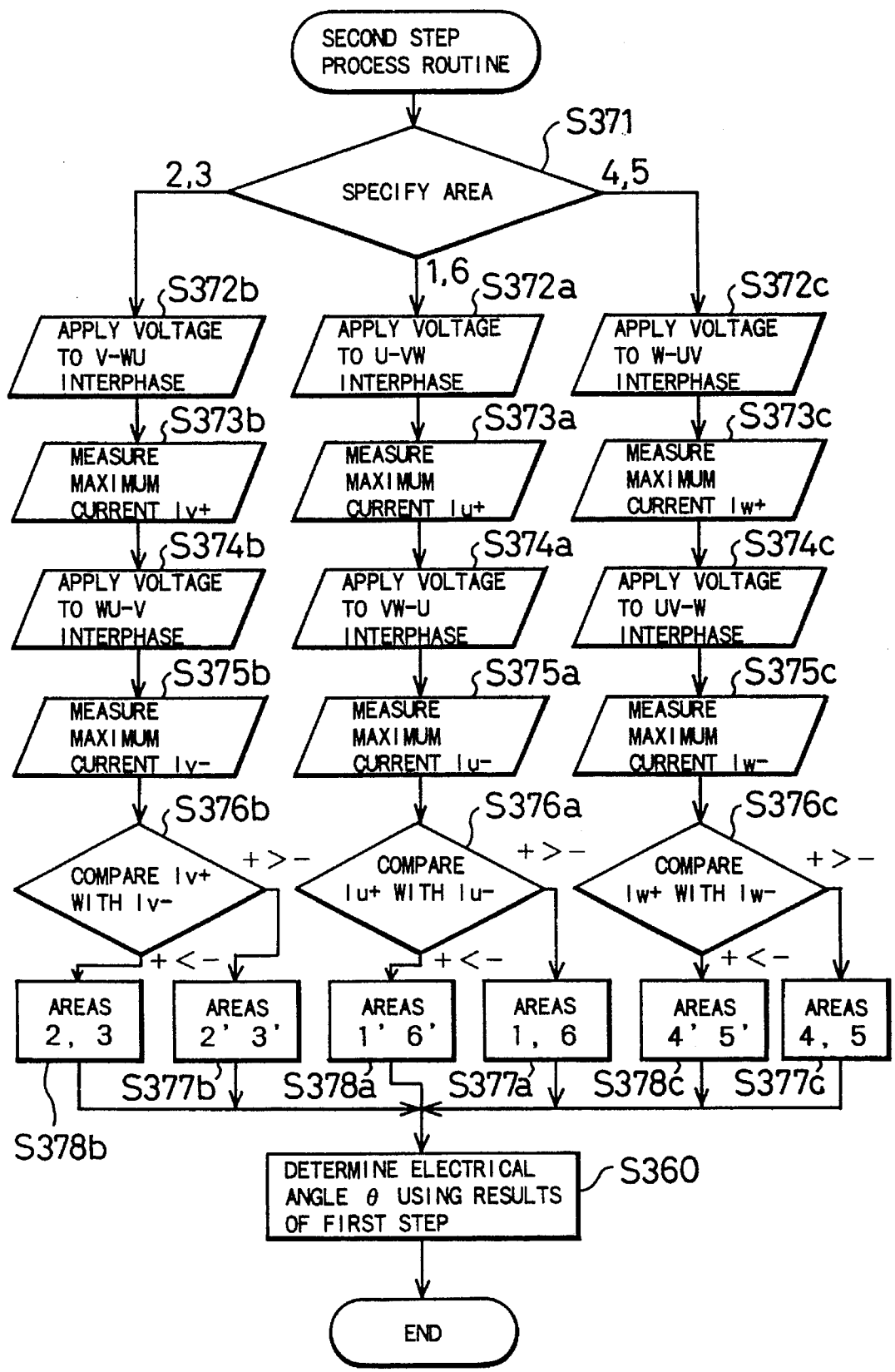
FIG. 33 is a flowchart showing details of the processing executed at the second step according to the fourth method.

The upper graph of FIG. 31 shows an example of measurement of a maximum current Iu+ upon condition that a fixed voltage is applied onto the U-VW interphase for a predetermined time period where the U phase is positive and the V phase and the W phase are negative. The lower graph of FIG. 31 shows a maximum current Iu– where the U phase is negative and the V phase and the W phase are positive. The maximum current Iu– with reverse polarity is drawn with the maximum current Iu+ in the graph of FIG. 32. Among Areas 1 through 6 and 1' through 6' specified in the method 1-1 of the first step, the absolute value of the maximum current Iu+ is greater than the absolute value of the maximum current Iu– in Areas 1 through 3 and 4' through 6' and is less than the absolute value of the maximum current Iu– in Areas 4 through 6 and 1' through 3'. Measurement of both the maximum currents Iu+ and Iu– results in distinction between Area 1 and Area 1' (between Area 2 and Areas 2' and so on). FIG. 33 is a flowchart showing details of the processing executed according to the method 2-4. Areas can be specified only with the maximum currents Iu+ and Iu– flowing through the U-VW interphase in principle. Change of the phase current according to the areas can reduce the current flowing between the phases. A difference between the maximum currents Iu+ and Iu– is sufficiently large in Areas 1 and 6 as clearly seen in FIG. 32. The current flowing through the U-VW interphase is thus utilized for distinction of Areas 1 and 6, the current through the V-WU interphase for Areas 2 and 3, and the current through the W-UV interphase for Areas 4 and 5.

When the program enters the routine of FIG. 33, the area to be distinguished is selected among Areas 1 through 6 at step S371. For distinction between Areas 1 and 1' or between Areas 2 and 2', the program goes to step S372a at which a voltage is applied onto the U-VW interphase where the U phase is positive and the V phase and the W phase are negative. After a maximum current Iu+ is measured at step S373a, the voltage applied is inverted, that is, a voltage is applied onto the VW-U interphase, at step S374a and a maximum current Iu– is measured at step S375a. The absolute value of the maximum current Iu+ is then compared with the absolute value of the maximum current Iu– at step S376a. When |Iu+| is greater than |Iu–|, the area is determined to be either Area 1 or Area 6 at step S377a. When |Iu+| is smaller than |Iu–|, on the contrary, the area is determined to be either Area 1' or Area 6' at step S378a. Since there is a large difference between the maximum currents Iu+ and Iu– in these areas, a flow of relatively small current is sufficient for distinction of areas.

In a similar manner, for distinction between Area 2 and Area 2' or between Area 3 and Area 3', a voltage is applied onto the V-WU interphase and onto the WU-V interphase and maximum currents Iv+ and Iv– are measured (steps S372b through S375b). The absolute value of the maximum current Iv+ is then compared with the absolute value of the maximum current Iv– at step S376b. The area is specified to be either Area 2' or Area 3' when |Iv+|>|Iv–| (step S377b) and specified as Area 2 or Area 3 when |Iv+|<|Iv–| (step S378b). For distinction between Area 4 and Area 4' or between Area 5 and Area 5', a voltage is applied onto the W-UV interphase and onto the UV-W interphase and maximum currents Iw+ and Iw– are measured (steps S372c through S375c). The absolute value of the maximum current Iw+ is then compared with the absolute value of the maximum current Iw– at step S376c. The area is specified to be either Area 4 or Area 5 when Iw+>Iw– (step S377c) and specified as Area 4' or Area 5' when Iw+<Iw– (step S378c). In any case, the electrical angle θ is unequivocally determined in the range of 0 through 2π according to the specification and the value of the electrical angle φ calculated at the first step (step S360).

The method 2-4 applies negative and positive voltages onto specific interphases and distinguishes Area 1 through Area 6 from Area 1' through Area 6' based on the comparison between the absolute values of the maximum currents. This method does not require specification of any threshold value or highly-accurate control of the applied voltage or the application period. The electric current flowing through each interphase does not require a large intensity for the comparison, thereby preventing undesirable noise and reducing magnetic erasion and electromagnetic troubles and faults. For the identical three-phase synchronous motor 40, the flow of electric current used for detection of the electrical angle by the method 2-4 is approximately two thirds that by the method 2-3. Although the electrical angle is divided into the areas of 0 through 30 degrees, 30 through 60 degrees, and so on in this method, Areas 1a (–15 through 15 degrees), 2a (15 through 45 degrees) through 6a used in the method 1-2 may also be application to this method. Application of a favorable method of area division according to the approximate calculation at the first step preferably simplifies the whole algorithm. The area division at the fist step may be different from that at the second step.

Figure 34:
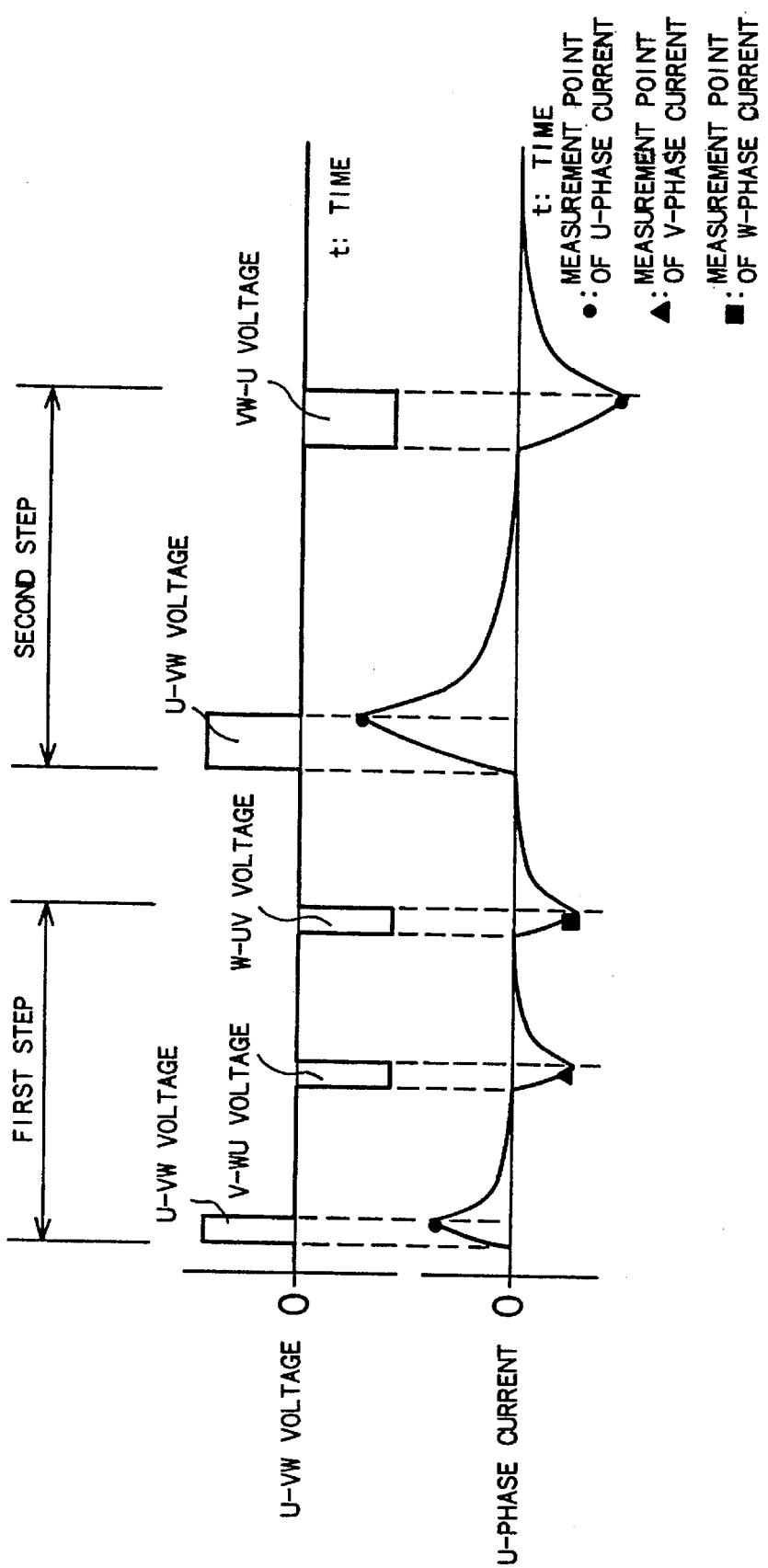
FIG. 34 is a graph showing the processing of the first step and the second step on the time axis.

In the third embodiment, detection of the electrical angle is implemented by the first step and the second step. There are a plurality of possible methods for each step as described previously. These methods of the first step and the second step can be combined arbitrarily. FIG. 34 shows the processing of the first step and the second step on the time axis in combination of the method 1-1 and the method 2-4. At the first step, a fixed voltage is applied successively onto the respective interphases and maximum currents are measured for the U, V, and W phases. After the current flowing through a certain phase drops to a negligible level for measurement, the fixed voltage is applied to a subsequent interphase for measurement of the maximum current of a subsequent phase. Since the flow of electric current at the second step is greater than the flow of electric current at the first step, a considerable time period is required between application of a voltage to a certain interphase and that to a subsequent interphase. One measurement cycle of the electrical angle is completed at the time point when the processing of the first step and the second step are concluded on the time axis of FIG. 34. The electrical angle at the start of the three-phase synchronous motor 40 is determined according to this process while the motor 40 is under inactivating conditions.

Figure 35:
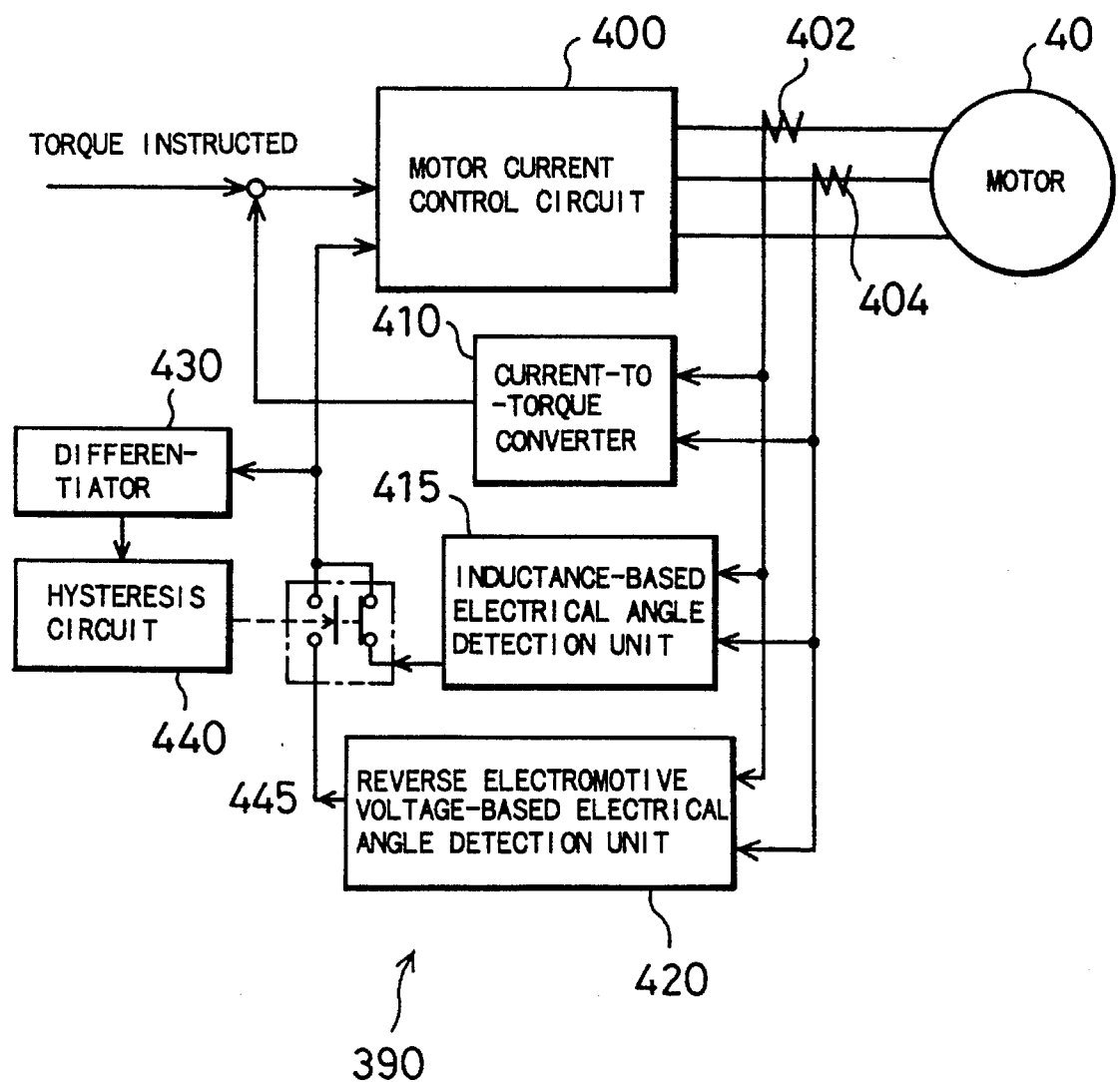
FIG. 35 is a block diagram schematically illustrating a motor control system 390 of a fourth embodiment according to the invention.

A motor control system 390 including an electrical angle-detecting apparatus of a fourth embodiment according to the invention is shown schematically in the block diagram of FIG. 35. The motor control system 390 includes a motor current control circuit 400 for controlling a driving current of the three-phase synchronous motor 40, first and second ammeters 402 and 404 for detecting U-phase and V-phase currents, and a current-to-torque converter 410 for converting the currents thus detected to output torques of the synchronous motor 40 like the first through the third embodiments. The motor control system 390 further includes an inductance-based electrical angle detection unit 415 for determining the electrical angle by taking advantage of an inductance as described in the second embodiment, a reverse electromotive voltage-based electrical angle detection unit 420 for determining the electrical angle by taking advantage of a reverse electromotive voltage, a differentiator 430 for differentiating the electrical angle, and a hysteresis circuit 440 for calculating the speed of rotation based on a signal of the electrical angle and adding a hysteresis to the speed of rotation to drive a changeover contact 445. Although only the first and the second ammeters 402 and 404 for detecting the U-phase current and the V-phase current are illustrated in FIG. 34, a third ammeter for detecting the W-phase current may also be included in the motor control system 390 when detection of the U-phase, V-phase, and W-phase currents are required as explained in the third embodiment.

Figure 36:
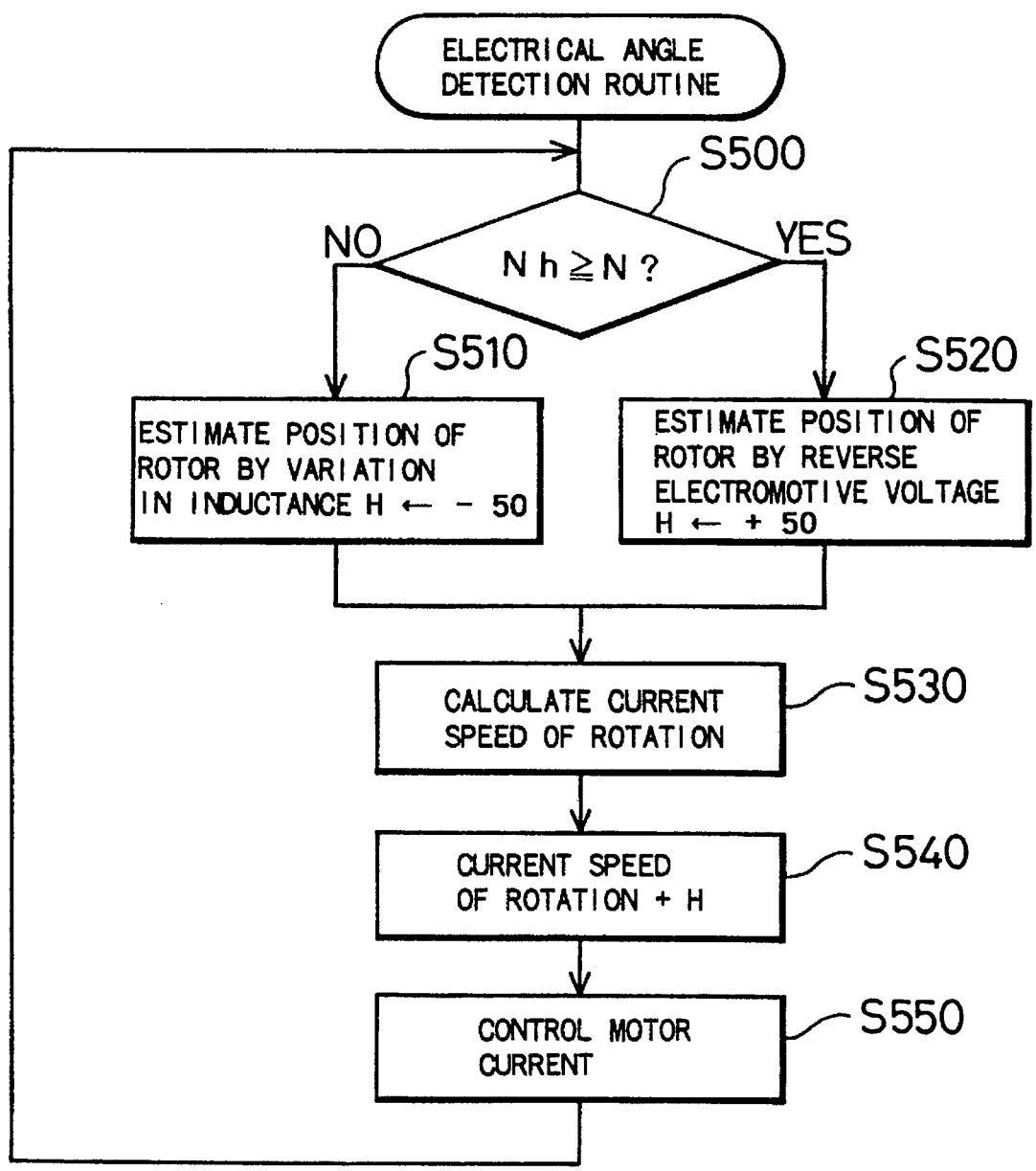
FIG. 36 is a flowchart showing an electrical angle detection routine executed in the fourth embodiment.

The inductance-based electrical angle detection unit 415, the reverse electromotive voltage-based electrical angle detection unit 420, the hysteresis circuit 440, and the motor current control circuit 400 are actually constructed as an arithmetic/logic/operation circuit with a microprocessor and executes an electrical angle detection routine shown in the flowchart of FIG. 36. When the program enters the routine, a speed of rotation Nh calculated is compared with a reference rotating speed N at step S500. When the calculated speed of rotation Nh is less than the reference rotating speed N, the program goes to step S510 at which the position of the rotor or the electrical angle is estimated with the inductance-based electrical angle detection unit 415 and the value '−50' is substituted in a variable H.

When the calculated speed of rotation Nh is equal to or greater than the reference rotating speed N, on the contrary, the program goes to step S520 at which the position of the rotor or the electrical angle is estimated with the reverse electromotive voltage-based electrical angle detection unit 420 and the value '+50' is substituted in the variable H. After the processing at step S510 or S520, the program goes to step S530 at which a current speed of rotation is determined by differentiating the current electrical angle. The differential process may be realized by hardware structure or alternatively by software as a variation in the signal of the electrical angle for a fixed time period. At step S540, the calculated speed of rotation Nh is updated by adding the variable H to the current speed of rotation determined at step S530. The program then proceeds to step S550 at which the electric current flowing through each phase of the three-phase synchronous motor 40 is controlled based on the electrical angle and a torque level separately instructed. The processing at steps S500 through S550 is continuously repeated.

Figure 37:
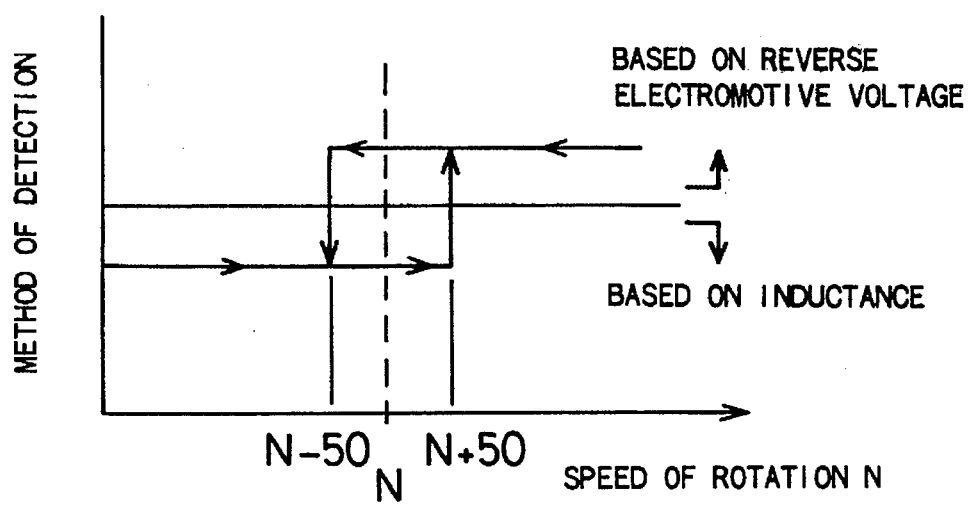
FIG. 37 shows changeover of detection methods according to the speed of rotation.

The structure of the fourth embodiment determines the electrical angle by changing the method of detection based on the speed of rotation of the three-phase synchronous motor 40. FIG. 37 shows a changeover process of the detection methods. Once the speed of rotation of the three-phase synchronous motor 40 exceeds N+50 (N: reference rotating speed), the reverse electromotive voltage-based detection is applied in place of the inductance-based detection. The inductance-based detection is not resumed until the speed of rotation of the synchronous motor 40 becomes lower than N−50. This means that a hysteresis of ±50 is set for changeover of the detection methods of the electrical angle. The hysteresis prevents the detection method from being changed too frequently in the vicinity of the reference rotating speed.

Figure 38:
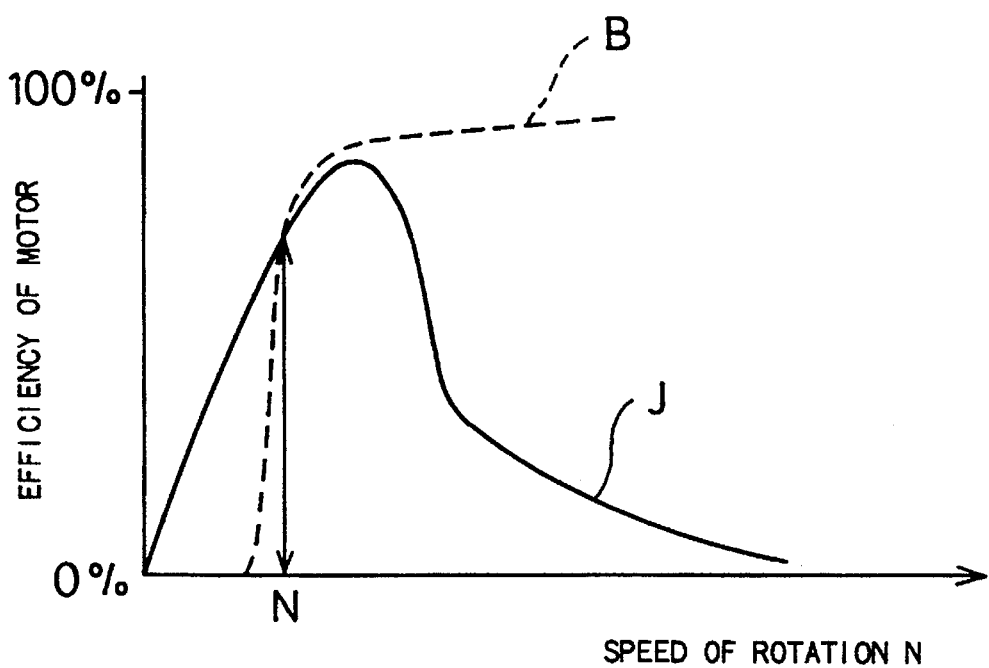
FIG. 38 is a graph showing the motor efficiency plotted against the speed of rotation.

The method of detecting the electrical angle is changed according to the speed of rotation of the three-phase synchronous motor 40 because the variation in the motor efficiency based on the speed of rotation differs according to the detection method. An efficiency curve in the inductance-based electrical angle detection is shown by a solid line J and an efficiency curve in the reverse electromotive voltage-based detection is shown by a broken line B in the graph of FIG. 38. In the reverse electromotive voltage-based detection, the synchronous motor 40 can not be properly controlled in a low rotating speed range of the rotor 50 where only a low reverse electromotive voltage is generated. In the low rotating speed range, the phase balance of the electric current with respect to the positional arrangement of the permanent magnets 51 through 54 is lost, and the three-phase synchronous motor 40 can not generate a torque stably. In worst cases, the flow of electric current results in no outputs of the motor or reverse rotation of the rotor 50. The efficiency of the three-phase synchronous motor 40 is accordingly lowered in the low-rotating speed range as shown by the broken line B.

The inductance-based method, on the contrary, efficiently detects the electrical angle in a range from a start of the motor 40 to a predetermined speed of rotation. The frequency of the driving ac rises to increase the speed of rotation, and a relative difference from the high-frequency component laid over the driving ac (see FIG. 12) becomes small. The number of high-frequency pulses in one rotation (360 degrees) of the rotor 50 accordingly decreases with the increase in the speed of rotation. This results in lowering the precision for detecting the rotational position of the rotor 50 or the electrical angle. The electrical angle of the three-phase synchronous motor 40 can be detected efficiently over the whole range of rotating speed by experimentally determining an intersection of the two efficiency curves shown in FIG. 38 and changing the detection method in the vicinity of the specific rotating speed at the intersection. In this embodiment, a hysteresis is set in the speed of rotation for changeover of the detection methods. This effectively prevents the detection method from being changed too often due to the varied precision of detection.

Figure 39:
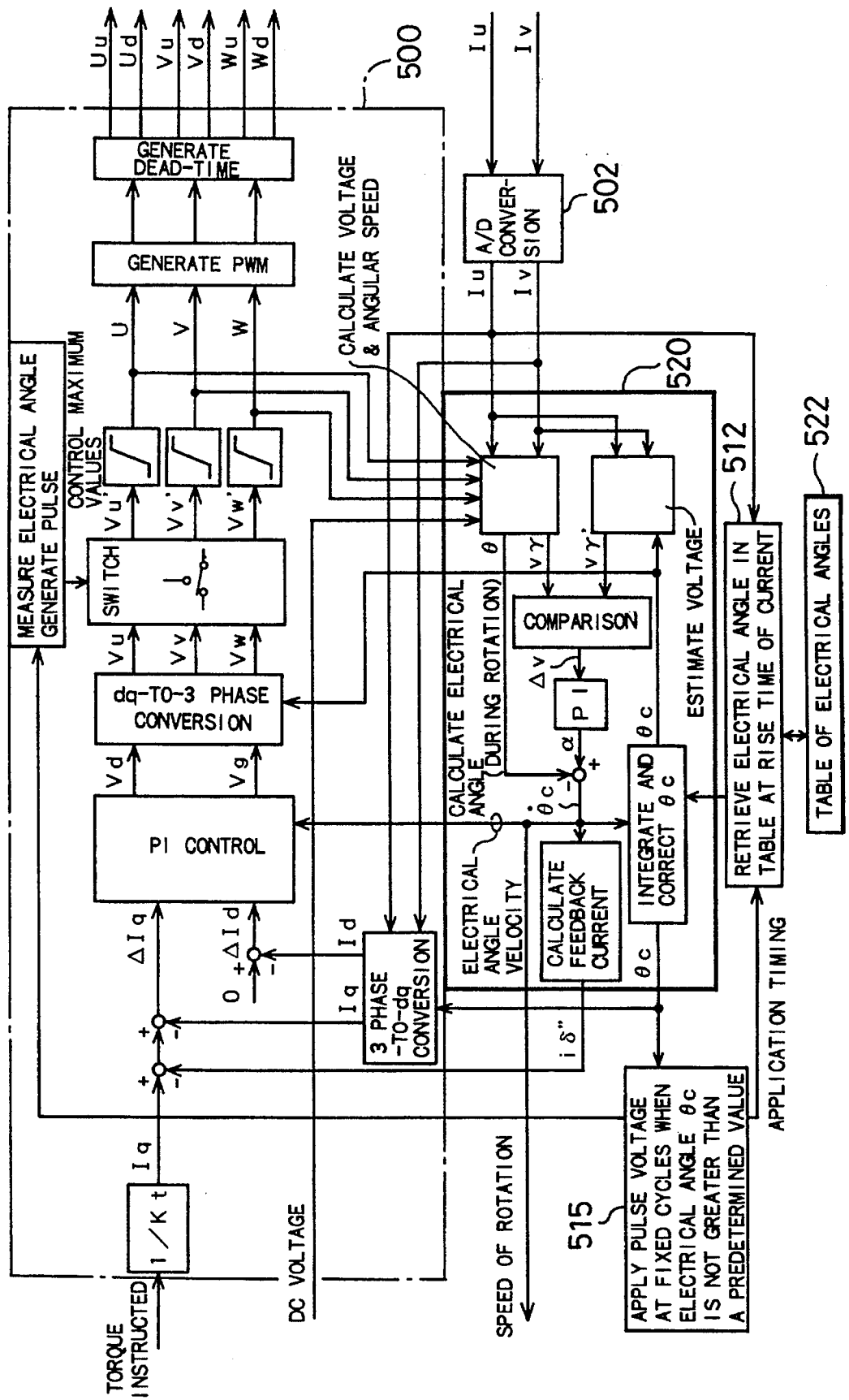
FIG. 39 is a block diagram showing an exemplified design of the motor control system 390 of the fourth embodiment.

The inductance-based electrical angle detection unit 415 used in the fourth embodiment for detecting the electrical angle with an inductance has a structure similar to that of the second embodiment. The reverse electromotive voltage-based electrical angle detection unit 420 may be constructed according to a known technology: for example, 'BRUSH-LESS DC MOTOR CONTROL SYSTEM WITH NO POSITIONING DETECTOR'(Material for 1990 Meeting on Semi-Conductor Power Conversion SEP-90-21). FIG. 39 is a block diagram showing a detailed structure of the fourth embodiment. In the example of FIG. 39, a motor current control circuit 500 converts U-phase and V-phase currents read as digital data from an analog-to-digital converter 502 to data of q-axis and d-axis and executes proportional-integral (PI) control based on the data conversion and a torque previously instructed. The motor current control circuit 500 then converts the results of the PI control to signals of U, V, and W phases and further to voltage signals, executes pulse width modulation and dead-time control and outputs the results to each winding of the three-phase synchronous motor 40.

The electrical angle is calculated by a reverse electromotive voltage-based electrical angle operator 520 while the rotor 50 rotates at the rotating speed of not less than a predetermined level. The process of operation is described in detail in the literature specified above. The operator 520 determines an estimated speed by differentiating the electrical angle θ based on the phase currents Iu and Iv and the U-phase, V-phase, and V-phase voltages in the motor current control circuit 500 and calculates a voltage signal vγ in the direction of a γ axis. The operator 520 then executes the PI operation for a deviation Δγ of the voltage signal vγ from an estimated voltage vγ' based on the phase signals Iu and Iv and determines an electrical angular velocity according to the sign of the estimated speed. The operator 520 calculates a feedback current based on the electrical angular velocity and outputs the feedback current to the motor current control circuit 500. In this manner, the electrical angle (more precisely, electrical angular velocity) is determined with the reverse electromotive voltage during rotation of the rotor 50. The electrical angular velocity is integrated and output to a circuit for converting three-phase signals to d-axis and q-axis signals as electrical angle signals and a circuit 515 for applying a pulse voltage at a predetermined cycle when the speed of rotation of the motor 40 is below the predetermined level.

while the rotor 50 is in stationary conditions or rotates at the rotating speed of less than the predetermined level, the electrical angle is calculated with the phase currents Iu and Iv. An inductance-based electrical angle operator 512 refers to an electrical angle table 522 so as to implement the operation. Either one selected out of operation results by the inductance-based electrical angle operator 512 and by the reverse electromotive voltage-based electrical angle operator 520 is applied for control of the driving current of the synchronous motor 40.

A fifth embodiment according to the invention is described briefly. An electrical angle-detecting apparatus of the fifth embodiment has a structure similar to that of the third embodiment (see FIG. 22). Like the fourth embodiment, a motor control system of the fifth embodiment controls start and rotation of the three-phase synchronous motor 40 by detecting the electrical angle with an inductance in a low rotating speed region while detecting the electrical angle with a reverse electromotive voltage and controlling rotation of the three-phase synchronous motor 40 in a range over a predetermined rotating speed.

Figure 40:
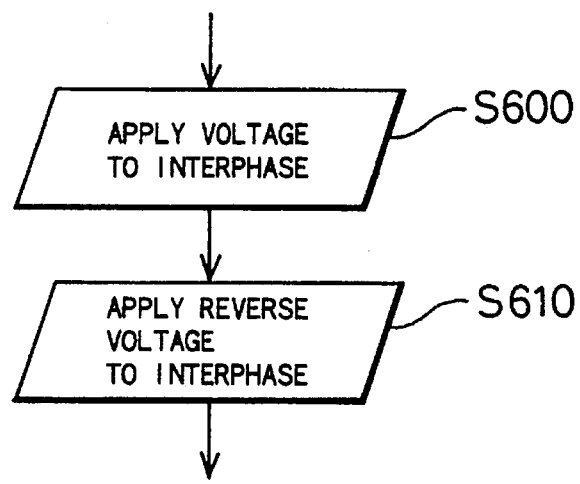
FIG. 40 is a flowchart showing steps of the essential processing executed in a fifth embodiment according to the invention.
Figure 41:
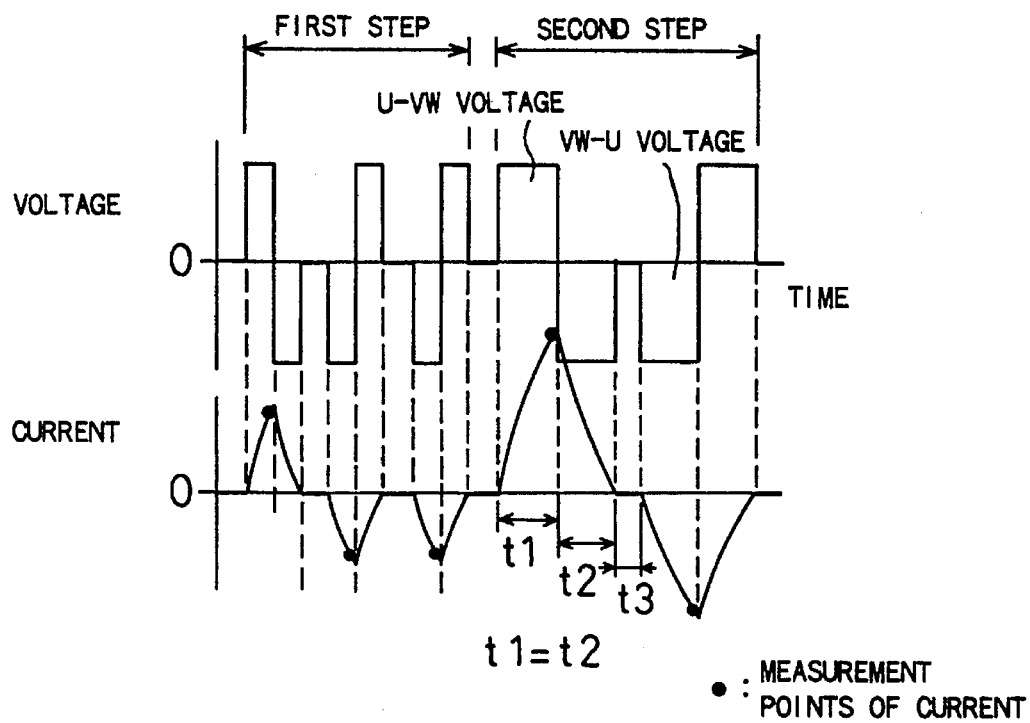
FIG. 41 is a graph showing the applied voltage and the electric current on the time axis in the fifth embodiment.

In the fifth embodiment, the structure of the third embodiment is applied for detection of the electrical angle with the inductance. FIG. 40 is a flowchart showing a specific process of the fifth embodiment executed when a fixed voltage is applied onto the respective interphases for detection of the electrical angle at the first step or the second step (see FIGS. 26 and 28). In the process of the fifth embodiment, immediately after application of a fixed voltage onto a specific interphase at step S600, a reverse voltage corresponding to the fixed voltage is applied onto the specific interphase at step S610. The electric current remaining as a transient response even after terminating application of the voltage to the coil is forcibly lowered by application of a reverse voltage to be converged to zero abruptly. FIG. 41 shows the converging process. A reverse voltage having an identical absolute value with that of a voltage for measurement and a reverse polarity is output to an interphase coil for a time period t2, which is equivalent to a time period t1 while the voltage is applied for measurement. Application of a reverse voltage having an identical absolute value converges the electric current to substantially zero. In some cases, however, the electric current is not completely converged to zero due to a variation in the voltage of the power source or a variation in the application period by effects of the dead time. Application of a voltage for measurement to a subsequent interphase is accordingly executed after elapse of a fixed time period t3. The intensity of the reverse voltage and its application period may be varied according to the requirements.

As described above, the structure of the fifth embodiment applies a reverse voltage immediately after applying a voltage for measurement and measuring the maximum current, thereby abruptly converging the electric current flowing through the coil to significantly shorten a waiting time for subsequent application of the voltage. As clearly understood by comparison between FIG. 41 and FIG. 34, the fifth embodiment reduces a time period required for detecting the electrical angle of the rotor 50 to approximately one third. This structure is especially suitable for repeated measurement of the electrical angle, that is, detection of the electrical angle during low-speed rotations of the rotor 50. The structure of the fifth embodiment makes possible detection of the electrical angle based on the inductance to the higher speed of rotation than the conventional system. In the apparatus for detecting the electrical angle based on the inductance in a range up to a predetermined speed of rotation like the fourth embodiment, this feature allows the speed of rotation for changeover to the reverse electromotive voltage-based detection to be set sufficiently high, thus improving the degree of freedom in design.

An electrical angle-detecting apparatus of a sixth embodiment according to the invention has the same structure as the fifth embodiment and executes detection of the electrical angle of the rotor 50 at every start of the motor 40 like the fifth embodiment, that is, according to the method 1-1 of the first step and the method 2-1 of the second step of the third embodiment. The three-phase synchronous motor 40 of the embodiment has the maximum speed of rotation at 9,000 rpm. As generally known, the lower limit of detection of the electrical angle based on the reverse electromotive voltage is one fifth the maximum speed of rotation, that is, down to 180 rpm. Detection of the electrical angle based on the inductance up to 180 rpm is accordingly required to allow detection of the electrical angle over the whole range between the inactivated state to the maximum speed of rotation. At the rotating speed of 180 rpm (=3 rotations per second), the time required for one rotation of the rotor 50 is ⅓ second. On the assumption that the time required for measurement of the maximum currents Iu, Iv, and Iw of the U, V, and W phases at the first step is equal to 50 msec and the total time required for completion of the first and the second steps as shown in FIG. 34 is equal to 120 msec, the electrical angle can be detected only two or three times per every rotation of the rotor 50. In actual operation, plural measurements of the electrical angle are required simultaneously with application of a driving voltage onto an interphase in every rotation of the rotor 50. Under such conditions, however, it is extremely difficult to measure the electrical angle with high precision and control the driving voltage.

Figure 42:
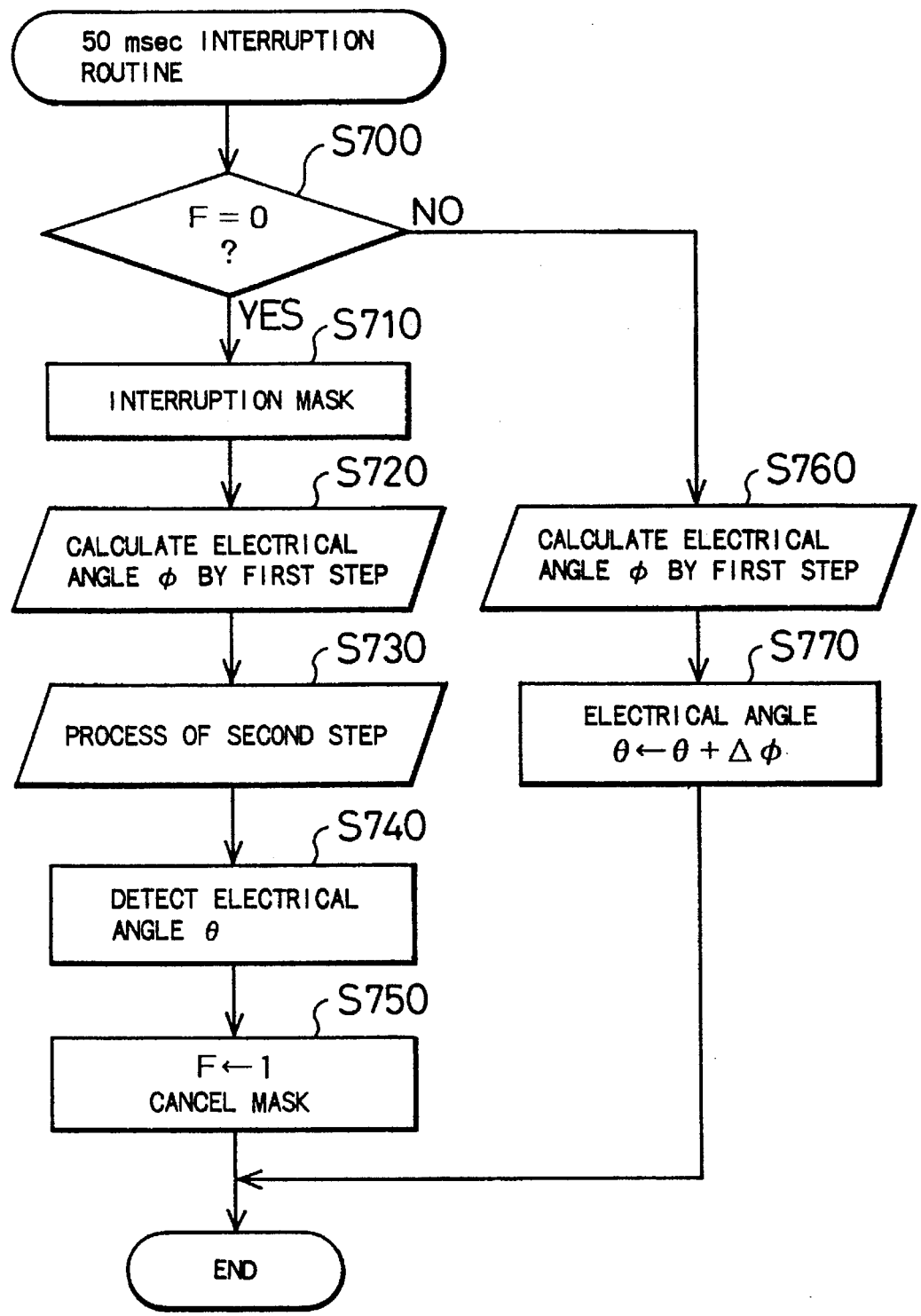
FIG. 42 is a flowchart showing an interrupt routine executed in a sixth embodiment.

In order to solve the above problem, the sixth embodiment executes an interruption routine activated at every 50 msec as shown in the flowchart of FIG. 42. When the program enters the routine, it is determined whether the rotor 50 is under inactivating conditions (stop) or activating conditions (rotation) based on the value of a flag F at step S700. When the flag F is equal to zero (initial value), the rotor 50 is at a stop. When it is determined that the rotor 50 is under inactivating conditions, the program goes to step S710 at which an interruption mask is set. Since 120 msec is required for continuously executing the first and the second steps, the interruption is masked until detection of the electrical angle is completed. The program then proceeds to step S720 at which the first step is executed for calculating the electrical angle $\phi$ in either the range of 0 through $\pi$ or the range of $\pi$ through $2\pi$. At step S730, the second step is executed for determining whether the rotor 50 exists in the range of 0 to $\pi$ or in the range of $\pi$ through $2\pi$. At step S740, the electrical angle $\theta$ is determined unequivocally according to the first step and the second step. The program then goes to step S750 at which the flag F is set equal to one and the interruption mask is canceled. Detection of the electrical angle $\theta$ of the inactivated rotor 50 is accordingly completed, and the program exits from the routine.

Once the electrical angle $\theta$ of the rotor 50 is detected under the inactivating conditions of the rotor 50, the flag F is set equal to the value '1' and the answer at the decision point S700 becomes 'NO'. The program thus proceeds to step S760 at which the first step is executed for calculating the electrical angle $\phi$. At step S770, the electrical angle $\theta$ is updated by adding a deviation $\Delta\phi$ of the electrical angle $\phi$ calculated at step S760 from the electrical angle $\phi$ obtained in a previous cycle of the routine. Once the electrical angle $\theta$ of the rotor 50 is detected, only the fist step is repeatedly executed at the intervals of approximately 50 msec to update the electrical angle $\theta$ with the variation in the electrical angle $\phi$ calculated. Upon condition that the interval of the updating process is 50 msec, even at the rotating speed of 180 rpm, the rotational angle of the rotor 50 is equal to 54 degrees (=50×10⁻³×360(degrees)×180(rpm)/60), which is sufficiently smaller than 180 degrees. It is thus accurately determined whether the rotor 50 exists in the range of 0 to $\pi$ (180 degrees) or in the range of $\pi$ through $2\pi$ (360 degrees) by executing the first step at the intervals of 50 msec after the first detection of the electrical angle $\theta$. This requires only the fist step for detection of the electrical angle and thereby substantially halves the time required for detection of the electrical angle.

As described above, the electrical angle-detecting apparatus of the sixth embodiment can significantly shorten the time period required for detection of the electrical angle after determination of the unequivocal electrical angle $\theta$. This structure requires only a short time period for subsequent measurement of the electrical angle and thereby ensures sufficient control of rotations of the three-phase synchronous motor 40. This allows the speed of rotation for changeover to the reverse electromotive voltage-based detection to be set sufficiently high, thus improving the degree of freedom in design.

There may be many modifications, alterations, and changes without departing from the scope or spirit of essential characteristics of the invention. It is thus clearly understood that the above embodiments are only illustrative and not restrictive in any sense. For example, the invention is applicable to synchronous motors other than three-phase motors.

The scope and spirit of the present invention are limited only by the terms of the appended claims.

What is claimed is:

1. An electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising:

first memory means for previously storing a relationship between electrical angles and values of electric current flowing in response to a predetermined voltage applied to a first interphase combination, second memory means for previously storing a relationship between electrical angles and values of electric current flowing in response to said predetermined voltage applied to a second interphase combination, which is different from said first interphase combination;

first measurement means for applying said predetermined voltage to said first interphase combination and measuring a value of a first electric current flowing in response to said predetermined voltage;

second measurement means for applying said predetermined voltage to said second interphase combination and measuring a value of a second electric current flowing in response to said predetermined voltage; and electrical angle calculation means for determining an electrical angle of said synchronous motor in a range of through $2\pi$ based on said values of said first and second electric currents measured by said first measurement means and said second measurement means with reference to said relationships stored in said first memory means and said second memory means.

2. An electrical angle-detecting apparatus in accordance with claim 1, wherein said first memory means and said second memory means respectively store relationships between values of electric current and inductances corresponding to an electrical angles.

3. An electrical angle-detecting apparatus in accordance with claim 1, wherein a pair of poles of said synchronous motor comprise a north pole and a south pole having different magnetic properties, so that a values of electric current with respect to an electrical angle of a first $\pi$ is made different from that with respect to an electrical angle of a second $\pi$.

4. An electrical angle-detecting apparatus in accordance with claim 1, wherein at least one of said first measurement means and said second measurement means comprises voltage application means for applying a voltage corresponding to a non-linear region of magnetic properties of a magnetic circuit, which consists of said rotor and said first or second interphase combination, to said first or second interphase combination.

5. An electrical angle-detecting apparatus in accordance with claim 1, wherein at least one of said first measurement means and said second measurement means measuring a respective one of said first and second electric currents as a time period elapsing before said respective one of said first and second electric currents reaches a predetermined level.

6. An electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising:

electrical angle calculation means for calculating an electrical angle in a range of 0 through $\pi$ or in a range of $\pi$ through $2\pi$ by approximation based on a value of electric current flowing in response to a fixed voltage applied to each interphase combination;

range specification means for determining whether said electrical angle calculated is in a range of 0 to $\pi$ or in a range of $\pi$ through $2\pi$; and electrical angle determination means for determining an unequivocal electrical angle according to said electrical angle calculated and said range specified.

7. An electrical angle-detecting apparatus in accordance with claim 6, said range specification means further comprises:

voltage application means for applying a voltage corresponding to a non-linear region of magnetic properties of a magnetic circuit, which consists of said rotor and a specific interphase combination, to said specific interphase combination;

detection means for detecting a value of electric current flowing through said specific interphase combination in response to said voltage applied; and electrical angle range specification means for specifying a range of said electrical angle by a unit of $\pi$ based on said value of said electric current thus detected by said detection means.

8. An electrical angle-detecting apparatus in accordance with claim 7, wherein said electrical angle range specification means further comprises means for specifying said range of said electrical angle based on comparison between an intensity of said electric current and a predetermined threshold value.

9. An electrical angle-detecting apparatus in accordance with any one of claims 1, 6, or 7, said apparatus further comprising means for abruptly reducing said applied voltage after application of said voltage to said interphase combination and detection of a value of electric current in response to said applied voltage.

10. An electrical angle-detecting apparatus in accordance with any one of claims 1, 6, or 7, said apparatus further comprising means for regulating a frequency of said applied voltage to be higher than a frequency of a driving ac voltage applied to said winding.

11. An electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising:

electrical angle calculation means for calculating an electrical angle in a range of 0 through $\pi$ or in a range of $\pi$ through $2\pi$ by approximation based on a value of electric current flowing in response to a fixed voltage applied to each interphase combination;

range specification means for determining whether said electrical angle calculated is in a range of 0 through $\pi$ or in a range of $\pi$ through $2\pi$; and electrical angle determination means for determining an unequivocal electrical angle according to said electrical angle calculated and said range specified;

wherein said electrical angle calculation means further comprises:

current detection means for successively applying said fixed voltage to each of N interphase combinations in a three-phase synchronous motor so as to detect a value of electric current flowing in response to said fixed voltage, where N represents 3 or a greater integer;

selection means for selecting a value having a least error in linear approximation out of said N values of electric current detected by said current detection means; and approximation means for calculating an electrical angle of said synchronous motor by linear approximation of said value of electric current thus selected by said selection means.

12. An electrical angle-detecting apparatus in accordance with claim 11, wherein said current detection means further comprises:

means for actually measuring values of electric current for (N−1) interphase combinations out of said N interphase combinations; and means for calculating a value of electric current for a last interphase combination based on values measured for said (N−1) interphase combinations.

13. An electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising:

electrical angle calculation means for calculating an electrical angle in a range of 0 through $\pi$ or in a range of $\pi$ through $2\pi$ by approximation based on a value of electric current flowing in response to a fixed voltage applied to each interphase combination;

range specification means for determining whether said electrical angle calculated is in a range of 0 through $\pi$ or in a range of $\pi$ through $2\pi$; and electrical angle determination means for determining an unequivocal electrical angle according to said electrical angle calculated and said range specified;

wherein said synchronous motor comprises a three-phase synchronous motor using three-phase alternating current;

said electrical angle calculation means further comprising:

electric current detection means for detecting an electric current flowing in response to said fixed voltage applied into each interphase combination of said three phases;

area specification means for specifying one of six areas, which are defined by equally dividing an electrical angle of π, according to an intensity and a mean of the three electric currents detected by said electric current detection means;

phase calculation means for determining a phase of said electrical angle in said specified area by an approximate equation of θ≅(tan2θ)/2 for an interphase where said electric current has an extreme value; and angle calculation means for calculating said electrical angle in said range of 0 through π or in said range of π through 2π based on said specified area and said phase determined by said phase calculation means.

14. An electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising:

electrical angle calculation means for calculating an electrical angle in a range of 0 through π or in a range of π through 2π by approximation based on a value of electric current flowing in response to a fixed voltage applied to each interphase combination;

range specification means for determining whether said electrical angle calculated is in a range of 0 through π or in a range of π through 2π; and electrical angle determination means for determining an unequivocal electrical angle according to said electrical angle calculated and said range specified;

wherein said range specification means further comprises, voltage application means for applying a voltage corresponding to a non-linear region of magnetic properties of a magnetic circuit, which consists of said rotor and a specific interphase combination, to said specific interphase combination, detection means for detecting a value of electric current flowing through said specific interphase combination in response to said voltage applied, and electrical angle range specification means for specifying a range of said electrical angle by a unit of π based on said value of said electric current thus detected by said detection means;

wherein said electrical angle range specification means further comprises means for specifying said range of said electrical angle based on comparison between an intensity of said electric current and a predetermined threshold value;

wherein said electrical angle range specification means further comprises means for selecting one of plural threshold values according to an area to which an electrical angle calculated by said electrical angle calculation means belong to.

15. An electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising:

electrical angle calculation means-for calculating an electrical angle in a range of 0 through π or in a range of π through 2π by approximation based on a value of electric current flowing in response to a fixed voltage applied to each interphase combination;

range specification means for determining whether said electrical angle calculated is in a range of 0 through π or in a range of π through 2π; and electrical angle determination means for determining an unequivocal electrical angle according to said electrical angle calculated and said range specified;

wherein said range specification means further comprises, voltage application means for applying a voltage corresponding to a non-linear region of magnetic properties of a magnetic circuit, which consists of said rotor and a specific interphase combination, to said specific interphase combination, detection means for detecting a value of electric current flowing through said specific interphase combination in response to said voltage applied, and electrical angle range specification means for specifying a range of said electrical angle by a unit of π based on said value of said electric current thus detected by said detection means;

wherein said voltage application means comprises voltage determination means for determining said voltage to be applied according to an area to which an electrical angle calculated by said electrical angle calculation means belong to;

said electrical angle range specification means further comprising means for specifying said range of said electrical angle based on comparison between a predetermined threshold value and an intensity of electric current flowing through said specific interphase combination in response to said voltage applied.

16. An electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising:

electrical angle calculation means for calculating an electrical angle in a range of 0 through π or in a range of π through 2π by approximation based on a value of electric current flowing in response to a fixed voltage applied to each interphase combination;

range specification means for determining whether said electrical angle calculated is in a range of 0 through π or in a range of π through 2π; and electrical angle determination means for determining an unequivocal electrical angle according to said electrical angle calculated and said range specified;

wherein said range specification means further comprises:

first voltage application means for applying a voltage corresponding to a non-linear region of magnetic properties of a magnetic circuit, which consists of said rotor and a specific interphase combination, to said specific interphase combination;

second voltage application means for applying a reverse voltage having an opposite polarity to that of said applied voltage to another interphase combination, which is different from said specific interphase combination; and electrical angle range specification means for specifying a range of said electrical angle by a unit of π based on comparison between intensities of electric currents flowing in response to said applied voltage and said reverse voltage.

17. An electrical angle-detecting apparatus in accordance with claim 16, said apparatus further comprising interphase determination means for determining said specific interphase combination and said another interphase combination, to which said first voltage application means and said second voltage application means apply said voltage and said reverse voltage, based on said range specified by said range specification means;

said voltage and said reverse voltage applied by said first voltage application means and said second voltage application means being defined as a lower limit of said non-linear region.

18. An electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising:

angle detection means for applying a fixed voltage to a specific interphase combination within an elapse of a time period required for each electrical angle θ, which is determined by an upper limit of rotating speed of said synchronous motor, and detecting an electrical angle in a range of 0 through π or in a range of π through 2π based on a value of electric current flowing in response to said fixed voltage;

range specification means for determining, at least once, whether said electrical angle detected is in said range of 0 through π or in said range of π through 2π; and electrical angle updating means for determining an initial value of said electrical angle according to said electrical angle detected by said angle detection means and said range specified by said range specification means and updating a current electrical angle by said electrical angle most recently detected by said angle detection means.

19. A driving system of a synchronous motor comprising:

an electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising, first memory means for previously storing a relationship between electrical angles and values of electric current flowing in response to a predetermined voltage applied to a first interphase combination, second memory means for previously storing a relationship between electrical angles and values of electric current flowing in response to said predetermined voltage applied to a second interphase combination, which is different from said first interphase combination, first detection means for applying said predetermined voltage to said first interphase combination to detect value of a first electric current flowing in response to said predetermined voltage, second detection means for applying said predetermined voltage to said second interphase combination to detect value of a second electric current flowing in response to said predetermined voltage, and electrical angle calculation means for determining an electrical angle of said synchronous motor in a range of 0 through 2π based on said values of said first and second electric currents detected by said first detection means and said second detection means with reference to said relationships stored in said first memory means and said second memory means;

reverse electromotive voltage detection means for detecting a reverse electromotive voltage generated in said winding accompanied with rotation of said rotor;

second electrical angle detection means for detecting an electrical angle based on said reverse electromotive voltage detected by said reverse electromotive voltage detection means; and driving voltage application means for applying a driving voltage to said winding according to results of detection by said electrical angle-detecting apparatus in a first range where said rotor is at a stop or rotates at a speed of less than a predetermined level and according to results of detection by said second electrical angle detection means in a second range where said rotor rotates at a speed of not less than said predetermined level.

20. A driving system of a synchronous motor comprising:

an electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising:

first electrical angle calculation means for calculating an electrical angle in a range of 0 through π or in a range of π through 2π by approximation based on a value of electric current flowing in response to a fixed voltage applied to each interphase combination;

range specification means for determining whether said electrical angle calculated is in a range of 0 through π or in a range of π through 2π;

electrical angle determination means for determining an unequivocal electrical angle according to said electrical angle calculated and said range specified;

reverse electromotive voltage detection means for detecting a reverse electromotive voltage generated in said winding accompanied with rotation of said rotor;

second electrical angle detection means for detecting an electrical angle based on said reverse electromotive voltage detected by said reverse electromotive voltage detection means; and driving voltage application means for applying a driving voltage to said winding according to results of detection by said electrical angle-detecting apparatus in a first range where said rotor is at a stop or rotates at a speed of less than a predetermined level and according to results of detection by said second electrical angle detection means in a second range where said rotor rotates at a speed of not less than said predetermined level.

21. A driving system of claim 20, wherein said range specification means further comprises:

voltage application means for applying a voltage corresponding to a non-linear region of magnetic properties of a magnetic circuit, which consists of said rotor and a specific interphase combination, to said specific interphase combination;

detection means for detecting a value of electric current flowing through said specific interphase combination in response to said voltage applied, and electrical angle range specification means for specifying a range of said electrical angle by a unit of π based on said value of said electric current thus detected by said detection means.

22. A driving system of a synchronous motor comprising:

an electrical angle-detecting apparatus of a synchronous motor which makes a multi-phase alternating current flow through a winding to rotate a rotor by means of an interaction between a magnetic field formed by said winding and a magnetic field formed by a permanent magnet, said apparatus comprising, angle detection means for applying a fixed voltage to a specific interphase combination within an elapse of a time period required for each electrical angle θ, which is determined by an upper limit of rotating speed of said synchronous motor, and detecting an electrical angle in a range of 0 through π or in a range of π through 2π based on a value of electric current flowing in response to said fixed voltage;

range specification means for determining, at least once, whether said electrical angle detected is in said range of 0 through π or in said range of π through 2π, and electrical angle updating means for determining an initial value of said electrical angle according to said electrical angle detected by said angle detection means and said range specified by said range specification means and updating a current electrical angle by said electrical angle most recently detected by said angle detection means;

reverse electromotive voltage detection means for detecting a reverse electromotive voltage generated in said winding accompanied with rotation of said rotor;

second electrical angle detection means for detecting an electrical angle based on said reverse electromotive voltage detected by said reverse electromotive voltage detection means; and driving voltage application means for applying a driving voltage to said winding according to results of detection by said electrical angle-detecting apparatus in a first range where said rotor is at a stop or rotates at a speed of less than a predetermined level and according to results of detection by said second electrical angle detection means in a second range where said rotor rotates at a speed of not less than said predetermined level.

23. A method of detecting an electrical angle of a synchronous motor which makes a multi-phase alternating current flow through a winding to rotate a rotor by means of an interaction between a magnetic field formed by said winding and a magnetic field formed by a permanent magnet, said method comprising the steps of:

(a) previously storing a relationship between electrical angles and values of electric current flowing in response to a predetermined voltage applied to a first interphase combination;

(b) previously storing a relationship between electrical angles and values of electric current flowing in response to said predetermined voltage applied to a second interphase combination, which is different from said first interphase combination;

(c) applying said predetermined voltage to said first interphase combination to detect a value of a first electric current flowing in response to said predetermined voltage;

(d) applying said predetermined voltage to said second interphase combination to detect a value of a second electric current flowing in response to said predetermined voltage; and (e) determining an electrical angle of said synchronous motor in a range of 0 through 2π based on said values of said first and second electric currents detected in said step (c) and step (d) with reference to said relationships stored in said step (a) and step (b).

24. A method of detecting an electrical angle of a synchronous motor which makes a multi-phase alternating current flow through a winding to rotate a rotor by means of an interaction between a magnetic field formed by said winding and a magnetic field formed by a permanent magnet, said method comprising the steps of:

(a) previously storing values of electric current flowing in response to a fixed voltage applied to each interphase combination;

(b) applying said fixed voltage to each interphase combination and detecting electric currents flowing in response to said fixed voltage;

(c) calculating an electrical angle in a range of 0 through π or in a range of π through 2π by approximation of said electric currents detected in said step (b) based on said values stored in said step (a); and (d) determining whether said electrical angle calculated is in said range of 0 to π or in said range of π through 2π so as to determine an unequivocal electrical angle based on said electrical angle calculated.

25. A method in accordance with claim 24, wherein said step (d) further comprises the steps of:

(d-1) applying a voltage corresponding to a non-linear region of magnetic properties of a magnetic circuit, which consists of said rotor and a specific interphase combination, to said specific interphase combination;

(d-2) detecting a value of electric current flowing through said specific interphase combination in response to said voltage applied; and (d-3) specifying a range of said electrical angle by a unit of π based on said value of said electric current thus detected in said step (d-2).

26. A method in accordance with any one of claims 23, 24, or 25, said method further comprising the step of: making a voltage abruptly discharged after application of said voltage to said interphase combination and detection of a value of electric current in response to said applied voltage.

27. A method of detecting an electrical angle of a synchronous motor which makes a multi-phase alternating current flow through a winding to rotate a rotor by means of an interaction between a magnetic field formed by said winding and a magnetic field formed by a permanent magnet, said method comprising the steps of:

(a) applying a fixed voltage to a specific interphase combination within an elapse of a time period required for each electrical angle θ, which is determined by an upper limit of rotating speed of said synchronous motor, and detecting an electrical angle in a range of 0 to π or in a range of π through 2π based on a value of electric current flowing in response to said fixed voltage;

(b) determining, at least once, whether said electrical angle detected is in said range of 0 to π or in said range of π through 2π; and (c) determining an initial value of said electrical angle according to said electrical angle detected in said step (a) and said range specified in said step (b) and updating a current electrical angle by said electrical angle most recently detected in said step (a).

28. A method of driving a synchronous motor comprising the steps of:

(a) first electrical angle detection process of detecting an electrical angle of a synchronous motor which makes a multi-phase alternating current flow through a winding to rotate a rotor by means of an interaction between a magnetic field formed by said winding and a magnetic field formed by a permanent magnet, said process comprising the steps of, (a') previously storing a relationship between electrical angles and values of electric current flowing in response to a predetermined voltage applied to a first interphase combination, (b') previously storing a relationship between electrical angles and values of electric current flowing in response to said predetermined voltage applied to a second interphase combination, which is different from said first interphase combination, (c') applying said predetermined voltage to said first interphase combination to detect value of a first electric current flowing in response to said predetermined voltage, (d') applying said predetermined voltage to said second interphase combination to detect value of a second electric current flowing in response to said predetermined voltage, and (e') determining an electrical angle of said synchronous motor in a range of 0 through $2\pi$ based on said values of said first and second electric currents detected in said step (c') and step (d') with reference to said relationships stored in said step (a') and step (b');

(b) second electrical angle detection process of detecting a reverse electromotive voltage generated in said winding accompanied with rotation of said rotor and detecting an electrical angle based on said reverse electromotive voltage thus detected; and (c) application process of applying a driving voltage to said winding according to results of detection by said process (a) in a first range where said rotor is at a stop or rotates at a speed of less than a predetermined level and according to results of detection by said process (b) in a second range where said rotor rotates at a speed of not less than said predetermined level.

29. A method of driving a synchronous motor comprising the steps of:

(a) first electrical angle detection process of detecting an electrical angle of a synchronous motor which makes a multi-phase alternating current flow through a winding to rotate a rotor by means of an interaction between a magnetic field formed by said winding and a magnetic field formed by a permanent magnet, said process comprising the steps of, (a') previously storing values of electric current flowing in response to a fixed voltage applied to each interphase combination, (b') applying said fixed voltage to each interphase combination and detecting electric currents flowing in response to said fixed voltage, (c') calculating an electrical angle in a range of 0 through $\pi$ or in a range of $\pi$ through $2\pi$ by approximation of said electric currents detected in said step (b') based on said values stored in said step (a'), and (d') determining whether said electrical angle calculated is in said range of 0 through $\pi$ or in said range of $\pi$ through $2\pi$ so as to determine an unequivocal electrical angle based on said electrical angle calculated, (b) second electrical angle detection process of detecting a reverse electromotive voltage generated in said winding accompanied with rotation of said rotor and detecting an electrical angle based on said reverse electromotive voltage thus detected; and (c) application process of applying a driving voltage to said winding according to results of detection by said process (a) in a first range where said rotor is at a stop or rotates at a speed of less than a predetermined level and according to results of detection by said process (b) in a second range where said rotor rotates at a speed of not less than said predetermined level.

30. A method of driving a synchronous motor comprising the steps of:

(a) first electrical angle detection process of detecting an electrical angle of a synchronous motor which makes a multi-phase alternating current flow through a winding to rotate a rotor by means of an interaction between a magnetic field formed by said winding and a magnetic field formed by a permanent magnet, comprising the steps of, (a') previously storing values of electric current flowing in response to a fixed voltage applied to each interphase combination, (b') applying said fixed voltage to each interphase combination and detecting electric currents flowing in response to said fixed voltage, (c') calculating an electrical angle in a range of 0 through $\pi$ or in a range of $\pi$ through $2\pi$ by approximation of said electric currents detected in said step (b') based on said values stored in said step (a'), and (d') determining whether said electrical angle calculated is in said range of 0 through $\pi$ or in said range of $\pi$ through $2\pi$ so as to determine an unequivocal electrical angle based on said electrical angle calculated, wherein said step (d') further comprises the steps of, (d'-1) applying a voltage corresponding to a non-linear region of magnetic properties of a magnetic circuit, which consists of said rotor and a specific interphase combination, to said specific interphase combination, (d'-2) detecting a value of electric current flowing through said specific interphase combination in response to said voltage applied, and (d'-3) specifying a range of said electrical angle by a unit of $\pi$ based on said value of said electric current thus detected in said step (d'-2);

(b) second electrical angle detection process of detecting a reverse electromotive voltage generated in said winding accompanied with rotation of said rotor and detecting an electrical angle based on said reverse electromotive voltage thus detected; and (c) application process of applying a driving voltage to said winding according to results of detection by said process (a) in a first range where said rotor is at a stop or rotates at a speed of less than a predetermined level and according to results of detection by said process (b) in a second range where said rotor rotates at a speed of not less than said predetermined level.

31. A method of driving a synchronous motor comprising the steps of:

(a) first electrical angle detection process of detecting an electrical angle of a synchronous motor which makes a multi-phase alternating current flow through a winding to rotate a rotor by means of an interaction between a magnetic field formed by said winding and a magnetic field formed by a permanent magnet, said process comprising the steps of, (a') applying a fixed voltage to a specific interphase combination within an elapse of a time period required for each electrical angle $\theta$, which is determined by an upper limit of rotating speed of said synchronous motor, and detecting an electrical angle in a range of 0 through $\pi$ or in a range of $\pi$ through $2\pi$ based on a value of electric current flowing in response to said fixed voltage, (b') determining, at least once, whether said electrical angle detected is in said range of 0 through $\pi$ or in said range of $\pi$ through $2\pi$, and (c') determining an initial value of said electrical angle according to said electrical angle detected in said step (a) and said range specified in said step (b') and updating a current electrical angle by said electrical angle most recently detected in said step (a');

(b) second electrical angle detection process of detecting a reverse electromotive voltage generated in said winding accompanied with rotation of said rotor and detecting an electrical angle based on said reverse electromotive voltage thus detected; and (c) application process of applying a driving voltage to said winding according to results of detection by said process (a) in a first range where said rotor is at a stop or rotates at a speed of less than a predetermined level and according to results of detection by said process (b) in a second range where said rotor rotates at a speed of not less than said predetermined level.

* * * * *